United States Patent
Kim et al.

(10) Patent No.: US 10,587,440 B2
(45) Date of Patent: Mar. 10, 2020

(54) METHOD FOR TRANSMITTING AND RECEIVING SIGNAL IN WLAN SYSTEM AND DEVICE THEREFOR

(71) Applicant: LG ELECTRONICS INC., Seoul (KR)

(72) Inventors: Jinmin Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/329,185

(22) PCT Filed: Dec. 14, 2017

(86) PCT No.: PCT/KR2017/014698
§ 371 (c)(1),
(2) Date: Feb. 27, 2019

(87) PCT Pub. No.: WO2018/131800
PCT Pub. Date: Jul. 19, 2018

(65) Prior Publication Data
US 2019/0190754 A1   Jun. 20, 2019

Related U.S. Application Data

(60) Provisional application No. 62/444,388, filed on Jan. 10, 2017, provisional application No. 62/468,381, filed on Mar. 8, 2017, provisional application No. 62/471,876, filed on Mar. 15, 2017, provisional application No. 62/486,994, filed on Apr. 19, 2017, provisional application No. 62/491,270, filed on Apr. 28, 2017.

(51) Int. Cl.
*H04L 27/26*   (2006.01)
*H04L 1/06*   (2006.01)
(Continued)

(52) U.S. Cl.
CPC ....... *H04L 27/2602* (2013.01); *H04B 7/0617* (2013.01); *H04B 7/0695* (2013.01);
(Continued)

(58) Field of Classification Search
CPC .................................................... H04W 84/12
See application file for complete search history.

(56) References Cited

U.S. PATENT DOCUMENTS 10,117,181 B2 * 10/2018 Trainin ..................... H04L 1/00
10,244,531 B2 *  3/2019 Eitan ................. H04W 72/0453
(Continued)

FOREIGN PATENT DOCUMENTS

KR        20140124370 A  * 10/2014   ......... H04L 27/2613

OTHER PUBLICATIONS

Carlos Cordeiro, "Specification Framework for TGay", IEEE P802.11 Wireless LANs, IEEE 802.11-15/01358r9 (Oct. 8, 2016) See section 6.5.2, etc. (Year: 2016).*
(Continued)

*Primary Examiner* — Jamaal Henson
(74) *Attorney, Agent, or Firm* — Lee, Hong, Degerman, Kang & Waimey

(57) ABSTRACT

The present specification discloses a method for transmitting and receiving a signal in a WLAN system, by a station, and a device therefor. More particularly, the present specification discloses, when a station transmits and receives a signal through a channel on which one or two channels are bonded, a method for constituting an enhanced directional multi gigabit (EDMG) short training field (STF) for an orthogonal frequency division multiplexing (OFDM) packet, and transmitting and receiving a signal comprising the constituted EDMG STF field, and a device therefor.

14 Claims, 32 Drawing Sheets

(51) Int. Cl.
*H04B 7/06* (2006.01)
*H04L 5/00* (2006.01)
*H04W 84/12* (2009.01)

(52) U.S. Cl.
CPC .............. *H04L 1/0618* (2013.01); *H04L 5/00* (2013.01); *H04L 5/0007* (2013.01); *H04L 27/26* (2013.01); *H04W 84/12* (2013.01)

(56) References Cited

U.S. PATENT DOCUMENTS

| | | | |
|---|---|---|---|
| 10,250,355 B2* | 4/2019 | Cordeiro | ............... H04L 1/0003 |
| 2015/0139137 A1 | 5/2015 | Seok | |
| 2016/0249332 A1 | 8/2016 | Xin et al. | |
| 2016/0323058 A1 | 11/2016 | Cordeiro et al. | |
| 2016/0323861 A1 | 11/2016 | Cordeiro et al. | |
| 2016/0323878 A1 | 11/2016 | Ghosh et al. | |
| 2018/0076979 A1* | 3/2018 | Lomayev | ............ H04L 27/2601 |
| 2019/0089440 A1* | 3/2019 | Lomayev | ............. H04B 7/0634 |
| 2019/0208463 A1* | 7/2019 | Lou | ....................... H04W 48/12 |

OTHER PUBLICATIONS

Robert Stacey, "Specification Framework for TGax", IEEE P802.11 Wireless LANs, IEEE 802.11-15/0132r15 (May 25, 2016) See section 3.2.6.2, etc. (Year: 2016).*

Jinmin Kim et al, "EDMG-STF for OFDM", IEEE 802.11-17/0732-00-00ay, May 2017(May 5, 2017) See whole documents. (Year: 2017).*

PCT International Application No. PCT/KR2017/014698, International Search Report dated Apr. 5, 2018, 4 pages.

Korean Intellectual Property Office Application No. 10-2019-7005822, Office Action dated Aug. 1, 2019, 5 pages.

European Patent Office Application Serial No. 17891556.7, Search Report dated Sep. 18, 2019, 6 pages.

Cordeiro, C. et al., "Specification Framework for TGay," IEEE P802.11 Wireless LANs, doc.: IEEE 802.11-15/01358r9, Nov. 2015, 90 pages.

IEEE: "IEEE Standard for Information Technology—Telecommunications and Information Exchange Between System—Local and Metropolitan Area Networks—Specific Requirements—Part 11: Wireless LAN Medium Access Control (MAC) and Physical Layer (PHY) Specifications," IEEE Std 802.11-2016 (Revision of IEEE Std 802. Nov. 2012, Dec. 2016, 3534 pages.

IEEE: "Draft Standard for Information Technology—Telecommunications and Information Exchange Between System—Local and Metropolitan Area Networks—Specific Requirements—Part 11: Wireless LAN Medium Access Control (MAC) and Physical Layer (PHY) Specifications—Amendment 7: Enhanced throughput for operation in license-exempt bands above 45GHZ," IEEE P802.11ay/D0.1, Jan. 2017, 181 pages.

Lomayev, A. et al., "EDMG STF and CEF Design for SC PHY in 11ay," doc.: IEEE 802.11-16/0994r0, Jul. 2016, 40 pages.

Coffey, S. et al., "Joint Proposal: High throughput extension to the 802.11 Standard: Phy," IEEE P802.11 Wireless LANs, doc.: IEEE 802.11-05/1102r1, Nov. 2005, 30 pages.

Lomayev, A. et al., "SC PHY EDMG-CEF Design for Channel Bonding x3," doc.: IEEE 802.11-16/1207r0, Sep. 2016, 15 pages.

* cited by examiner

FIG. 9

| CH 1 | L-STF | L-CE | L-Header | ay Header A | | | | |
|---|---|---|---|---|---|---|---|---|
| | GF-STF | GF-CE | | | ay STF | ay CE | ay Header B | ay payload |
| CH 2 | L-STF | L-CE | L-Header | ay Header A | | | | |

(L: Legacy, GF: Gap Filling, ay: 802.11ay)

FIG. 12

The sequence $Ga_{128}(n)$

| The Sequence $Ga_{128}(n)$, to be transmitted from left to right, up to down |
|---|
| +1 +1 -1 -1 -1 -1 -1 -1 -1 +1 -1 +1 +1 -1 -1 +1 +1 +1 -1 -1 +1 +1 +1 +1 -1 +1 -1 +1 -1 +1 -1 -1 |
| -1 -1 +1 +1 +1 +1 +1 +1 +1 -1 +1 -1 -1 +1 +1 -1 +1 +1 -1 -1 +1 +1 +1 +1 -1 +1 -1 +1 -1 +1 -1 -1 |
| +1 +1 -1 -1 -1 -1 -1 -1 -1 +1 -1 +1 -1 -1 -1 +1 +1 +1 -1 -1 +1 +1 +1 +1 -1 +1 -1 +1 -1 +1 -1 -1 |
| +1 +1 -1 -1 -1 -1 -1 -1 -1 +1 -1 +1 +1 -1 -1 +1 +1 -1 -1 -1 -1 +1 -1 +1 -1 +1 -1 +1 -1 -1 -1 +1 |

FIG. 13

The sequence $Gb_{128}(n)$

| The Sequence $Gb_{128}(n)$, to be transmitted from left to right, up to down |
|---|
| -1 -1 +1 +1 +1 +1 +1 +1 +1 -1 +1 -1 -1 +1 +1 -1 -1 -1 +1 +1 -1 -1 -1 -1 +1 -1 +1 -1 +1 -1 -1 +1 |
| +1 +1 -1 -1 -1 -1 -1 -1 -1 +1 -1 +1 +1 -1 -1 +1 -1 -1 +1 +1 -1 -1 -1 -1 +1 -1 +1 -1 +1 -1 -1 +1 |
| +1 +1 -1 -1 -1 -1 -1 -1 -1 +1 -1 +1 +1 -1 -1 +1 +1 +1 -1 -1 +1 +1 +1 +1 -1 +1 -1 +1 -1 +1 +1 -1 |
| +1 +1 -1 -1 -1 -1 -1 -1 -1 +1 -1 +1 +1 -1 -1 +1 -1 -1 +1 +1 -1 -1 -1 -1 +1 -1 +1 -1 +1 -1 -1 +1 |

FIG. 14

The sequence $Ga_{64}(n)$

| The Sequence $Ga_{64}(n)$, to be transmitted from left to right, up to down |
|---|
| -1 -1 +1 -1 +1 -1 -1 -1 +1 +1 -1 +1 +1 -1 -1 -1 -1 +1 -1 +1 -1 -1 -1 -1 +1 -1 -1 +1 +1 +1<br>-1 -1 +1 -1 +1 -1 -1 -1 +1 +1 -1 +1 +1 -1 -1 -1 +1 +1 -1 +1 +1 +1 +1 +1 +1 +1 -1 +1 +1 -1 -1 -1 |

FIG. 15

The sequence $Gb_{64}(n)$

| The Sequence $Gb_{64}(n)$, to be transmitted from left to right, up to down |
|---|
| +1 +1 -1 +1 -1 +1 +1 +1 -1 -1 +1 -1 -1 +1 +1 +1 +1 +1 -1 +1 -1 +1 +1 +1 +1 +1 -1 +1 +1 -1 -1 -1 |
| -1 -1 +1 -1 +1 -1 -1 -1 +1 +1 -1 +1 +1 -1 -1 -1 +1 +1 -1 +1 -1 +1 +1 +1 +1 -1 +1 +1 -1 -1 -1 |

FIG. 16

The sequence $Ga_{32}(n)$

| The Sequence $Ga_{32}(n)$, to be transmitted from left to right, up to down |
|---|
| +1 +1 +1 +1 +1 -1 +1 -1 -1 -1 +1 +1 +1 -1 -1 +1 +1 +1 -1 -1 +1 -1 -1 +1 -1 -1 -1 -1 +1 -1 +1 -1 |

FIG. 17

The sequence $Gb_{32}(n)$

| The Sequence $Gb_{32}(n)$, to be transmitted from left to right, up to down |
|---|
| -1 -1 -1 -1 -1 +1 -1 +1 +1 +1 +1 -1 -1 +1 +1 -1 +1 +1 -1 -1 -1 -1 -1 +1 -1 -1 -1 -1 +1 -1 +1 -1 |

FIG. 19

| |
|---|
| The Sequence $EDMGS^1_{left,176}(n)$, to be transmitted from left to right, up to down |
| 0 1 0 0 0 +j 0 0 0 +j 0 0 0 -1 0 0 0 -j 0 0 0 +j 0 0 0 -1 0 0 1 0 0 0 -1 0 0 0 +j 0 0 0 1 0 0 0 -1 0 0 1 0 0 0 -1 0 0 0 +j 0 0 0 1 0 0 0 1 0 0 0 -j 0 0 0 -j 0 0 0 -j 0 0 0 1 0 0 0 1 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 1 0 0 0 -j 0 0 0 -1 0 0 0 -1 0 0 0 +j 0 0 0 +j 0 0 0 +j 0 0 0 -1 0 0 0 -1 0 0 |
| The Sequence $EDMGS^1_{right,176}(n)$, to be transmitted from left to right, up to down |
| 0 0 1 0 0 0 +j 0 0 0 +j 0 0 0 -1 0 0 0 -j 0 0 0 +j 0 0 0 -1 0 0 1 0 0 0 -1 0 0 0 +j 0 0 0 1 0 0 0 -1 0 0 1 0 0 0 -1 0 0 0 +j 0 0 0 1 0 0 0 1 0 0 0 -j 0 0 0 -j 0 0 0 -j 0 0 0 1 0 0 1 0 0 0 -1 0 0 0 -j 0 0 -j 0 0 0 1 0 0 0 +j 0 0 0 -j 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 1 0 |
| The Sequence $EDMGS^2_{left,176}(n)$, to be transmitted from left to right, up to down |
| 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -1 0 0 0 -1 0 0 0 +j 0 0 0 +j 0 0 0 +j 0 0 0 -1 0 0 0 -1 0 0 |
| The Sequence $EDMGS^2_{right,176}(n)$, to be transmitted from left to right, up to down |
| 0 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 1 0 0 0 -1 0 0 0 1 0 0 -j 0 0 0 -1 0 0 0 -1 0 0 0 +j 0 0 0 +j 0 0 0 +j 0 0 0 -1 0 0 0 -1 0 0 0 -1 0 0 0 -j 0 0 -j 0 0 0 1 0 0 0 +j 0 0 0 -j 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 1 0 |
| The Sequence $EDMGS^3_{left,176}(n)$, to be transmitted from left to right, up to down |
| 0 +j 0 0 0 -1 0 0 0 -1 0 0 0 -j 0 0 0 1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0 +j 0 0 0 +j 0 0 0 1 0 0 0 1 0 0 0 1 0 0 0 +j 0 0 0 +j 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -1 0 0 0 -1 0 0 0 +j 0 0 0 +j 0 0 0 +j 0 0 0 -1 0 0 0 -1 0 0 |
| The Sequence $EDMGS^3_{right,176}(n)$, to be transmitted from left to right, up to down |
| 0 0 +j 0 0 0 -1 0 0 0 -1 0 0 0 -j 0 0 0 1 0 0 0 -1 0 0 0 -j 0 0 0 +j 0 0 0 -j 0 0 0 -1 0 0 0 +j 0 0 0 -j 0 0 0 -j 0 0 0 -1 0 0 0 +j 0 0 0 +j 0 0 0 1 0 0 0 1 0 0 0 1 0 0 0 +j 0 0 0 +j 0 0 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 1 0 |
| The Sequence $EDMGS^4_{left,176}(n)$, to be transmitted from left to right, up to down |
| 0 -j 0 0 0 1 0 0 0 1 0 0 0 +j 0 0 0 -1 0 0 0 1 0 0 0 +j 0 0 0 -j 0 0 0 +j 0 0 0 1 0 0 0 -j 0 0 0 +j 0 0 0 -j 0 0 0 +j 0 0 0 1 0 0 0 -j 0 0 0 -j 0 0 0 -1 0 0 0 -1 0 0 0 -1 0 0 0 -j 0 0 0 -j 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -1 0 0 0 -1 0 0 0 +j 0 0 0 +j 0 0 0 +j 0 0 0 -1 0 0 0 -1 0 0 |

FIG. 20

| The Sequence $EDMGS^5_{left,176}(n)$, to be transmitted from left to right, up to down |
|---|
| 0 1 0 0 0 +j 0 0 0 +j 0 0 0 -1 0 0 0 -j 0 0 0 +j 0 0 0 -1 0 0 1 0 0 0 -1 0 0 0 +j 0 0 0 1 0 0 0 -1 0 0 0 1 0 0 0 -1 0 0 0 +j 0 0 0 1 0 0 0 -j 0 0 0 -j 0 0 0 -j 0 0 0 1 0 0 0 1 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^5_{right,176}(n)$, to be transmitted from left to right, up to down |
|---|
| 0 0 1 0 0 0 +j 0 0 0 +j 0 0 0 -1 0 0 0 -j 0 0 0 +j 0 0 0 -1 0 0 1 0 0 0 -1 0 0 0 +j 0 0 0 1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 1 0 0 0 -1 0 0 0 -j 0 0 0 -j 0 0 0 1 0 0 0 +j 0 0 0 -j 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 0 1 0 |

| The Sequence $EDMGS^6_{left,176}(n)$, to be transmitted from left to right, up to down |
|---|
| 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 0 1 0 0 0 +j 0 0 0 +j 0 0 0 -1 0 0 0 -j 0 0 0 +j 0 0 -1 0 0 0 1 0 0 0 -1 0 0 0 +j 0 0 0 1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^6_{right,176}(n)$, to be transmitted from left to right, up to down |
|---|
| 0 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 1 0 0 0 -1 0 0 0 1 0 0 -j 0 0 0 -1 0 0 0 -1 0 0 0 +j 0 0 0 +j 0 0 0 +j 0 0 0 -1 0 0 0 -1 0 0 0 -1 0 0 0 -j 0 0 0 -j 0 0 0 1 0 0 0 +j 0 0 0 -j 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 0 1 0 |

| The Sequence $EDMGS^7_{left,176}(n)$, to be transmitted from left to right, up to down |
|---|
| 0 +j 0 0 0 -1 0 0 0 -1 0 0 0 -j 0 0 0 1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0 +j 0 0 0 +j 0 0 0 1 0 0 0 1 0 0 0 1 0 0 0 +j 0 0 0 +j 0 0 0 1 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^7_{right,176}(n)$, to be transmitted from left to right, up to down |
|---|
| 0 0 +j 0 0 0 -1 0 0 0 -1 0 0 0 -j 0 0 0 1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0 +j 0 0 0 +j 0 0 0 1 0 0 0 1 0 0 0 1 0 0 0 +j 0 0 0 +j 0 0 0 -1 0 0 0 -j 0 0 0 -j 0 0 0 1 0 0 0 +j 0 0 0 -j 0 0 0 1 0 0 0 -1 0 0 0 1 0 0 0 -j 0 0 0 -1 0 0 0 -1 0 0 0 1 0 0 0 -1 0 0 0 +j 0 0 0 1 0 0 0 1 0 0 0 -j 0 0 0 -j 0 0 0 -j 0 0 0 1 0 0 0 0 1 0 |

| The Sequence $EDMGS^8_{left,176}(n)$, to be transmitted from left to right, up to down |
|---|
| 0 -j 0 0 0 1 0 0 0 1 0 0 0 +j 0 0 0 -1 0 0 0 1 0 0 0 +j 0 0 0 -j 0 0 0 +j 0 0 0 1 0 0 0 -j 0 0 0 +j 0 0 0 -j 0 0 0 +j 0 0 0 1 0 0 0 -j 0 0 0 -j 0 0 0 -1 0 0 0 -1 0 0 0 -1 0 0 0 -j 0 0 0 -j 0 0 0 1 0 0 0 +j 0 0 0 +j 0 0 0 -1 0 0 0 -j 0 0 0 +j 0 0 0 -1 0 0 0 1 0 0 0 -1 0 0 0 +j 0 0 0 1 0 0 0 1 0 0 0 -1 0 0 0 1 0 0 0 -j 0 0 0 -1 0 0 0 -1 0 0 0 +j 0 0 0 +j 0 0 0 +j 0 0 0 -1 0 0 0 -1 0 0 |

FIG. 21

| The Sequence $EDMGS^1_{left,176}(n)$, to be transmitted from left to right, up to down |
|---|
| 0 +1 0 0 0 +j 0 0 0 +j 0 0 0 -1 0 0 0 -j 0 0 0 +j 0 0 0 -1 0 0 0 +1 0 0 0 -1 0 0 0 +j 0 0 0 +1 0 0 0 -1 0 0 0 +1 0 0 0 -1 0 0 0 +j 0 0<br>0 +1 0 0 0 +1 0 0 0 -j 0 0 0 -j 0 0 0 -j 0 0 0 +1 0 0 0 +1 0 0 0 +1 0 0 0 +j 0 0 0 +j 0 0 0 -1 0 0 0 -j 0 0 0 +j 0 0 0 -1 0 0 0 +1 0 0<br>0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^2_{left,176}(n)$, to be transmitted from left to right, up to down |
|---|
| 0 -1 0 0 0 -j 0 0 0 -j 0 0 0 +1 0 0 0 +j 0 0 0 -j 0 0 0 +1 0 0 0 -1 0 0 0 +1 0 0 0 -j 0 0 0 -1 0 0 0 +1 0 0 0 -1 0 0 0 +1 0 0 0 -j 0 0 0<br>-1 0 0 0 -1 0 0 0 +j 0 0 0 +j 0 0 0 +j 0 0 0 -1 0 0 0 -1 0 0 0 +1 0 0 0 +j 0 0 0 +j 0 0 0 -1 0 0 0 -j 0 0 0 +j 0 0 0 -1 0 0 0 +1 0 0 0 -<br>1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^3_{left,176}(n)$, to be transmitted from left to right, up to down |
|---|
| 0 +j 0 0 0 -1 0 0 0 -1 0 0 0 -j 0 0 0 +1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0<br>+j 0 0 0 +j 0 0 0 +1 0 0 0 +1 0 0 0 +1 0 0 0 +j 0 0 0 +j 0 0 0 +1 0 0 0 +j 0 0 0 +j 0 0 0 -1 0 0 0 -j 0 0 0 +j 0 0 0 -1 0 0 0 +1 0 0<br>0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^4_{left,176}(n)$, to be transmitted from left to right, up to down |
|---|
| 0 -j 0 0 0 +1 0 0 0 +1 0 0 0 +j 0 0 0 -1 0 0 0 +1 0 0 0 +j 0 0 0 -j 0 0 0 +j 0 0 0 +1 0 0 0 -j 0 0 0 +j 0 0 0 -j 0 0 0 +j 0 0 0 +1 0 0<br>0 -j 0 0 0 -j 0 0 0 -1 0 0 0 -1 0 0 0 -1 0 0 0 -j 0 0 0 -j 0 0 0 +1 0 0 0 +j 0 0 0 +j 0 0 0 -1 0 0 0 -j 0 0 0 +j 0 0 0 -1 0 0 0 +1 0 0 0 -<br>1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^5_{left,176}(n)$, to be transmitted from left to right, up to down |
|---|
| 0 +1 0 0 0 +j 0 0 0 +j 0 0 0 -1 0 0 0 -j 0 0 0 +j 0 0 0 -1 0 0 0 +1 0 0 0 -1 0 0 0 +j 0 0 0 +1 0 0 0 -1 0 0 0 +1 0 0 0 -1 0 0 0 +j 0 0<br>0 +1 0 0 0 +1 0 0 0 -j 0 0 0 -j 0 0 0 -j 0 0 0 +1 0 0 0 +1 0 0 0 +1 0 0 0 +j 0 0 0 +j 0 0 0 -1 0 0 0 -j 0 0 0 +j 0 0 0 -1 0 0 0 +1 0 0<br>0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^6_{left,176}(n)$, to be transmitted from left to right, up to down |
|---|
| 0 -1 0 0 0 -j 0 0 0 -j 0 0 0 +1 0 0 0 +j 0 0 0 -j 0 0 0 +1 0 0 0 -1 0 0 0 +1 0 0 0 -j 0 0 0 -1 0 0 0 +1 0 0 0 -1 0 0 0 +1 0 0 0 -j 0 0 0<br>-1 0 0 0 -1 0 0 0 +j 0 0 0 +j 0 0 0 +j 0 0 0 -1 0 0 0 -1 0 0 0 +1 0 0 0 +j 0 0 0 +j 0 0 0 -1 0 0 0 -j 0 0 0 +j 0 0 0 -1 0 0 0 +1 0 0 0 -<br>1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^7_{left,176}(n)$, to be transmitted from left to right, up to down |
|---|
| 0 +j 0 0 0 -1 0 0 0 -1 0 0 0 -j 0 0 0 +1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0<br>+j 0 0 0 +j 0 0 0 +1 0 0 0 +1 0 0 0 +1 0 0 0 +j 0 0 0 +j 0 0 0 +1 0 0 0 +j 0 0 0 +j 0 0 0 -1 0 0 0 -j 0 0 0 +j 0 0 0 -1 0 0 0 +1 0 0<br>0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

| The Sequence $EDMGS^8_{left,176}(n)$, to be transmitted from left to right, up to down |
|---|
| 0 -j 0 0 0 +1 0 0 0 +1 0 0 0 +j 0 0 0 -1 0 0 0 +1 0 0 0 +j 0 0 0 -j 0 0 0 +j 0 0 0 +1 0 0 0 -j 0 0 0 +j 0 0 0 -j 0 0 0 +j 0 0 0 +1 0 0<br>0 -j 0 0 0 -j 0 0 0 -1 0 0 0 -1 0 0 0 -1 0 0 0 -j 0 0 0 -j 0 0 0 +1 0 0 0 +j 0 0 0 +j 0 0 0 -1 0 0 0 -j 0 0 0 +j 0 0 0 -1 0 0 0 +1 0 0 0 -<br>1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0 0 |

FIG. 22

The Sequence $EDMGS^1_{right,176}(n)$, to be transmitted from left to right, up to down 0 0 +1 0 0 0 +j 0 0 0 +j 0 0 0 -1 0 0 0 -j 0 0 0 +j 0 0 0 -1 0 0 0 +1 0 0 0 -1 0 0 0 +j 0 0 0 +1 0 0 0 -1 0 0 0 +1 0 0 0 -1 0 0 0 +j 0
0 0 +1 0 0 0 +1 0 0 0 -j 0 0 0 -j 0 0 0 -j 0 0 0 +1 0 0 0 +1 0 0 0 -1 0 0 0 -j 0 0 0 -j 0 0 0 +1 0 0 0 +j 0 0 0 -j 0 0 0 +1 0 0 0 -1 0 0
0 +1 0 0 0 -j 0 0 0 -1 0 0 0 -1 0 0 0 +1 0 0 0 -1 0 0 0 +j 0 0 0 +1 0 0 0 +1 0 0 0 -j 0 0 0 -j 0 0 0 -j 0 0 0 +1 0 0 0 +1 0

The Sequence $EDMGS^2_{right,176}(n)$, to be transmitted from left to right, up to down 0 0 -1 0 0 0 -j 0 0 0 -j 0 0 0 +1 0 0 0 +j 0 0 0 -j 0 0 0 +1 0 0 0 -1 0 0 0 +1 0 0 0 -j 0 0 0 -1 0 0 0 +1 0 0 0 -1 0 0 0 +1 0 0 0 -j 0 0
0 -1 0 0 0 -1 0 0 0 +j 0 0 0 +j 0 0 0 +j 0 0 0 -1 0 0 0 -1 0 0 0 -1 0 0 0 -j 0 0 0 -j 0 0 0 +1 0 0 0 +j 0 0 0 -j 0 0 0 +1 0 0 0 -1 0 0 0
+1 0 0 0 -j 0 0 0 -1 0 0 0 -1 0 0 0 +1 0 0 0 -1 0 0 0 +j 0 0 0 +1 0 0 0 +1 0 0 0 -j 0 0 0 -j 0 0 0 -j 0 0 0 +1 0 0 0 +1 0

The Sequence $EDMGS^3_{right,176}(n)$, to be transmitted from left to right, up to down 0 0 +j 0 0 0 -1 0 0 0 -1 0 0 0 -j 0 0 0 +1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0
+j 0 0 0 +j 0 0 0 +1 0 0 0 +1 0 0 0 +1 0 0 0 +j 0 0 0 +j 0 0 0 -1 0 0 0 -j 0 0 0 -j 0 0 0 +1 0 0 0 +j 0 0 0 -j 0 0 0 +1 0 0 0 -1 0 0 0
+1 0 0 0 -j 0 0 0 -1 0 0 0 -1 0 0 0 +1 0 0 0 -1 0 0 0 +j 0 0 0 +1 0 0 0 +1 0 0 0 -j 0 0 0 -j 0 0 0 -j 0 0 0 +1 0 0 0 +1 0

The Sequence $EDMGS^4_{right,176}(n)$, to be transmitted from left to right, up to down 0 0 -j 0 0 0 +1 0 0 0 +1 0 0 0 +j 0 0 0 -1 0 0 0 +1 0 0 0 +j 0 0 0 -j 0 0 0 +j 0 0 0 +1 0 0 0 -j 0 0 0 +j 0 0 0 -j 0 0 0 +j 0 0 0 +1 0
0 0 -j 0 0 0 -j 0 0 0 -1 0 0 0 -1 0 0 0 -1 0 0 0 -j 0 0 0 -j 0 0 0 -1 0 0 0 -j 0 0 0 -j 0 0 0 +1 0 0 0 +j 0 0 0 -j 0 0 0 +1 0 0 0 -1 0 0 0
+1 0 0 0 -j 0 0 0 -1 0 0 0 -1 0 0 0 +1 0 0 0 -1 0 0 0 +j 0 0 0 +1 0 0 0 +1 0 0 0 -j 0 0 0 -j 0 0 0 -j 0 0 0 +1 0 0 0 +1 0

The Sequence $EDMGS^5_{right,176}(n)$, to be transmitted from left to right, up to down 0 0 -1 0 0 0 -j 0 0 0 -j 0 0 0 +1 0 0 0 +j 0 0 0 -j 0 0 0 +1 0 0 0 -1 0 0 0 +1 0 0 0 -j 0 0 0 -1 0 0 0 +1 0 0 0 -1 0 0 0 +1 0 0 0 -j 0 0
0 -1 0 0 0 -1 0 0 0 +j 0 0 0 +j 0 0 0 +j 0 0 0 -1 0 0 0 -1 0 0 0 +1 0 0 0 +j 0 0 0 -j 0 0 0 -1 0 0 0 -j 0 0 0 +j 0 0 0 -1 0 0 0 +1 0 0
0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0

The Sequence $EDMGS^6_{right,176}(n)$, to be transmitted from left to right, up to down 0 0 +1 0 0 0 +j 0 0 0 +j 0 0 0 -1 0 0 0 -j 0 0 0 +j 0 0 0 -1 0 0 0 +1 0 0 0 -1 0 0 0 +j 0 0 0 +1 0 0 0 -1 0 0 0 +1 0 0 0 -1 0 0 0 +j 0
0 0 +1 0 0 0 +1 0 0 0 -j 0 0 0 -j 0 0 0 -j 0 0 0 +1 0 0 0 +1 0 0 0 +1 0 0 0 +j 0 0 0 +j 0 0 0 -1 0 0 0 -j 0 0 0 +j 0 0 0 -1 0 0 0 +1 0
0 0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 -j 0 0 0 -1 0 0 0 -1 0

The Sequence $EDMGS^7_{right,176}(n)$, to be transmitted from left to right, up to down 0 0 -j 0 0 0 +1 0 0 0 +1 0 0 0 +j 0 0 0 -1 0 0 0 +1 0 0 0 +j 0 0 0 -j 0 0 0 +j 0 0 0 +1 0 0 0 -j 0 0 0 +j 0 0 0 -j 0 0 0 +j 0 0 0 +1 0
0 0 -j 0 0 0 -j 0 0 0 -1 0 0 0 -1 0 0 0 -1 0 0 0 -j 0 0 0 -j 0 0 0 +1 0 0 0 +j 0 0 0 +j 0 0 0 -1 0 0 0 -j 0 0 0 +j 0 0 0 -1 0 0 0 +1 0 0
-1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0

The Sequence $EDMGS^8_{right,176}(n)$, to be transmitted from left to right, up to down 0 0 +j 0 0 0 -1 0 0 0 -1 0 0 0 -j 0 0 0 +1 0 0 0 -1 0 0 0 -j 0 0 0 +j 0 0 0 -j 0 0 0 -1 0 0 0 +j 0 0 0 -j 0 0 0 +j 0 0 0 -j 0 0 0 -1 0 0 0
+j 0 0 0 +j 0 0 0 +1 0 0 0 +1 0 0 0 +1 0 0 0 +j 0 0 0 +j 0 0 0 +1 0 0 0 +j 0 0 0 +j 0 0 0 -1 0 0 0 -j 0 0 0 -j 0 0 0 -1 0 0 0 +1 0 0
0 -1 0 0 0 +j 0 0 0 +1 0 0 0 +1 0 0 0 -1 0 0 0 +1 0 0 0 -j 0 0 0 -1 0 0 0 -1 0 0 0 +j 0 0 0 +j 0 0 0 +j 0 0 0 -1 0 0 0 -1 0

FIG. 23

| The Sequence $EDMGS^1_{left,384}(n)$, to be transmitted from left to right, up to down |
|---|
| 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0<br>0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0<br>0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0<br>0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0<br>0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0<br>0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0<br>0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0<br>0 0 -1 0 0 0 +1 0 0 0 +1 0 0 0 +j 0 0 0 +1 0 |

| The Sequence $EDMGS^1_{right,384}(n)$, to be transmitted from left to right, up to down |
|---|
| 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0<br>0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1<br>0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1<br>0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0<br>0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0<br>0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0<br>0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0<br>+1 0 0 0 -1 0 0 0 -1 0 0 0 -j 0 0 0 -1 0 |

| The Sequence $EDMGS^2_{left,384}(n)$, to be transmitted from left to right, up to down |
|---|
| 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0<br>0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0<br>0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0<br>0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -<br>j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0<br>+1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0<br>0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0<br>0 -1 0 0 0 +1 0 0 0 +1 0 0 0 +j 0 0 0 +1 0 0 |

| The Sequence $EDMGS^2_{right,384}(n)$, to be transmitted from left to right, up to down |
|---|
| 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0<br>0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0<br>0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0<br>0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0<br>0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0<br>-1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1<br>0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1<br>0 0 0 -1 0 0 0 -1 0 0 0 -j 0 0 0 -1 0 |

FIG. 24

| The Sequence $EDMGS^3_{left,384}(n)$, to be transmitted from left to right, up to down |
|---|
| 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 |
| The Sequence $EDMGS^3_{right,384}(n)$, to be transmitted from left to right, up to down |
| 0 0 -1 0 0 0 -1 0 0 0 +1 0 0 0 -1 0 0 0 -j 0 0 0 -1 0 0 0 -1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +1 0 0 0 -1 0 0 0 -1 0 0 0 -j 0 0 0 -1 0 |
| The Sequence $EDMGS^4_{left,384}(n)$, to be transmitted from left to right, up to down |
| 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 -j 0 0 0 +1 0 0 0 -1 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 -1 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -j 0 0 0 +1 0 0 0 -1 0 0 0 -1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 +j 0 0 0 +1 0 0 |
| The Sequence $EDMGS^4_{right,384}(n)$, to be transmitted from left to right, up to down |
| 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 -1 0 0 0 +1 0 0 0 -1 0 0 0 -1 0 0 0 +1 0 0 0 +1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -1 0 0 0 +1 0 0 0 -1 0 0 0 -1 0 0 0 -1 0 0 0 +1 0 0 0 +1 0 0 0 +j 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 +j 0 0 0 +1 0 0 0 +1 0 0 0 -1 0 0 0 -1 0 0 0 -j 0 0 0 -1 0 |

FIG. 25

| The Sequence $EDMGS^5_{left,384}(n)$, to be transmitted from left to right, up to down |
|---|
| 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 |
| The Sequence $EDMGS^5_{right,384}(n)$, to be transmitted from left to right, up to down |
| 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 -1 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 +1 0 0 0 -1 0 0 0 -1 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -1 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 -1 0 0 0 -1 0 0 0 -1 0 0 0 -1 0 0 0 -j 0 0 0 -1 0 0 0 -1 0 0 0 -1 0 0 -1 0 0 0 -1 0 0 0 -j 0 0 0 -1 0 |
| The Sequence $EDMGS^6_{left,384}(n)$, to be transmitted from left to right, up to down |
| 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 +1 0 0 0 -1 0 0 0 -1 0 0 0 -j 0 0 0 -1 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 -j 0 0 0 -1 0 0 0 +1 0 0 0 +1 0 0 0 -1 0 0 0 +1 0 0 0 +1 0 0 -1 0 0 0 +1 0 0 0 +j 0 0 0 +1 0 0 0 -1 0 0 0 -1 0 0 0 -1 0 0 0 +1 0 0 0 +1 0 0 0 +j 0 0 0 0 -j 0 0 0 -1 0 0 0 -1 0 0 0 +1 0 0 0 +1 0 0 0 +1 0 0 0 -1 0 0 0 +1 0 0 0 +j 0 0 +1 0 0 0 +1 0 0 0 +1 0 0 0 -1 0 0 0 +1 0 0 0 +1 0 0 0 -1 0 0 0 -1 0 0 0 -1 0 0 -j 0 0 0 -1 0 0 0 -1 0 0 0 +1 0 0 0 -1 0 0 0 -j 0 0 0 -1 0 0 0 -1 0 0 0 -1 0 0 0 +1 0 0 0 -1 0 0 0 -j 0 0 0 +1 0 0 0 +1 0 0 +0 +1 0 0 0 -1 0 0 0 -1 0 0 0 +j 0 0 0 +1 0 0 |
| The Sequence $EDMGS^6_{right,384}(n)$, to be transmitted from left to right, up to down |
| 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 -1 0 0 0 -1 0 0 -1 0 0 0 +1 0 0 0 +j 0 0 0 +1 0 0 0 -1 0 0 -1 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +j 0 0 0 +1 0 0 0 +1 0 0 0 +1 0 0 0 +1 0 0 0 -1 0 0 0 +1 0 0 0 -j 0 0 -1 0 0 0 +1 0 0 0 +1 0 0 0 +1 0 0 0 +1 0 0 0 +1 0 0 0 -1 0 0 0 -1 0 0 0 -1 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -1 0 0 0 -j 0 0 0 -1 0 |

FIG. 26

| The Sequence $EDMGS^7_{left,384}(n)$, to be transmitted from left to right, up to down |
|---|
| 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 |

| The Sequence $EDMGS^7_{right,384}(n)$, to be transmitted from left to right, up to down |
|---|
| 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 +1 0 0 0 -1 0 0 0 -j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 |
| -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 |

| The Sequence $EDMGS^8_{left,384}(n)$, to be transmitted from left to right, up to down |
|---|
| 0 -1 0 0 0 -1 0 0 0 +1 0 0 0 -1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 -1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 -1 0 0 0 -j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 +1 0 0 0 -1 0 0 0 +1 0 0 0 +j 0 0 0 +1 0 0 |

| The Sequence $EDMGS^8_{right,384}(n)$, to be transmitted from left to right, up to down |
|---|
| 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -1 0 0 0 -j 0 0 0 -1 0 0 0 +1 0 0 0 +1 0 0 0 -1 0 0 0 +j 0 0 0 +1 0 0 0 +1 0 0 0 -1 0 0 0 -1 0 0 0 +j 0 0 0 +1 0 0 0 -1 0 0 0 -1 0 0 0 +1 0 0 0 +1 0 0 0 +1 0 0 0 -1 0 0 0 +1 0 0 0 +j 0 0 0 +1 0 0 0 -1 0 0 0 -1 0 0 0 -1 0 0 0 +1 0 0 0 +1 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 +1 0 0 0 +1 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 |

FIG. 27

The Sequence $EDMGS^1_{left,385}(n)$, to be transmitted from left to right, up to down 0 0 +1 0 0 0 +1 0 0 0 -1 0 0 0 +1 0 0 0 +j 0 0 0 +1 0 0 0 +1 0 0 0 -1 0 0 0 -1 0 0 0 -1 0 0 0 -j 0 0 0 -1 0 0 0 +1 0 0
0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0
0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -
1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0
0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0
0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1
0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1
0 0 0 +1 0 0 0 +j 0 0 0 +1 0 0

The Sequence $EDMGS^2_{left,385}(n)$, to be transmitted from left to right, up to down 0 0 -1 0 0 0 -1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0
+1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0
+1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1
0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0
-1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -
1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0
+1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 +1
0 0 0 +1 0 0 0 +j 0 0 0 +1 0 0

The Sequence $EDMGS^3_{left,385}(n)$, to be transmitted from left to right, up to down 0 0 -1 0 0 0 -1 0 0 0 -1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -
1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0
0 0 -1 0 0 0 -j 0 0 0 -1 0 0 0 +1 0 0 0 -1 0 0 0 -1 0 0 0 -j 0 0 0 -1 0 0 0 +1 0 0 0 +1 0 0 0 -1 0 0 0 -1 0 0 0 +1 0 0 0
+j 0 0 0 +1 0 0 0 +1 0 0 0 +1 0 0 0 -1 0 0 0 -1 0 0 0 -j 0 0 0 -1 0 0 0 -1 0 0 0 -1 0 0 0 -1 0 0 0 -1 0 0 0 -j 0 0 0 -1 0
0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -
1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0
+1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1
0 0 0 +j 0 0 0 +1 0 0

The Sequence $EDMGS^4_{left,385}(n)$, to be transmitted from left to right, up to down 0 0 +1 0 0 0 +1 0 0 0 -1 0 0 0 +1 0 0 0 +j 0 0 0 +1 0 0 0 -1 0 0 0 -1 0 0 0 +1 0 0 0 -1 0 0 0 +j 0 0 0 +1 0 0 0 -1 0 0
0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -
1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0
+1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -j 0 0 0 -1 0 0
0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0
+1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0
0 0 +1 0 0 0 +j 0 0 0 +1 0 0

FIG. 28

| The Sequence $EDMGS^5_{left,385}(n)$, to be transmitted from left to right, up to down |
|---|
| 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 +1 0 0 0 -1 0 0 0 +1 0 0 0 +j 0 0 0 +1 0 0 0 +1 0 0 0 +1 0 |
| The Sequence $EDMGS^6_{left,385}(n)$, to be transmitted from left to right, up to down |
| 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 -1 0 0 0 +1 0 0 0 +j 0 0 0 +1 0 0 0 +1 0 0 0 +1 0 0 -1 0 0 0 -1 0 0 0 -j 0 0 0 -1 0 0 0 +1 0 0 0 +1 0 0 0 -1 0 0 0 -1 0 0 0 -1 0 0 0 +1 0 0 0 +1 0 0 0 +1 0 0 0 -1 0 0 0 -1 0 0 0 -j 0 0 -1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 |
| The Sequence $EDMGS^7_{left,385}(n)$, to be transmitted from left to right, up to down |
| 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -1 0 0 0 -j 0 0 0 -1 0 0 0 +1 0 0 0 +1 0 0 0 +j 0 0 0 +1 0 0 0 -1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 -1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 +j 0 0 0 +1 0 0 |
| The Sequence $EDMGS^8_{left,385}(n)$, to be transmitted from left to right, up to down |
| 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 +1 0 0 0 -1 0 0 0 -1 0 0 0 +1 0 0 0 +j 0 0 0 +1 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 +1 0 0 0 +j 0 0 0 +1 0 0 |

FIG. 29

| The Sequence $EDMGS^1_{right,385}(n)$, to be transmitted from left to right, up to down |
|---|
| 0 0 +1 0 0 0 +1 0 0 0 -1 0 0 0 +1 0 0 0 +j 0 0 0 +1 0 0 0 +1 0 0 0 -1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 -j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -1 0 0 0 +1 0 0 0 +1 0 0 0 -j 0 0 0 +1 0 0 0 +1 0 0 0 +1 0 0 0 +1 0 0 0 -1 0 0 0 -1 0 0 0 -1 0 0 0 -j 0 0 0 -1 0 0 0 +1 0 0 0 +1 0 0 0 +1 0 0 0 -1 0 0 0 0 -1 0 0 0 -j 0 0 0 -1 0 0 |
| The Sequence $EDMGS^2_{right,385}(n)$, to be transmitted from left to right, up to down |
| 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -1 0 0 0 -1 0 0 0 -j 0 0 0 -1 0 0 |
| The Sequence $EDMGS^3_{right,385}(n)$, to be transmitted from left to right, up to down |
| 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 +1 0 0 0 -1 0 0 0 -j 0 0 0 -1 0 0 0 +1 0 0 0 +1 0 0 0 -1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 +1 0 0 0 -1 0 0 0 +1 0 0 0 +j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -1 0 0 0 +1 0 0 0 +1 0 0 0 -1 0 0 0 -1 0 0 0 -j 0 0 0 -1 0 0 0 -1 0 0 0 +1 0 0 0 +1 0 0 0 +1 0 0 0 -1 0 0 0 -1 0 0 0 -1 0 0 0 +1 0 0 0 +j 0 0 0 +1 0 0 0 +1 0 0 0 +1 0 0 0 +1 0 0 0 -1 0 0 0 -1 0 0 0 -j 0 0 0 -1 0 0 |
| The Sequence $EDMGS^4_{right,385}(n)$, to be transmitted from left to right, up to down |
| 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 +1 0 0 0 +j 0 0 0 +1 0 0 0 -1 0 0 0 -1 0 0 0 -1 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 -j 0 0 0 -1 0 0 0 +1 0 0 0 +1 0 0 0 -1 0 0 0 -1 0 0 0 +1 0 0 0 +j 0 0 0 +1 0 0 0 0 0 -1 0 0 0 +1 0 0 0 +1 0 0 0 -1 0 0 0 -1 0 0 0 -1 0 0 0 -j 0 0 0 -1 0 0 0 +1 0 0 0 +1 0 0 0 -1 0 0 0 -1 0 0 0 -1 0 0 0 +1 0 0 0 +j 0 0 0 +1 0 0 0 -1 0 0 0 -1 0 0 0 -1 0 0 0 +1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -1 0 0 0 +1 0 0 0 +1 0 0 0 +1 0 0 0 -1 0 0 0 -1 0 0 0 -j 0 0 0 -1 0 0 |

FIG. 30

The Sequence $EDMGS^5_{right,385}(n)$, to be transmitted from left to right, up to down 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 +1 0 0 0 +1 0 0 0 +1 0 0 0 -1 0 0 0 -1 0 0 0 -j 0 0 0 -1 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0

The Sequence $EDMGS^6_{right,385}(n)$, to be transmitted from left to right, up to down 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 -1 0 0 0 -1 0 0 0 -1 0 0 0 -j 0 0 0 +1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 +1 0 0 0 -1 0 0 0 -1 0 0 0 -1 0 0 0 +1 0 0 0 -1 0 0 0 -j 0 0 0 -1 0 0

The Sequence $EDMGS^7_{right,385}(n)$, to be transmitted from left to right, up to down 0 0 +1 0 0 0 +1 0 0 0 -1 0 0 0 -1 0 0 0 -j 0 0 0 -1 0 0 0 -1 0 0 0 -1 0 0 0 +1 0 0 0 -1 0 0 0 -j 0 0 0 -1 0 0 0 +1 0 0 0 +1 0 0 0 -1 0 0 0 -1 0 0 0 -1 0 0 0 -j 0 0 0 -1 0 0 0 +1 0 0 0 +1 0 0 0 +1 0 0 0 -1 0 0 0 -j 0 0 0 -1 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 -1 0 0 0 -j 0 0 0 -1 0 0

The Sequence $EDMGS^8_{right,385}(n)$, to be transmitted from left to right, up to down 0 0 -1 0 0 0 -1 0 0 0 +1 0 0 0 +1 0 0 0 +j 0 0 0 +1 0 0 0 +1 0 0 0 +1 0 0 0 -1 0 0 0 +1 0 0 0 +j 0 0 0 +1 0 0 0 +1 0 0 0 0 +1 0 0 0 -1 0 0 0 -1 0 0 0 -j 0 0 0 -1 0 0 0 +1 0 0 0 +1 0 0 0 -1 0 0 0 +1 0 0 0 +j 0 0 0 +1 0 0 0 +1 0 0 0 +1 0 0 0 -1 0 0 0 -1 0 0 0 -j 0 0 0 -1 0 0 0 +1 0 0 0 +1 0 0 0 -1 0 0 0 -1 0 0 0 -1 0 0 0 -j 0 0 0 -1 0 0 0 -1 0 0 0 +1 0 0 0 -1 0 0 0 -j 0 0 0 -1 0 0 0 -1 0 0 0 -1 0 0 0 +1 0 0 0 +1 0 0 0 +j 0 0 0 +1 0 0 0 +1 0 0 0 +1 0 0 0 -1 0 0 0 -1 0 0 0 +1 0 0 0 +1 0 0 0 +j 0 0 0 +1 0 0 0 -1 0 0 0 -1 0 0 0 -1 0 0 0 -j 0 0 0 -1 0 0 0 -1 0 0 0 -1 0 0 0 +1 0 0 0 +1 0 0 0 +j 0 0 0 +1 0 0 0 -1 0 0 0 -1 0 0 0 +1 0 0 0 0 -1 0 0 0 -j 0 0 0 -1 0 0

METHOD FOR TRANSMITTING AND RECEIVING SIGNAL IN WLAN SYSTEM AND DEVICE THEREFOR

CROSS-REFERENCE TO RELATED APPLICATIONS

This application is the National Stage filing under 35 U.S.C. 371 of International Application No. PCT/KR2017/014698, filed on Dec. 14, 2017, which claims the benefit of U.S. Provisional Application No. 62/444,388, filed on Jan. 10, 2017, 62/468,381, filed on Mar. 8, 2017, 62/471,876, filed on Mar. 15, 2017, 62/486,994, filed on Apr. 19, 2017, and 62/491,270, filed on Apr. 28, 2017, the contents of which are all hereby incorporated by reference herein in their entirety.

BACKGROUND OF THE INVENTION

Field of the Invention

The following description relates to a method for transmitting and receiving a signal in a wireless LAN (WLAN) system, and, more particularly, in a case where a station transmits and receives a signal through one or two bonded channels, the following description relates to a method for transmitting and receiving a signal, which configures an EDMG (Enhanced Directional Multi Gigabit (EDMG) Short Training Field (STF) field for an Orthogonal Frequency Division Multiplexing (OFDM) packet, and which transmits and receives a signal including the configured EDMG STF field, and a device for the same.

Related Art

A standard for the wireless LAN technology is being developed as an Institute of Electrical and Electronics Engineers (IEEE) 802.11 standard. IEEE 802.11a and b use an unlicensed band in 2.4. GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

Meanwhile, the IEEE 802.11ad system regulates a capability enhancement for an ultra-high speed throughput in a 60 GHz band, and, for the first time, in the above-described IEEE 802.11ad system, discussions are being made on an IEEE 802.11ay for adopting channel bonding and MIMO techniques.

SUMMARY OF THE INVENTION

Technical Objects

In an 11ay system that can apply the present invention, a station may transmit and receive a signal through one or two bonded channels (i.e., a 2-channel bonded channel).

At this point, in case the station transmits and receives a signal through the bonded channels, the present invention proposes a method for configuring an EDMG STF field for an OFDM packet and for transmitting and receiving a signal including the configured EDMG STF field, and a device for the same.

Technical Solutions

In order to achieve the above-described object, according to an aspect of the present invention, proposed herein is a method for transmitting, by a first station (STA), a signal through one or two bonded channels to a second station (STA) in a wireless LAN (WLAN) system including the steps of generating an Enhanced Directional Multi Gigabit (EDMG) Short Training Field (STF) field being transmitted in an Orthogonal Frequency Division Multiplexing (OFDM) mode based on a number of channels and a space-time stream index being included in a bonded channel through which an EDMG Physical Protocol Data Unit (PPDU) is transmitted, and transmitting the EDMG PPDU including the EDMG STF field being transmitted in the OFDM mode through a space-time stream within the one or two bonded channels to the second STA. Herein, an EDMG STF sequence for each space-time stream being included in the EDMG STF field may be configured to have a format of A, 0, 0, 0, B, and A and B may respectively indicate sequences each having a different length according to the number of channels being included in the bonded channels, A and B of each space-time stream may be respectively orthogonal to A and B of another space-time stream, and values other than 0 being included in A and B have a configuration, in which values of a first sequence and a second sequence, each having a different length according to the number of channels being included in the bonded channels, may be repeatedly positioned after being added with a weight according to a predetermined rule.

According to another aspect of the present invention, proposed herein is a method for receiving, by a first station (STA), a signal through one or two bonded channels from a second station (STA) in a wireless LAN (WLAN) system including the steps of receiving an Enhanced Directional Multi Gigabit (EDMG) PPDU including an EDMG Short Training Field (STF) field being generated based on a number of channels and a space-time stream index being included in a bonded channel through which an EDMG Physical Protocol Data Unit (PPDU) is transmitted, and being transmitted in the OFDM mode through a space-time stream within the one or two bonded channels from the second STA. Herein, an EDMG STF sequence for each space-time stream being included in the EDMG STF field may be configured to have a format of A, 0, 0, 0, B, and A and B may respectively indicate sequences each having a different length according to the number of channels being included in the bonded channels, A and B of each space-time stream may be respectively orthogonal to A and B of another space-time stream, and values other than 0 being included in A and B have a configuration, in which values of a first sequence and a second sequence, each having a different length according to the number of channels being included in the bonded channels, may be repeatedly positioned after being added with a weight according to a predetermined rule.

According to yet another aspect of the present invention, proposed herein is a station device for transmitting a signal through one or two bonded channels in a wireless LAN (WLAN) system including a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device, wherein the processor may be configured to generate an Enhanced Directional Multi Gigabit (EDMG) Short Training Field (STF) field being transmitted in an Orthogonal Frequency Division Multiplexing (OFDM) mode based on a number of channels and a space-time stream index being included in a bonded channel through which an EDMG Physical Protocol Data Unit (PPDU) is transmitted, and to transmit the EDMG PPDU including the EDMG STF field being transmitted in the OFDM mode through a space-time stream within the one or two bonded channels to a second station (STA). Herein, an EDMG STF sequence for each space-time stream being included in the EDMG STF field may be configured to have a format of A, 0, 0, 0, B, and A and B may respectively indicate sequences each having a different length according to the number of channels being included in the bonded channels, A and B of each space-time stream may be respectively orthogonal to A and B of another space-time stream, and values other than 0 being included in A and B have a configuration, in which values of a first sequence and a second sequence, each having a different length according to the number of channels being included in the bonded channels, may be repeatedly positioned after being added with a weight according to a predetermined rule.

According to a further aspect of the present invention, proposed herein is a station device for receiving a signal through one or two bonded channels in a wireless LAN (WLAN) system including a transmitting/receiving unit having one or more radio frequency (RF) chains and being configured to transmit/receive a signal to/from another station device, and a processor being operatively connected to the transmitting/receiving unit and performing signal processing of a signal transmitted/received to/from the other station device, wherein the processor may be configured to receive an Enhanced Directional Multi Gigabit (EDMG) PPDU including an EDMG Short Training Field (STF) field being generated based on a number of channels and a space-time stream index being included in a bonded channel through which an EDMG Physical Protocol Data Unit (PPDU) is transmitted, and being transmitted in the OFDM mode through a space-time stream within the one or two bonded channels from a second station (STA). Herein, an EDMG STF sequence for each space-time stream being included in the EDMG STF field may be configured to have a format of A, 0, 0, 0, B, and A and B may respectively indicate sequences each having a different length according to the number of channels being included in the bonded channels, A and B of each space-time stream may be respectively orthogonal to A and B of another space-time stream, and values other than 0 being included in A and B have a configuration, in which values of a first sequence and a second sequence, each having a different length according to the number of channels being included in the bonded channels, may be repeatedly positioned after being added with a weight according to a predetermined rule.

In the above-described configurations, the EDMG STF field may be configured of 6 OFDM symbol lengths.

For example, a number of channels being included in the bonded channels through which the EDMG PPDU is transmitted may be equal to 1. In this case, detailed technical characteristics will be described below.

Firstly, A and B may be configured as 176-length sequences.

Values other than 0 being included in such A and B may have a configuration, in which values of the first sequence and the second sequence, each having a length of 11, are repeatedly positioned after being added with a weight according to a predetermined rule.

Additionally, a maximum of 8 space-time streams may be used, and the first sequence ($A_0^{iSTS}(n)$) and the second sequence ($B_0^{iSTS}(n)$) of each space-time stream ($i_{STS}$) may each be configured to have a sequence as shown below in Equation 21.

$$A_0^{iSTS}(n)=[+1,+j,+j,-1,-j,+j,-1,+1,-1,+j,+1]$$

$$B_0^{iSTS}(n)=[-1,+1,-1,+j,+1,+1,-j,-j,-j,+1,+1] \quad \text{[Equation 21]}$$

Values other than 0 being included in A and B may be configured of sequences of $A_2^{iSTS}(n)$ and $B_2^{iSTS}(n)$, each being determined by Equation 22 shown below.

$$A_k^{iSTS}(n)=[W_k^{iSTS}A_{k-1}^{iSTS}(n),B_{k-1}^{iSTS}(n)]$$

$$B_k^{iSTS}(n)=[W_k^{iSTS}A_{k-1}^{iSTS}(n),-B_{k-1}^{iSTS}(n)] \quad \text{[Equation 22]}$$

The $W_k^{iSTS}$ for each space-time stream shown in Equation 22 may be determined as shown below in Table 21.

TABLE 21

| Space-time stream number | $W_k^{iSTS}$ |
| --- | --- |
| 1 | [+1, +1] |
| 2 | [+1, −1] |
| 3 | [+1, +j] |
| 4 | [+1, −j] |
| 5 | [+1, +1] |
| 6 | [+1, −1] |
| 7 | [+1, +j] |
| 8 | [+1, −j] |

Additionally, A and B of each space-time stream may respectively include a 0, 0, 0 sequence between the values other than 0.

Most particularly, A of each space-time stream may include a 0 sequence being positioned in a foremost position and a 0, 0 sequence being positioned in a rearmost position, and B of each space-time stream may include a 0, 0 sequence being positioned in a foremost position and a 0 sequence being positioned in a rearmost position.

A for each space-time stream ($I_{STS}$), which is configured as described above, may be indicated as shown below in Table 22 and Table 23.

TABLE 22

| $I_{STS}$ | A |
| --- | --- |
| 1 | 0 +1 0 0 0 +j 0 0 0 +j 0 0 0 −1 0 0 0 −j 0 0 0 +j 0 0 0 −1 0 0 0 +1 0 0 |
| | 0 −1 0 0 0 +j 0 0 0 +1 0 0 0 −1 0 0 0 +1 0 0 0 −1 0 0 0 +j 0 0 0 +1 0 0 |
| | 0 +1 0 0 0 −j 0 0 0 −j 0 0 0 −j 0 0 0 +1 0 0 0 +1 0 0 0 +1 0 0 0 +j 0 0 |
| | 0 +j 0 0 0 −1 0 0 0 −j 0 0 0 +j 0 0 0 −1 0 0 0 +1 0 0 0 −1 0 0 0 +j 0 0 |
| | 0 +1 0 0 0 +1 0 0 0 −1 0 0 0 +1 0 0 0 −j 0 0 0 −1 0 0 0 −1 0 0 0 +j 0 0 |
| | 0 +1 0 0 0 +1 0 0 0 −1 0 0 0 −1 0 0 |

TABLE 22-continued

| $I_{STS}$ | A |
|---|---|
| 2 | 0 −1 0 0 0 −j 0 0 0 −j 0 0 0 +1 0 0 0 +j 0 0 0 −j 0 0 0 +1 0 0 0 −1 0 0<br>0 +1 0 0 0 −j 0 0 0 −1 0 0 0 +1 0 0 0 −1 0 0 0 +1 0 0 0 −j 0 0 0 −1 0 0<br>0 −1 0 0 0 +j 0 0 0 +j 0 0 0 +j 0 0 0 −1 0 0 0 −1 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |
| 3 | 0 +j 0 0 0 −1 0 0 0 −1 0 0 0 −j 0 0 0 +1 0 0 0 −1 0 0 0 −j 0 0 0 +j 0 0<br>0 −j 0 0 0 −1 0 0 0 +j 0 0 0 −j 0 0 0 +j 0 0 0 −j 0 0 0 −1 0 0 0 +j 0 0<br>0 +j 0 0 0 +1 0 0 0 +1 0 0 0 +1 0 0 0 +j 0 0 0 +j 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |
| 4 | 0 −j 0 0 0 +1 0 0 0 +1 0 0 0 +j 0 0 0 −1 0 0 0 +1 0 0 0 +j 0 0 0 −j 0 0<br>0 +j 0 0 0 +1 0 0 0 −j 0 0 0 +j 0 0 0 −j 0 0 0 +j 0 0 0 +1 0 0 0 −j 0 0<br>0 −j 0 0 0 −1 0 0 0 −1 0 0 0 −1 0 0 0 −j 0 0 0 −j 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |

TABLE 23

| $I_{STS}$ | A |
|---|---|
| 5 | 0 +1 0 0 0 +j 0 0 0 +j 0 0 0 −1 0 0 0 −j 0 0 0 +j 0 0 0 −1 0 0 0 +1 0 0<br>0 −1 0 0 0 +j 0 0 0 +1 0 0 0 −1 0 0 0 +1 0 0 0 −1 0 0 0 +j 0 0 0 +1 0 0<br>0 +1 0 0 0 −j 0 0 0 −j 0 0 0 −j 0 0 0 +1 0 0 0 +1 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |
| 6 | 0 −1 0 0 0 −j 0 0 0 −j 0 0 0 +1 0 0 0 +j 0 0 0 −j 0 0 0 +1 0 0 0 −1 0 0<br>0 +1 0 0 0 −j 0 0 0 −1 0 0 0 +1 0 0 0 −1 0 0 0 +1 0 0 0 −j 0 0 0 −1 0 0<br>0 −1 0 0 0 +j 0 0 0 +j 0 0 0 +j 0 0 0 −1 0 0 0 −1 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |
| 7 | 0 +j 0 0 0 −1 0 0 0 −1 0 0 0 −j 0 0 0 +1 0 0 0 −1 0 0 0 −j 0 0 0 +j 0 0<br>0 −j 0 0 0 −1 0 0 0 +j 0 0 0 −j 0 0 0 +j 0 0 0 −j 0 0 0 −1 0 0 0 +j 0 0<br>0 +j 0 0 0 +1 0 0 0 +1 0 0 0 +1 0 0 0 +j 0 0 0 +j 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |
| 8 | 0 −j 0 0 0 +1 0 0 0 +1 0 0 0 +j 0 0 0 −1 0 0 0 +1 0 0 0 +j 0 0 0 −j 0 0<br>0 +j 0 0 0 +1 0 0 0 −j 0 0 0 +j 0 0 0 −j 0 0 0 +j 0 0 0 +1 0 0 0 −j 0 0<br>0 −j 0 0 0 −1 0 0 0 −1 0 0 0 −1 0 0 0 −j 0 0 0 −j 0 0 0 +1 0 0 0 +j 0 0<br>0 +j 0 0 0 −1 0 0 0 −j 0 0 0 +j 0 0 0 −1 0 0 0 +1 0 0 0 −1 0 0 0 +j 0 0<br>0 +1 0 0 0 +1 0 0 0 −1 0 0 0 +1 0 0 0 −j 0 0 0 −1 0 0 0 −1 0 0 0 +j 0 0<br>0 +1 0 0 0 +1 0 0 0 −1 0 0 0 −1 0 0 |

B for each space-time stream ($I_{STS}$) may be configured to be indicated as shown below in Table 24 and Table 25.

TABLE 24

| $I_{STS}$ | B |
|---|---|
| 1 | 0 0 +1 0 0 0 +j 0 0 0 +j 0 0 0 −1 0 0 0 −j 0 0 0 +j 0 0 0 −1 0 0 0 +1 0<br>0 0 −1 0 0 0 +j 0 0 0 +1 0 0 0 −1 0 0 0 +1 0 0 0 −1 0 0 0 +j 0 0 0 +1 0<br>0 0 +1 0 0 0 −j 0 0 0 −j 0 0 0 −j 0 0 0 +1 0 0 0 +1 0 0 0 −1 0 0 0 −j 0<br>0 0 −j 0 0 0 +1 0 0 0 +j 0 0 0 −j 0 0 0 +1 0 0 0 −1 0 0 0 +1 0 0 0 −j 0<br>0 0 −1 0 0 0 −1 0 0 0 +1 0 0 0 +1 0 0 0 +j 0 0 0 +1 0 0 0 +1 0 0 0 −j 0<br>0 0 −1 0 0 0 −1 0 0 0 +1 0 0 0 +1 0 |
| 2 | 0 0 −1 0 0 0 −j 0 0 0 −j 0 0 0 +1 0 0 0 +j 0 0 0 −j 0 0 0 +1 0 0 0 −1 0<br>0 0 +1 0 0 0 −j 0 0 0 −1 0 0 0 +1 0 0 0 −1 0 0 0 +1 0 0 0 −j 0 0 0 −1 0<br>0 0 −1 0 0 0 +j 0 0 0 +j 0 0 0 +j 0 0 0 −1 0 0 0 −1 0 0 0 −1 0 0 0 −j 0<br>0 0 −j 0 0 0 +1 0 0 0 +j 0 0 0 −j 0 0 0 +1 0 0 0 −1 0 0 0 +1 0 0 0 −j 0<br>0 0 −1 0 0 0 −1 0 0 0 +1 0 0 0 −1 0 0 0 +j 0 0 0 +1 0 0 0 +1 0 0 0 −j 0<br>0 0 −1 0 0 0 −1 0 0 0 +1 0 0 0 +1 0 |
| 3 | 0 0 +j 0 0 0 −1 0 0 0 −1 0 0 0 −j 0 0 0 +1 0 0 0 −1 0 0 0 −j 0 0 0 +j 0<br>0 0 −j 0 0 0 −1 0 0 0 +j 0 0 0 −j 0 0 0 +j 0 0 0 −j 0 0 0 −1 0 0 0 +j 0<br>0 0 +j 0 0 0 +1 0 0 0 +1 0 0 0 +1 0 0 0 +j 0 0 0 +j 0 0 0 −1 0 0 0 −j 0<br>0 0 −j 0 0 0 +1 0 0 0 +j 0 0 0 −j 0 0 0 +1 0 0 0 −1 0 0 0 +1 0 0 0 −j 0<br>0 0 −1 0 0 0 −1 0 0 0 +1 0 0 0 −1 0 0 0 +j 0 0 0 +1 0 0 0 +1 0 0 0 −j 0<br>0 0 −1 0 0 0 −1 0 0 0 +1 0 0 0 +1 0 |

TABLE 24-continued

| $I_{STS}$ | B |
|---|---|
| 4 | 0 0 -j 0 0 0 +1 0 0 0 +1 0 0 0 +j 0 0 0 -1 0 0 0 +1 0 0 0 +j 0 0 0 -j 0<br>0 0 +j 0 0 0 +1 0 0 0 -j 0 0 0 +j 0 0 0 -j 0 0 0 +j 0 0 0 +1 0 0 0 -j 0<br>0 0 -j 0 0 0 -1 0 0 0 -1 0 0 0 -1 0 0 0 -j 0 0 0 -j 0 0 0 -1 0 0 0 -j 0<br>0 0 -j 0 0 0 +1 0 0 0 +j 0 0 0 -j 0 0 0 +1 0 0 0 -1 0 0 0 +1 0 0 0 -j 0<br>0 0 -1 0 0 0 -1 0 0 0 +1 0 0 0 -1 0 0 0 +j 0 0 0 +1 0 0 0 +1 0 0 0 -j 0<br>0 0 -1 0 0 0 -1 0 0 0 +1 0 0 0 +1 0 |

TABLE 25

| $I_{STS}$ | B |
|---|---|
| 5 | 0 0 -1 0 0 0 -j 0 0 0 -j 0 0 0 +1 0 0 0 +j 0 0 0 -j 0 0 0 +1 0 0 0 -1 0<br>0 0 +1 0 0 0 -j 0 0 0 -1 0 0 0 +1 0 0 0 -1 0 0 0 +1 0 0 0 -j 0 0 0 -1 0<br>0 0 -1 0 0 0 +j 0 0 0 +j 0 0 0 +j 0 0 0 -1 0 0 0 -1 0 0 0 +1 0 0 0 +j 0<br>0 0 +j 0 0 0 -1 0 0 0 -j 0 0 0 +j 0 0 0 -1 0 0 0 +1 0 0 0 -1 0 0 0 +j 0<br>0 0 +1 0 0 0 +1 0 0 0 -1 0 0 0 +1 0 0 0 -j 0 0 0 -1 0 0 0 -1 0 0 0 +j 0<br>0 0 +1 0 0 0 +1 0 0 0 -1 0 0 0 -1 0 |
| 6 | 0 0 +1 0 0 0 +j 0 0 0 +j 0 0 0 -1 0 0 0 -j 0 0 0 +j 0 0 0 -1 0 0 0 +1 0<br>0 0 -1 0 0 0 +j 0 0 0 +1 0 0 0 -1 0 0 0 +1 0 0 0 -1 0 0 0 +j 0 0 0 +1 0<br>0 0 +1 0 0 0 -j 0 0 0 -j 0 0 0 -j 0 0 0 +1 0 0 0 +1 0 0 0 +1 0 0 0 0 +j 0<br>0 0 +j 0 0 0 -1 0 0 0 -j 0 0 0 +j 0 0 0 -1 0 0 0 +1 0 0 0 -1 0 0 0 +j 0<br>0 0 +1 0 0 0 +1 0 0 0 -1 0 0 0 +1 0 0 0 -j 0 0 0 -1 0 0 0 -1 0 0 0 +j 0<br>0 0 +1 0 0 0 +1 0 0 0 -1 0 0 0 -1 0 |
| 7 | 0 0 -j 0 0 0 +1 0 0 0 +1 0 0 0 +j 0 0 0 -1 0 0 0 +1 0 0 0 +j 0 0 0 -j 0<br>0 0 +j 0 0 0 +1 0 0 0 -j 0 0 0 +j 0 0 0 -j 0 0 0 +j 0 0 0 +1 0 0 0 -j 0<br>0 0 -j 0 0 0 -1 0 0 0 -1 0 0 0 -1 0 0 0 -j 0 0 0 -j 0 0 0 -1 0 0 0 +j 0<br>0 0 +j 0 0 0 -1 0 0 0 -j 0 0 0 +j 0 0 0 -1 0 0 0 +1 0 0 0 -1 0 0 0 +j 0<br>0 0 +1 0 0 0 +1 0 0 0 -1 0 0 0 +1 0 0 0 -j 0 0 0 -1 0 0 0 -1 0 0 0 +j 0<br>0 0 +1 0 0 0 +1 0 0 0 -1 0 0 0 -1 0 |
| 8 | 0 0 +j 0 0 0 -1 0 0 0 -1 0 0 0 -j 0 0 0 +1 0 0 0 -1 0 0 0 -j 0 0 0 +j 0<br>0 0 -j 0 0 0 -1 0 0 0 +j 0 0 0 -j 0 0 0 +j 0 0 0 -j 0 0 0 -1 0 0 0 +j 0<br>0 0 +j 0 0 0 +1 0 0 0 +1 0 0 0 +1 0 0 0 +j 0 0 0 +j 0 0 0 +1 0 0 0 +j 0<br>0 0 +j 0 0 0 -1 0 0 0 -j 0 0 0 +j 0 0 0 -1 0 0 0 +1 0 0 0 -1 0 0 0 +j 0<br>0 0 +1 0 0 0 +1 0 0 0 -1 0 0 0 +1 0 0 0 -j 0 0 0 -1 0 0 0 -1 0 0 0 +j 0<br>0 0 +1 0 0 0 +1 0 0 0 -1 0 0 0 -1 0 |

As another example, a number of channels being included in the bonded channels through which the EDMG PPDU is transmitted may be equal to 2. In this case, detailed technical characteristics will be described below.

Firstly, A and B may be configured as 385-length sequences.

Values other than 0 being included in such A and B may have a configuration, in which values of the first sequence and the second sequence, each having a length of 3, are repeatedly positioned after being added with a weight according to a predetermined rule.

Additionally, a maximum of 8 space-time streams may be used, and the first sequence ($A_0^{iSTS}(n)$) and the second sequence ($B_0^{iSTS}(n)$) of each space-time stream ($i_{STS}$) may each be configured to have a sequence as shown below in Equation 23.

$$A_0^{iSTS}(n) = [+1, +1, -1]$$

$$B_0^{iSTS}(n) = [+1, +j, +1] \quad \text{[Equation 23]}$$

Values other than 0 being included in A and B may be configured of sequences of $A_5^{iSTS}(n)$ and $B_5^{iSTS}(n)$, each being determined by Equation 24 shown below.

$$A_k^{iSTS}(n) = [W_k^{iSTS} A_{k-1}^{iSTS}(n), B_{k-1}^{iSTS}(n)]$$

$$B_k^{iSTS}(n) = [W_k^{iSTS} A_{k-1}^{iSTS}(n), -B_{k-1}^{iSTS}(n)] \quad \text{[Equation 24]}$$

The for each space-time stream shown in Equation 24 may be determined as shown below in Table 26.

TABLE 26

| Space-time stream number | $W_k^{iSTS}$ |
|---|---|
| 1 | [+1, +1, +1, +1, +1] |
| 2 | [+1, +1, -1, +1, +1] |
| 3 | [+1, -1, +1, +1, +1] |
| 4 | [+1, -1, -1, +1, +1] |
| 5 | [-1, +1, +1, +1, +1] |
| 6 | [-1, +1, -1, +1, +1] |
| 7 | [-1, -1, +1, +1, +1] |
| 8 | [-1, -1, -1, +1, +1] |

Additionally, A and B of each space-time stream may respectively include a 0, 0, 0 sequence between the values other than 0.

Most particularly, A and B of each space-time stream may respectively include a 0, 0 sequence being positioned in a foremost position, and a 0, 0 sequence being positioned in a rearmost position.

A for each space-time stream ($I_{STS}$), which is configured as described above, may be indicated as shown below in Table 27 to Table 30.

TABLE 27

| $I_{STS}$ | A |
|---|---|
| 1 | 0 0 +1 0 0 0 +1 0 0 0 -1 0 0 0 +1 0 0 0 +j 0 0 0 +1 0 0 0 +1 0 0 0 +1 0<br>0 0 -1 0 0 0 -1 0 0 0 -j 0 0 0 -1 0 0 0 +1 0 0 0 +1 0 0 0 -1 0 0 0 +1 0 |

TABLE 27-continued

| $I_{STS}$ | A |
|---|---|
|  | 0 0 +j 0 0 0 +1 0 0 0 −1 0 0 0 −1 0 0 0 +1 0 0 0 +1 0 0 0 +j 0 0 0 +1 0<br>0 0 +1 0 0 0 +1 0 0 0 −1 0 0 0 +1 0 0 0 +j 0 0 0 +1 0 0 0+1 0 0 0 +1 0<br>0 0 −1 0 0 0 −1 0 0 0 −j 0 0 0 −1 0 0 0 −1 0 0 0 −1 0 0 0 +1 0 0 0 −1 0<br>0 0 −j 0 0 0 −1 0 0 0 +1 0 0 0 +1 0 0 0 −1 0 0 0 −1 0 0 0 −j 0 0 0 −1 0<br>0 0 +1 0 0 0 +1 0 0 0 −1 0 0 0 +1 0 0 0 +j 0 0 0 +1 0 0 0 +1 0 0 0 +1 0<br>0 0 −1 0 0 0 −1 0 0 0 −j 0 0 0 −1 0 0 0 +1 0 0 0 +1 0 0 0 −1 0 0 0 +1 0<br>0 0 +j 0 0 0 +1 0 0 0 −1 0 0 0 −1 0 0 0 +1 0 0 0 +1 0 0 0 +j 0 0 0 +1 0<br>0 0 −1 0 0 0 −1 0 0 0 +1 0 0 0 −1 0 0 0 −j 0 0 0 −1 0 0 0 −1 0 0 0 −1 0<br>0 0 +1 0 0 0 +1 0 0 0 +j 0 0 0 +1 0 0 0 +1 0 0 0 +1 0 0 0 −1 0 0 0 +1 0<br>0 0 +j 0 0 0 +1 0 0 0 −1 0 0 0 −1 0 0 0 +1 0 0 0 +1 0 0 0 +j 0 0 0 +1 0 |
| 2 | 0 0 −1 0 0 0 −1 0 0 0 +1 0 0 0 −1 0 0 0 −j 0 0 0 −1 0 0 0 −1 0 0 0 −1 0<br>0 0 +1 0 0 0 +1 0 0 0 +j 0 0 0 +1 0 0 0 +1 0 0 0 +1 0 0 0 −1 0 0 0 +1 0<br>0 0 +j 0 0 0 +1 0 0 0 −1 0 0 0 −1 0 0 0 +1 0 0 0 +1 0 0 0 +j 0 0 0 +1 0<br>0 0 −1 0 0 0 −1 0 0 0 +1 0 0 0 −1 0 0 0 −j 0 0 0 −1 0 0 0 −1 0 0 0 −1 0<br>0 0 +1 0 0 0 +1 0 0 0 +j 0 0 0 +1 0 0 0 −1 0 0 0 −1 0 0 0 +1 0 0 0 −1 0<br>0 0 −j 0 0 0 −1 0 0 0 +1 0 0 0 +1 0 0 0 −1 0 0 0 −1 0 0 0 −j 0 0 0 −1 0<br>0 0 −1 0 0 0 −1 0 0 0 +1 0 0 0 −1 0 0 0 −j 0 0 0 −1 0 0 0 −1 0 0 0 −1 0<br>0 0 +1 0 0 0 +1 0 0 0 +j 0 0 0 +1 0 0 0 +1 0 0 0 +1 0 0 0 −1 0 0 0 +1 0<br>0 0 +j 0 0 0 +1 0 0 0 −1 0 0 0 −1 0 0 0 +1 0 0 0 +1 0 0 0 +j 0 0 0 +1 0<br>0 0 +1 0 0 0 +1 0 0 0 −1 0 0 0 +1 0 0 0 +j 0 0 0 +1 0 0 0 +1 0 0 0 +1 0<br>0 0 −1 0 0 0 −1 0 0 0 −j 0 0 0 −1 0 0 0 +1 0 0 0 +1 0 0 0 −1 0 0 0 +1 0<br>0 0 +j 0 0 0 +1 0 0 0 −1 0 0 0 −1 0 0 0 +1 0 0 0 +1 0 0 0 +j 0 0 0 +1 0 |

TABLE 28

| $I_{STS}$ | A |
|---|---|
| 3 | 0 0 −1 0 0 0 −1 0 0 0 +1 0 0 0 −1 0 0 0 −j 0 0 0 −1 0 0 0 +1 0 0 0 +1 0<br>0 0 −1 0 0 0 −1 0 0 0 −j 0 0 0 −1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0<br>0 0 −1 0 0 0 −1 0 0 0 +1 0 0 0 −1 0 0 0 −j 0 0 0 −1 0 0 0 −1 0 0 0 +1 0<br>0 0 −1 0 0 0 −1 0 0 0 −j 0 0 0 −1 0 0 0 +1 0 0 0 +1 0 0 0 −1 0 0 0 −1 0<br>0 0 +j 0 0 0 +1 0 0 0 +1 0 0 0 +1 0 0 0 −1 0 0 0 −1 0 0 0 −j 0 0 0 −1 0<br>0 0 −1 0 0 0 −1 0 0 0 +1 0 0 0 −1 0 0 0 −j 0 0 0 −1 0 0 0 +1 0 0 0 +1 0<br>0 0 −1 0 0 0 −1 0 0 0 −j 0 0 0 −1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0<br>0 0 +1 0 0 0 +1 0 0 0 −1 0 0 0 +1 0 0 0 +j 0 0 0 +1 0 0 0 −1 0 0 0 −1 0<br>0 0 +1 0 0 0 +1 0 0 0 +j 0 0 0 +1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0 |
| 4 | 0 0 +1 0 0 0 +1 0 0 0 −1 0 0 0 +1 0 0 0 +j 0 0 0 +1 0 0 0 −1 0 0 0 −1 0<br>0 0 +1 0 0 0 +1 0 0 0 +j 0 0 0 +1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0<br>0 0 +1 0 0 0 +1 0 0 0 −1 0 0 0 +1 0 0 0 +j 0 0 0 +1 0 0 0 −1 0 0 0 −1 0<br>0 0 +1 0 0 0 +1 0 0 0 +j 0 0 0 +1 0 0 0 +1 0 0 0 +1 0 0 0 −1 0 0 0 −1 0<br>0 0 +j 0 0 0 +1 0 0 0 +1 0 0 0 +1 0 0 0 −1 0 0 0 −1 0 0 0 −j 0 0 0 −1 0<br>0 0 +1 0 0 0 +1 0 0 0 −1 0 0 0 +1 0 0 0 +j 0 0 0 +1 0 0 0 −1 0 0 0 −1 0<br>0 0 +1 0 0 0 +1 0 0 0 +j 0 0 0 +1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0<br>0 0 −1 0 0 0 −1 0 0 0 +1 0 0 0 −1 0 0 0 −j 0 0 0 −1 0 0 0 +1 0 0 0 +1 0<br>0 0 −1 0 0 0 −1 0 0 0 −j 0 0 0 −1 0 0 0 −1 0 0 0 −1 0 0 0 +1 0 0 0 −1 0<br>0 0 −j 0 0 0 −1 0 0 0 −1 0 0 0 −1 0 0 0 +1 0 0 0 +1 0 0 0 +j 0 0 0 +1 0 |

TABLE 29

| $I_{STS}$ | A |
|---|---|
| 5 | 0 0 −1 0 0 0 −1 0 0 0 +1 0 0 0 +1 0 0 0 +j 0 0 0 +1 0 0 0 −1 0 0 0 −1 0<br>0 0 +1 0 0 0 −1 0 0 0 −j 0 0 0 −1 0 0 0 −1 0 0 0 −1 0 0 0 +1 0 0 0 +1 0<br>0 0 +j 0 0 0 +1 0 0 0 +1 0 0 0 +1 0 0 0 −1 0 0 0 +1 0 0 0 +j 0 0 0 +1 0<br>0 0 −1 0 0 0 −1 0 0 0 +1 0 0 0 +1 0 0 0 +j 0 0 0 +1 0 0 0 −1 0 0 0 −1 0<br>0 0 +1 0 0 0 −1 0 0 0 −1 0 0 0 −1 0 0 0 +1 0 0 0 +1 0 0 0 −1 0 0 0 −1 0<br>0 0 −j 0 0 0 −1 0 0 0 −1 0 0 0 −1 0 0 0 +1 0 0 0 −1 0 0 0 −j 0 0 0 −1 0<br>0 0 −1 0 0 0 −1 0 0 0 +1 0 0 0 +1 0 0 0 +j 0 0 0 +1 0 0 0 −1 0 0 0 −1 0<br>0 0 +1 0 0 0 −1 0 0 0 −j 0 0 0 −1 0 0 0 −1 0 0 0 −1 0 0 0 +1 0 0 0 +1 0<br>0 0 +j 0 0 0 +1 0 0 0 +1 0 0 0 +1 0 0 0 −1 0 0 0 +1 0 0 0 +j 0 0 0 +1 0<br>0 0 +1 0 0 0 +1 0 0 0 −1 0 0 0 −1 0 0 0 −j 0 0 0 −1 0 0 0 +1 0 0 0 +1 0<br>0 0 −1 0 0 0 +1 0 0 0 +j 0 0 0 +1 0 0 0 −1 0 0 0 −1 0 0 0 +1 0 0 0 +1 0<br>0 0 +j 0 0 0 +1 0 0 0 +1 0 0 0 +1 0 0 0 −1 0 0 0 +1 0 0 0 +j 0 0 0 +1 0 |

TABLE 29-continued

| $I_{STS}$ | A |
|---|---|
| 6 | 0 0 +1 0 0 0 +1 0 0 0 −1 0 0 0 −1 0 0 0 −j 0 0 0 −1 0 0 0 +1 0 0 0 +1 0
0 0 −1 0 0 0 +1 0 0 0 +j 0 0 0 +1 0 0 0 −1 0 0 0 −1 0 0 0 +1 0 0 0 +1 0
0 0 +j 0 0 0 +1 0 0 0 +1 0 0 0 +1 0 0 0 −1 0 0 0 +1 0 0 0 +j 0 0 0 +1 0
0 0 +1 0 0 0 +1 0 0 0 −1 0 0 0 −1 0 0 0 −j 0 0 0 −1 0 0 0 +1 0 0 0 +1 0
0 0 −1 0 0 0 +1 0 0 0 +j 0 0 0 +1 0 0 0 +1 0 0 0 +1 0 0 0 −1 0 0 0 −1 0
0 0 −j 0 0 0 −1 0 0 0 −1 0 0 0 −1 0 0 0 +1 0 0 0 −1 0 0 0 −j 0 0 0 −1 0
0 0 +1 0 0 0 +1 0 0 0 −1 0 0 0 −1 0 0 0 −j 0 0 0 −1 0 0 0 +1 0 0 0 +1 0
0 0 −1 0 0 0 +1 0 0 0 +j 0 0 0 +1 0 0 0 −1 0 0 0 −1 0 0 0 +1 0 0 0 +1 0
0 0 +j 0 0 0 +1 0 0 0 +1 0 0 0 +1 0 0 0 −1 0 0 0 +1 0 0 0 +j 0 0 0 +1 0
0 0 −1 0 0 0 −1 0 0 0 +1 0 0 0 +1 0 0 0 +j 0 0 0 +1 0 0 0 −1 0 0 0 −1 0
0 0 +1 0 0 0 −1 0 0 0 −j 0 0 0 −1 0 0 0 −1 0 0 0 −1 0 0 0 +1 0 0 0 +1 0
0 0 +j 0 0 0 +1 0 0 0 +1 0 0 0 +1 0 0 0 −1 0 0 0 +1 0 0 0 +j 0 0 0 +1 0
0 |

TABLE 30

| $I_{STS}$ | A |
|---|---|
| 7 | 0 0 +1 0 0 0 +1 0 0 0 −1 0 0 0 −1 0 0 0 −j 0 0 0 −1 0 0 0 −1 0 0 0 −1 0
0 0 +1 0 0 0 −1 0 0 0 −j 0 0 0 −1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 0 +1 0 0 0 +1 0 0 0 −1 0 0 0 −1 0 0 0 −j 0 0 0 −1 0 0 0 −1 0 0 0 −1 0
0 0 +1 0 0 0 −1 0 0 0 −j 0 0 0 −1 0 0 0 −1 0 0 0 −1 0 0 0 +1 0 0 0 +1 0
0 0 +j 0 0 0 +1 0 0 0 −1 0 0 0 −1 0 0 0 +1 0 0 0 −1 0 0 0 −j 0 0 0 −1 0
0 0 +1 0 0 0 +1 0 0 0 −1 0 0 0 −1 0 0 0 −j 0 0 0 −1 0 0 0 −1 0 0 0 −1 0
0 0 +1 0 0 0 −1 0 0 0 −j 0 0 0 −1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 0 −1 0 0 0 −1 0 0 0 +1 0 0 0 +1 0 0 0 +j 0 0 0 +1 0 0 0 +1 0 0 0 +1 0
0 0 −1 0 0 0 +1 0 0 0 +j 0 0 0 +1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 |
| 8 | 0 0 −1 0 0 0 −1 0 0 0 +1 0 0 0 +1 0 0 0 +j 0 0 0 +1 0 0 0 +1 0 0 0 +1 0
0 0 −1 0 0 0 +1 0 0 0 +j 0 0 0 +1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 0 −1 0 0 0 −1 0 0 0 +1 0 0 0 +1 0 0 0 +j 0 0 0 +1 0 0 0 +1 0 0 0 +1 0
0 0 −1 0 0 0 +1 0 0 0 +j 0 0 0 +1 0 0 0 −1 0 0 0 −1 0 0 0 +1 0 0 0 +1 0
0 0 +j 0 0 0 +1 0 0 0 −1 0 0 0 −1 0 0 0 +1 0 0 0 −1 0 0 0 −j 0 0 0 −1 0
0 0 −1 0 0 0 −1 0 0 0 +1 0 0 0 +1 0 0 0 +j 0 0 0 +1 0 0 0 +1 0 0 0 +1 0
0 0 −1 0 0 0 +1 0 0 0 +j 0 0 0 +1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 0 +1 0 0 0 +1 0 0 0 −1 0 0 0 −1 0 0 0 −j 0 0 0 −1 0 0 0 −1 0 0 0 −1 0
0 0 +1 0 0 0 −1 0 0 0 −j 0 0 0 −1 0 0 0 +1 0 0 0 +1 0 0 0 −1 0 0 0 −1 0
0 0 −j 0 0 0 −1 0 0 0 +1 0 0 0 +1 0 0 0 −1 0 0 0 +1 0 0 0 +j 0 0 0 +1 0
0 |

B for each space-time stream ($I_{STS}$) may be configured to be indicated as shown below in Table 31 to Table 34.

TABLE 31

| $I_{STS}$ | B |
|---|---|
| 1 | 0 0 +1 0 0 0 +1 0 0 0 −1 0 0 0 +1 0 0 0 +j 0 0 0 +1 0 0 0 +1 0 0 0 +1 0
0 0 −1 0 0 0 −1 0 0 0 −j 0 0 0 −1 0 0 0 +1 0 0 0 +1 0 0 0 −1 0 0 0 +1 0
0 0 +j 0 0 0 +1 0 0 0 −1 0 0 0 −1 0 0 0 +1 0 0 0 +1 0 0 0 +j 0 0 0 +1 0
0 0 +1 0 0 0 +1 0 0 0 −1 0 0 0 +1 0 0 0 +j 0 0 0 +1 0 0 0 +1 0 0 0 +1 0
0 0 −1 0 0 0 −1 0 0 0 −j 0 0 0 −1 0 0 0 −1 0 0 0 −1 0 0 0 +1 0 0 0 −1 0
0 0 −j 0 0 0 −1 0 0 0 +1 0 0 0 +1 0 0 0 −1 0 0 0 −1 0 0 0 −j 0 0 0 −1 0
0 0 −1 0 0 0 −1 0 0 0 +1 0 0 0 −1 0 0 0 −j 0 0 0 −1 0 0 0 −1 0 0 0 −1 0
0 0 +1 0 0 0 +1 0 0 0 +j 0 0 0 +1 0 0 0 −1 0 0 0 −1 0 0 0 +1 0 0 0 −1 0
0 0 −j 0 0 0 −1 0 0 0 +1 0 0 0 +1 0 0 0 −1 0 0 0 −1 0 0 0 −j 0 0 0 −1 0
0 0 +1 0 0 0 +1 0 0 0 −1 0 0 0 +1 0 0 0 +j 0 0 0 +1 0 0 0 +1 0 0 0 +1 0
0 0 −1 0 0 0 −1 0 0 0 −j 0 0 0 −1 0 0 0 −1 0 0 0 −1 0 0 0 +1 0 0 0 −1 0
0 0 −j 0 0 0 −1 0 0 0 +1 0 0 0 +1 0 0 0 −1 0 0 0 −1 0 0 0 −j 0 0 0 −1 0
0 |
| 2 | 0 0 −1 0 0 0 −1 0 0 0 +1 0 0 0 −1 0 0 0 −j 0 0 0 −1 0 0 0 −1 0 0 0 −1 0
0 0 +1 0 0 0 +1 0 0 0 +j 0 0 0 +1 0 0 0 +1 0 0 0 +1 0 0 0 −1 0 0 0 +1 0
0 0 +j 0 0 0 +1 0 0 0 −1 0 0 0 −1 0 0 0 +1 0 0 0 +1 0 0 0 +j 0 0 0 +1 0
0 0 −1 0 0 0 −1 0 0 0 +1 0 0 0 −1 0 0 0 −j 0 0 0 −1 0 0 0 −1 0 0 0 −1 0
0 0 +1 0 0 0 +1 0 0 0 +j 0 0 0 +1 0 0 0 +1 0 0 0 +1 0 0 0 −1 0 0 0 +1 0
0 0 −j 0 0 0 −1 0 0 0 +1 0 0 0 +1 0 0 0 −1 0 0 0 −1 0 0 0 −j 0 0 0 −1 0
0 0 +1 0 0 0 +1 0 0 0 −1 0 0 0 +1 0 0 0 +j 0 0 0 +1 0 0 0 +1 0 0 0 +1 0
0 0 −1 0 0 0 −1 0 0 0 −j 0 0 0 −1 0 0 0 −1 0 0 0 −1 0 0 0 +1 0 0 0 −1 0 |

TABLE 31-continued

| $I_{STS}$ | B |
|---|---|
| | 0 0 −j 0 0 0 −1 0 0 0 +1 0 0 0 +1 0 0 0 −1 0 0 0 −1 0 0 0 −j 0 0 0 −1 0 |
| | 0 0 −1 0 0 0 −1 0 0 0 +1 0 0 0 −1 0 0 0 −j 0 0 0 −1 0 0 0 −1 0 0 0 −1 0 |
| | 0 0 +1 0 0 0 +1 0 0 0 +j 0 0 0 +1 0 0 0 −1 0 0 0 −1 0 0 0 +1 0 0 0 −1 0 |
| | 0 0 −j 0 0 0 −1 0 0 0 +1 0 0 0 +1 0 0 0 −1 0 0 0 −1 0 0 0 −j 0 0 0 −1 0 0 |

TABLE 32

| $I_{STS}$ | B |
|---|---|
| 3 | 0 0 −1 0 0 0 −1 0 0 0 +1 0 0 0 −1 0 0 0 −j 0 0 0 −1 0 0 0 +1 0 0 0 +1 0 |
| | 0 0 −1 0 0 0 −1 0 0 0 −j 0 0 0 −1 0 0 0 −1 0 0 0 −1 0 0 0 +1 0 0 0 −1 0 |
| | 0 0 −j 0 0 0 −1 0 0 0 −1 0 0 0 −1 0 0 0 +1 0 0 0 +1 0 0 0 +j 0 0 0 +1 0 |
| | 0 0 −1 0 0 0 −1 0 0 0 +1 0 0 0 −1 0 0 0 −j 0 0 0 −1 0 0 0 +1 0 0 0 +1 0 |
| | 0 0 −1 0 0 0 −1 0 0 0 −j 0 0 0 −1 0 0 0 +1 0 0 0 +1 0 0 0 −1 0 0 0 −1 0 |
| | 0 0 +j 0 0 0 +1 0 0 0 +1 0 0 0 +1 0 0 0 −1 0 0 0 −1 0 0 0 −j 0 0 0 −1 0 |
| | 0 0 +1 0 0 0 +1 0 0 0 −1 0 0 0 +1 0 0 0 +j 0 0 0 +1 0 0 0 −1 0 0 0 −1 0 |
| | 0 0 +1 0 0 0 +1 0 0 0 +j 0 0 0 +1 0 0 0 +1 0 0 0 +1 0 0 0 −1 0 0 0 +1 0 |
| | 0 0 +j 0 0 0 +1 0 0 0 +1 0 0 0 +1 0 0 0 −1 0 0 0 −1 0 0 0 −j 0 0 0 −1 0 |
| | 0 0 −1 0 0 0 −1 0 0 0 +1 0 0 0 −1 0 0 0 −j 0 0 0 −1 0 0 0 +1 0 0 0 +1 0 |
| | 0 0 −1 0 0 0 −1 0 0 0 −j 0 0 0 −1 0 0 0 +1 0 0 0 +1 0 0 0 −1 0 0 0 −1 0 |
| | 0 0 +j 0 0 0 +1 0 0 0 +1 0 0 0 +1 0 0 0 −1 0 0 0 −1 0 0 0 −j 0 0 0 −1 0 0 |
| 4 | 0 0 +1 0 0 0 +1 0 0 0 −1 0 0 0 +1 0 0 0 +j 0 0 0 +1 0 0 0 −1 0 0 0 −1 0 |
| | 0 0 +1 0 0 0 +1 0 0 0 +j 0 0 0 +1 0 0 0 −1 0 0 0 −1 0 0 0 +1 0 0 0 +1 0 |
| | 0 0 −j 0 0 0 −1 0 0 0 −1 0 0 0 −1 0 0 0 +1 0 0 0 +1 0 0 0 +j 0 0 0 +1 0 |
| | 0 0 +1 0 0 0 +1 0 0 0 −1 0 0 0 +1 0 0 0 +j 0 0 0 +1 0 0 0 −1 0 0 0 −1 0 |
| | 0 0 +1 0 0 0 +1 0 0 0 +j 0 0 0 +1 0 0 0 +1 0 0 0 +1 0 0 0 −1 0 0 0 +1 0 |
| | 0 0 +j 0 0 0 +1 0 0 0 +1 0 0 0 +1 0 0 0 −1 0 0 0 −1 0 0 0 −j 0 0 0 −1 0 |
| | 0 0 −1 0 0 0 −1 0 0 0 +1 0 0 0 −1 0 0 0 −j 0 0 0 −1 0 0 0 +1 0 0 0 +1 0 |
| | 0 0 −1 0 0 0 −1 0 0 0 −j 0 0 0 −1 0 0 0 +1 0 0 0 +1 0 0 0 −1 0 0 0 −1 0 |
| | 0 0 +j 0 0 0 +1 0 0 0 +1 0 0 0 +1 0 0 0 −1 0 0 0 −1 0 0 0 −j 0 0 0 −1 0 |
| | 0 0 +1 0 0 0 +1 0 0 0 −1 0 0 0 +1 0 0 0 +j 0 0 0 +1 0 0 0 −1 0 0 0 −1 0 |
| | 0 0 +1 0 0 0 +1 0 0 0 +j 0 0 0 +1 0 0 0 +1 0 0 0 +1 0 0 0 −1 0 0 0 +1 0 |
| | 0 0 +j 0 0 0 +1 0 0 0 +1 0 0 0 +1 0 0 0 −1 0 0 0 −1 0 0 0 −j 0 0 0 −1 0 0 |

TABLE 33

| $I_{STS}$ | B |
|---|---|
| 5 | 0 0 −1 0 0 0 −1 0 0 0 +1 0 0 0 +1 0 0 0 +j 0 0 0 +1 0 0 0 −1 0 0 0 −1 0 |
| | 0 0 +1 0 0 0 −1 0 0 0 −j 0 0 0 −1 0 0 0 −1 0 0 0 −1 0 0 0 +1 0 0 0 +1 0 |
| | 0 0 +j 0 0 0 +1 0 0 0 +1 0 0 0 +1 0 0 0 −1 0 0 0 +1 0 0 0 +j 0 0 0 +1 0 |
| | 0 0 −1 0 0 0 −1 0 0 0 +1 0 0 0 +1 0 0 0 +j 0 0 0 +1 0 0 0 −1 0 0 0 −1 0 |
| | 0 0 +1 0 0 0 −1 0 0 0 −j 0 0 0 −1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 |
| | 0 0 +1 0 0 0 +1 0 0 0 −1 0 0 0 −1 0 0 0 −j 0 0 0 −1 0 0 0 +1 0 0 0 +1 0 |
| | 0 0 −1 0 0 0 +1 0 0 0 +j 0 0 0 +1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 |
| | 0 0 −1 0 0 0 −1 0 0 0 +1 0 0 0 +1 0 0 0 +j 0 0 0 +1 0 0 0 −1 0 0 0 −1 0 |
| | 0 0 +1 0 0 0 −1 0 0 0 −j 0 0 0 −1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 0 |
| 6 | 0 0 +1 0 0 0 +1 0 0 0 −1 0 0 0 −1 0 0 0 −j 0 0 0 −1 0 0 0 +1 0 0 0 +1 0 |
| | 0 0 −1 0 0 0 +1 0 0 0 +j 0 0 0 +1 0 0 0 −1 0 0 0 −1 0 0 0 +1 0 0 0 +1 0 |
| | 0 0 +j 0 0 0 +1 0 0 0 +1 0 0 0 +1 0 0 0 −1 0 0 0 +1 0 0 0 +j 0 0 0 +1 0 |
| | 0 0 +1 0 0 0 +1 0 0 0 −1 0 0 0 −1 0 0 0 −j 0 0 0 −1 0 0 0 +1 0 0 0 +1 0 |
| | 0 0 −1 0 0 0 +1 0 0 0 +j 0 0 0 +1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 |
| | 0 0 −1 0 0 0 −1 0 0 0 +1 0 0 0 +1 0 0 0 +j 0 0 0 +1 0 0 0 −1 0 0 0 −1 0 |
| | 0 0 +1 0 0 0 −1 0 0 0 −j 0 0 0 −1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 |
| | 0 0 +1 0 0 0 +1 0 0 0 −1 0 0 0 −1 0 0 0 −j 0 0 0 −1 0 0 0 +1 0 0 0 +1 0 |
| | 0 0 −1 0 0 0 +1 0 0 0 +j 0 0 0 +1 0 0 0 +1 0 0 0 +1 0 0 0 −1 0 0 0 −1 0 |
| | 0 0 −j 0 0 0 −1 0 0 0 −1 0 0 0 −1 0 0 0 +1 0 0 0 −1 0 0 0 −j 0 0 0 −1 0 0 |

TABLE 34

| $I_{STS}$ | B |
|---|---|
| 7 | 0 0 +1 0 0 0 +1 0 0 0 −1 0 0 0 −1 0 0 0 −j 0 0 0 −1 0 0 0 −1 0 0 0 −1 0 |
| | 0 0 +1 0 0 0 −1 0 0 0 −j 0 0 0 −1 0 0 0 +1 0 0 0 +1 0 0 0 −1 0 0 0 −1 0 |
| | 0 0 −j 0 0 0 −1 0 0 0 +1 0 0 0 +1 0 0 0 −1 0 0 0 +1 0 0 0 +j 0 0 0 +1 0 |
| | 0 0 +1 0 0 0 +1 0 0 0 −1 0 0 0 −1 0 0 0 −j 0 0 0 −1 0 0 0 −1 0 0 0 −1 0 |
| | 0 0 +1 0 0 0 −1 0 0 0 −j 0 0 0 −1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 |
| | 0 0 −1 0 0 0 −1 0 0 0 +1 0 0 0 +1 0 0 0 +j 0 0 0 +1 0 0 0 +1 0 0 0 +1 0 |
| | 0 0 −1 0 0 0 +1 0 0 0 +j 0 0 0 +1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 |
| | 0 0 +1 0 0 0 +1 0 0 0 −1 0 0 0 −1 0 0 0 −j 0 0 0 −1 0 0 0 −1 0 0 0 −1 0 |
| | 0 0 +1 0 0 0 −1 0 0 0 −j 0 0 0 −1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 0 |
| 8 | 0 0 −1 0 0 0 −1 0 0 0 +1 0 0 0 +1 0 0 0 +j 0 0 0 +1 0 0 0 +1 0 0 0 +1 0 |
| | 0 0 −1 0 0 0 +1 0 0 0 +j 0 0 0 +1 0 0 0 −1 0 0 0 −1 0 0 0 +1 0 0 0 +1 0 |
| | 0 0 −j 0 0 0 −1 0 0 0 +1 0 0 0 +1 0 0 0 −1 0 0 0 +1 0 0 0 +j 0 0 0 +1 0 |
| | 0 0 −1 0 0 0 −1 0 0 0 +1 0 0 0 +1 0 0 0 +j 0 0 0 +1 0 0 0 +1 0 0 0 +1 0 |
| | 0 0 −1 0 0 0 +1 0 0 0 +j 0 0 0 +1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 |
| | 0 0 +1 0 0 0 +1 0 0 0 −1 0 0 0 −1 0 0 0 −j 0 0 0 −1 0 0 0 −1 0 0 0 −1 0 |
| | 0 0 +1 0 0 0 −1 0 0 0 −j 0 0 0 −1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 |
| | 0 0 −1 0 0 0 −1 0 0 0 +1 0 0 0 +1 0 0 0 +j 0 0 0 +1 0 0 0 +1 0 0 0 +1 0 |
| | 0 0 −1 0 0 0 +1 0 0 0 +j 0 0 0 +1 0 0 0 −1 0 0 0 −1 0 0 0 +1 0 0 0 +1 0 |
| | 0 0 +j 0 0 0 +1 0 0 0 −1 0 0 0 −1 0 0 0 +1 0 0 0 −1 0 0 0 −j 0 0 0 −1 0 0 |

The effects of the present invention will not be limited only to the effects described above. Accordingly, effects that have not been mentioned above or additional effects of the present application may become apparent to those having ordinary skill in the art from the description presented below.

Effects of the Invention

By applying the above-described configuration, in case a station according to the present invention transmits an OFDM packet through one or two bonded channels, by configuring an EDMG STF field using the method proposed in the present invention, a low Peak to Average Power Ratio (PAPR) may be achieved.

The effects of the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The appended drawings of this specification are presented to provide a further understanding of the present invention and are incorporated in and constitute a part of this application, illustrate embodiments of the invention and serve to explain the principle of the invention along with the description of the present invention.

FIG. 9 is a diagram showing a PPDU structure that can be applied to the present invention.

FIG. 12 to FIG. 17 are diagrams showing Golay sequences that can be applied to the present invention.

FIG. 19 is a diagram respectively showing $EDMGS_{left,176}{}^{i_{STS}}$ and $EDMGS_{right,176}{}^{i_{STS}}$ in cases where $i_{STS}$ is equal to 1 to 4, and FIG. 20 is a diagram respectively showing $EDMGS_{left,176}{}^{i_{STS}}$ and $EDMGS_{right,176}{}^{i_{STS}}$ in cases where $i_{STS}$ is equal to 5 to 8.

FIG. 21 and FIG. 22 are diagrams respectively showing $EDMGS_{left,176}{}^{i_{STS}}$ and $EDMGS_{right,176}{}^{i_{STS}}$ for each space-time stream.

FIG. 23 is a diagram respectively showing $EDMGS_{left,384}{}^{i_{STS}}$ and $EDMGS_{right,384}{}^{i_{STS}}$ in a case where $i_{STS}$ is equal to 1 or 2, FIG. 24 is a diagram respectively showing $EDMGS_{left,384}{}^{i_{STS}}$ and $EDMGS_{right,384}{}^{i_{STS}}$ in a case where $i_{STS}$ is equal to 3 or 4, FIG. 25 is a diagram respectively showing $EDMGS_{left,384}{}^{i_{STS}}$ and $EDMGS_{right,384}{}^{i_{STS}}$ in a case where $i_{STS}$ is equal to 5 or 6, and FIG. 26 is a diagram respectively showing $EDMGS_{left,384}{}^{i_{STS}}$ and $EDMGS_{right,384}{}^{i_{STS}}$ in a case where $i_{STS}$ is equal to 7 or 8.

FIG. 27 is a diagram respectively showing $EDMGS_{left,385}^{i_{STS}}$ in a case where $i_{STS}$ is equal to 1 to 4, FIG. 28 is a diagram respectively showing $EDMGS_{left,385}^{i_{STS}}$ in a case where $i_{STS}$ is equal to 5 to 8, FIG. 29 is a diagram respectively showing $EDMGS_{right,385}^{i_{STS}}$ in a case where $i_{STS}$ is equal to 1 to 4, and FIG. 30 is a diagram respectively showing $EDMGS_{right,385}^{i_{STS}}$ in a case where $i_{STS}$ is equal to 5 to 8.

DESCRIPTION OF EXEMPLARY EMBODIMENTS

Hereinafter, the preferred embodiment of the present invention will be described in detail with reference to the appended drawings. The detailed description that will hereinafter be disclosed along with the appended drawings will only be provided to describe an exemplary embodiment of the present invention. And, therefore, it should be understood that the exemplary embodiment presented herein will not represent the only embodiment for carrying out the present invention.

The following detailed description includes specific details for providing a full understanding of the present invention. However, it will be apparent to anyone skilled in the art that the present invention can be carried out without referring to the above-mentioned specific details. In some cases, in order to avoid any ambiguity in the concept of the present invention, the disclosed structure and device may be omitted, or the disclosed structure and device may be illustrated as a block diagram based on their core functions.

Although diverse mobile communication systems applying the present invention may exist, a wireless LAN (WLAN) system will hereinafter be described in detail as an example of such mobile communication system.

1. Wireless LAN (WLAN) System

1-1. General Wireless LAN (WLAN) System

Figure 1:
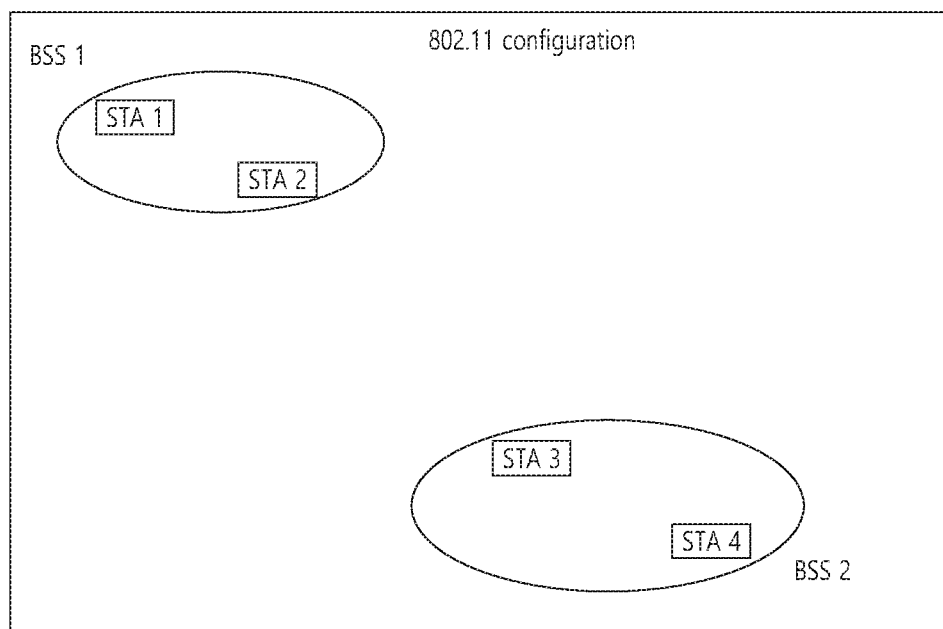
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user corresponds to a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 corresponds to an IBSS. The IBSS refers to a BSS that does not include an AP. And, since the BSS does not include an AP, access to the DS is not authorized (or approved), and, therefore, the IBSS functions as a self-contained network.

Figure 2:
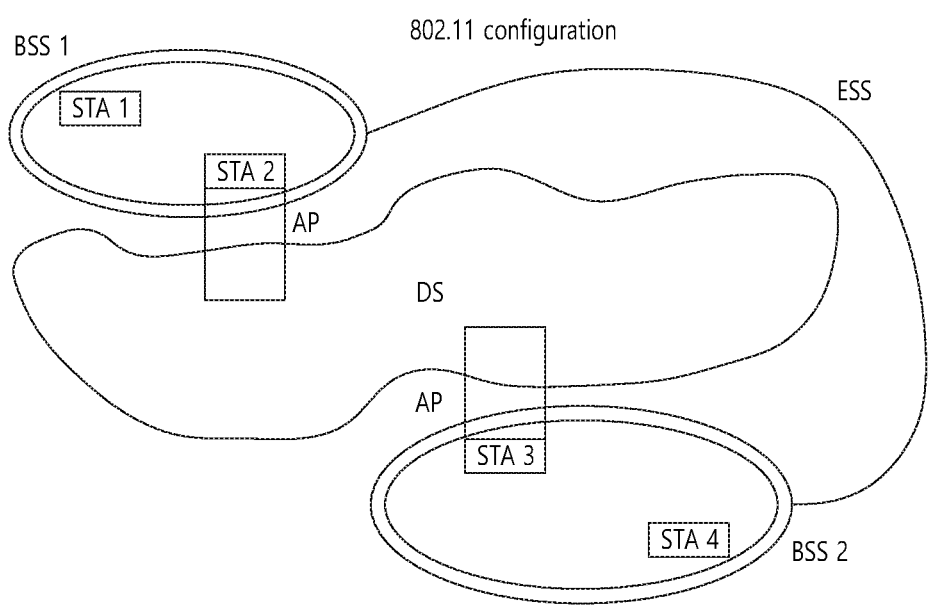
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 corresponds to an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to correspond to a network. As long as the DS is capable of providing a predetermined distribution service, there is no limitation in the structure or configuration of the DS. For example, the DS may correspond to a wireless network, such as a mesh network, or the DS may correspond to a physical structure (or entity) that connects the APs to one another.

Hereinafter, a channel bonding method that is performed in a wireless LAN system will hereinafter be described in detail based on the description presented above.

1-2. Channel Bonding in a Wireless LAN (WLAN) System

Figure 3:
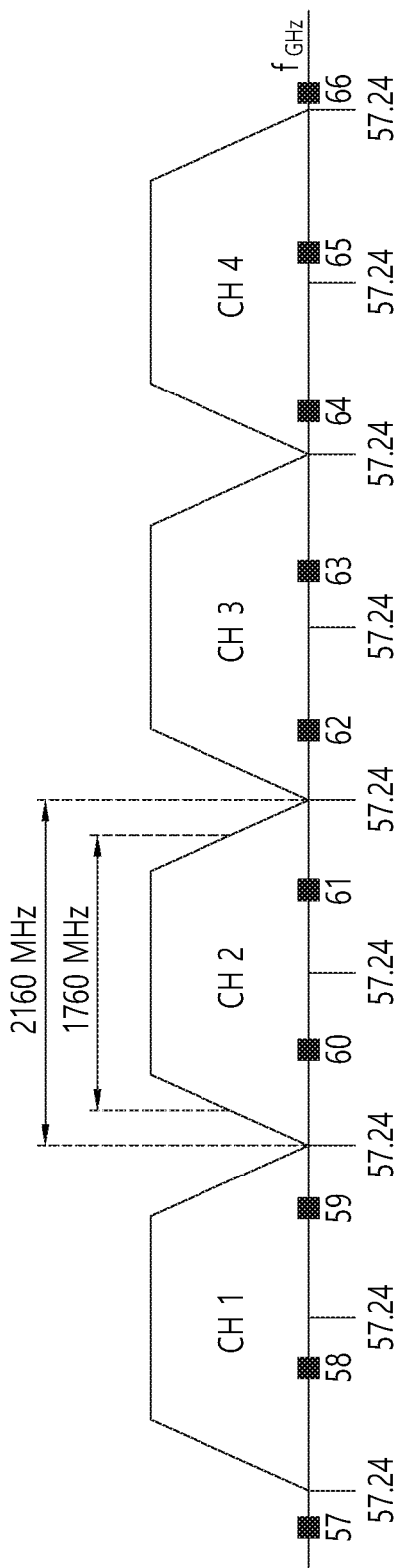
FIG. 3 is a diagram describing a channel in a 60 GHz band for describing a channel bonding operation according to an exemplary embodiment of the present invention.

FIG. 3 is a diagram describing a channel in a 60 GHz band for describing a channel bonding operation according to an exemplary embodiment of the present invention.

As shown in FIG. 3, 4 channels may be configured in a 60 GHz band, and a general channel bandwidth may be equal to 2.16 GHz. An ISM band (57 GHz~66 GHz), which is available for usage in 60 GHz, may be differently regulated in accordance with the circumstances (or situations) of each country. Generally, among the channels shown in FIG. 3, since Channel 2 is available for usage is all regions, Channel 2 may be used as a default channel. Channel 2 and Channel 3 may be used is most regions excluding Australia. And, accordingly, Channel 2 and Channel 3 may be used for channel bonding. However, it shall be understood that diverse channels may be used for channel bonding. And, therefore, the present invention will not be limited to only one or more specific channels.

Figure 4:
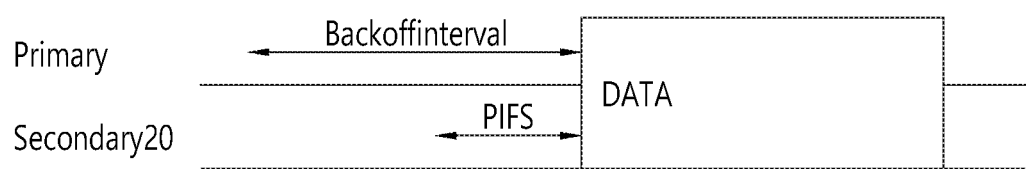
FIG. 4 is a diagram describing a basic method for performing channel bonding in a wireless LAN (WLAN) system.

FIG. 4 is a diagram describing a basic method for performing channel bonding in a wireless LAN (WLAN) system.

The example shown in FIG. 4 corresponds to an example of combining two 20 MHz channels and operating (or using) the combined channels for 40 MHz channel bonding in an IEEE 802.11n system. In case of an IEEE 802.11ac system, 40/80/160 MHz channel bonding may be performed.

The two exemplary channels of FIG. 4 include a primary channel and a secondary channel, and the STA may examine the channel status of the primary channel, among the two channels, by using a CSMA/CA method. If the primary channel is idle during a constant backoff interval, and, at a time point where the backoff count is equal to 0, if the secondary channel is idle during a predetermined period of time (e.g., PIFS), the STA may transmit data by combining the primary channel and the secondary channel.

However, in case of performing contention-based channel bonding, as shown in FIG. 4, as described above, since channel bonding can be performed only in a restricted case where the secondary channel maintains the idle state during a predetermined period of time at a time point where the backoff count for the primary channel is expired, the usage of channel bonding is very restricted (or limited). And, therefore, there lies a difficulty in that measures cannot be flexibly taken in accordance with the circumstances (or situation) of the medium.

Accordingly, in an aspect of the present invention, a solution (or method) for performing scheduling-based access by having the AP transmit scheduling information to the STAs is proposed. Meanwhile, in another aspect of the present invention, a solution (or method) for performing contention-based channel access based on the above-described scheduling or independently from the above-described scheduling is proposed. Furthermore, in yet another aspect of the present invention, a method for performing communication through a spatial sharing technique based on beamforming is proposed.

1-3. Beacon Interval Configuration

Figure 5:
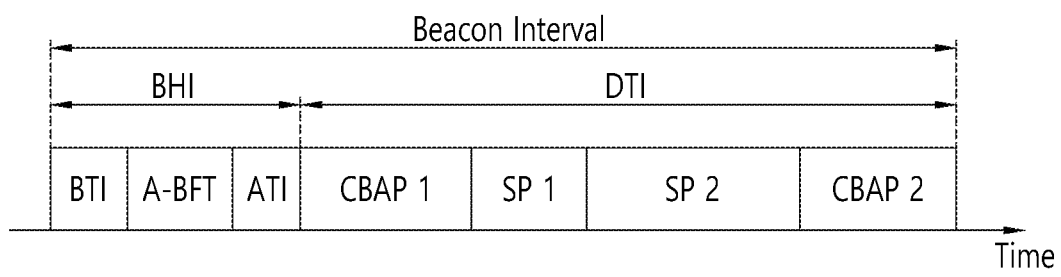
FIG. 5 is a diagram describing a configuration of a beacon interval.

FIG. 5 is a diagram describing a configuration of a beacon interval.

In an 11ad-based DMG BSS system, the time of medium may be divided into beacon intervals. A lower level period within the beacon interval may be referred to as an access period. Each of the different access periods within one beacon interval may have a different access rule. Such information on the access period may be transmitted by an AP or personal basic service set control point (PCP) to a non-AP STA or non-PCP.

As shown in the example of FIG. 5, one beacon interval may include one Beacon Header Interval (BHI) and one Data Transfer Interval (DTI). As shown in FIG. 4, the BHI may include a Beacon Transmission Interval (BTI), an Association Beamforming Training (A-BFT), and an Announcement Transmission Interval (ATI).

The BTI refers to a period (or section or duration) during which one more DMG beacon frames may be transmitted. The A-BFT refers to a period during which beamforming training is performed by an STA, which has transmitted a DMG beacon frame during a preceding BTI. The ATI refers to a request-response based management access period between PCP/AP and non-PCP/non-AP STA.

Meanwhile, the Data Transfer Interval (DTI) refers to a period during which a frame exchange is performed between the STAs. And, as shown FIG. 5, one or more Contention Based Access Periods (CBAPs) and one or more Service Periods (SPs) may be allocated (or assigned) to the DTI. Although FIG. 5 shows an example where 2 CBAPs and 2 SPs are allocated to the DCI, this is merely exemplary. And, therefore, the present invention is not necessarily required to be limited only to this.

Hereinafter, a physical layer configuration in a wireless LAN (WLAN) system, in which the present invention is to be applied, will be described in detail.

1-4. Physical Layer Configuration

It will be assumed that the wireless LAN (WLAN) system according to an exemplary embodiment of the present invention may provide 3 different modulations mode as shown below.

TABLE 1

| PHY | MCS | Note |
|---|---|---|
| Control PHY | 0 | |
| Single Carrier PHY (SC PHY) | 1 . . . 12  25 . . . 31 | (low power SC PHY) |
| OFDM PHY | 13 . . . 24 | |

Such modulation modes may be used for satisfying different requirements (e.g., high throughput or stability). Depending upon the system, among the modulation modes presented above, only some of the modulation modes may be supported.

Figure 6:
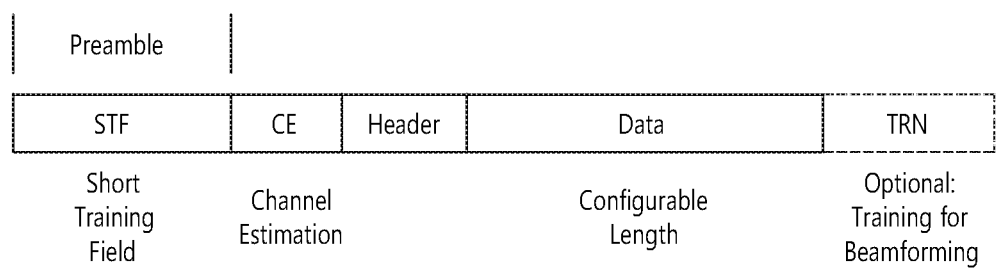
FIG. 6 is a diagram describing a physical configuration of a legacy radio frame.

FIG. 6 is a diagram describing a physical configuration of a legacy radio frame.

It will be assumed that all Directional Multi-Gigabit (DMG) physical layers commonly include the fields that are shown below in FIG. 6. However, a regulation method of each individual field and a modulation/coding scheme used in each field may vary depending upon each mode.

As shown in FIG. 6, a preamble of a radio frame may include a Short Training Field (STF) and a Channel Estimation (CE). Additionally, the radio frame may also include a header and a data field as a payload of the radio frame and may optionally include a training (TRN) field for beamforming.

Figure 7:
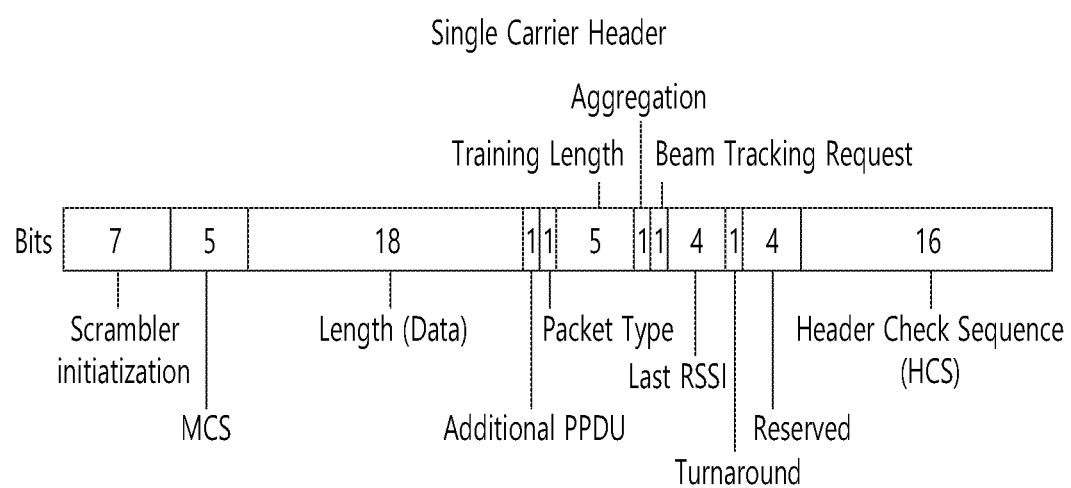
FIG. 7 and FIG. 8 are diagrams describing a configuration of a header field of the radio frame shown in FIG. 6.
Figure 8:
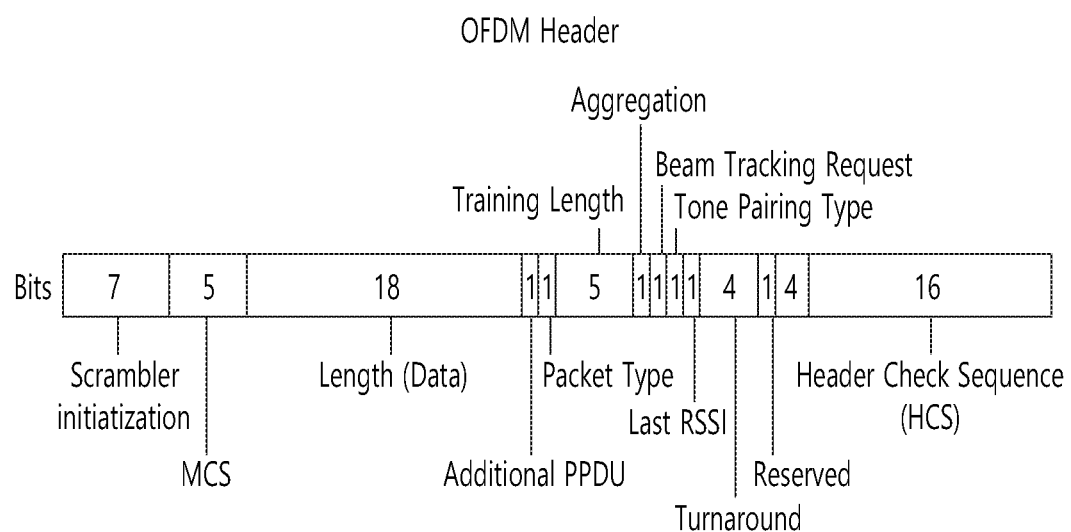

FIG. 7 and FIG. 8 are diagrams describing a configuration of a header field of the radio frame shown in FIG. 6.

More specifically, FIG. 7 illustrates a case where a Single Carrier (SC) mode is used. In the SC mode, the header may include information indicating an initial value of scrambling, information indicating a Modulation and Coding Scheme (MCS) and a data length, information indicating the presence or absence of an additional Physical Protocol Data Unit (PPDU), and information on a packet type, a training length, aggregation or non-aggregation, a presence or absence of a beam training request, a last Received Signal Strength Indicator (RSSI), truncation or non-truncation, a Header Check Sequence (HCS), and so on. Additionally, as shown in FIG. 7, the header has 4 bits of reserved bits, and, in the description presented below, such reserved bits may also be used.

Additionally, FIG. 8 illustrates a detailed configuration of a header corresponding to a case where the OFDM mode is applied. the header may include information indicating an initial value of scrambling, information indicating a MCS and a data length, information indicating the presence or absence of an additional PPDU, and information on a packet type, a training length, aggregation or non-aggregation, a presence or absence of a beam training request, a last RSSI, truncation or non-truncation, a Header Check Sequence (HCS), and so on. Additionally, as shown in FIG. 8, the header has 2 bits of reserved bits, and, just as in the case of FIG. 7, in the description presented below, such reserved bits may also be used.

As described above, the IEEE 802.11ay system considers for the first time the adoption of channel bonding the MIMO technique to the legacy 11ad system. In order to implement channel boning and MIMO, the 11ay system requires a new PPDU structure. In other words, when using the legacy 11ad PPDU structure, there are limitations in supporting the legacy user equipment (UE) and implementing channel bonding and MIMO at the same time.

For this, a new field for the 11ay UE may be defined after the legacy preamble and legacy header field for supporting the legacy UE. And, herein, channel bonding and MIMO may be supported by using the newly defined field.

FIG. 9 is a diagram showing a PPDU structure according to a preferred embodiment of the present invention. In FIG. 9, a horizontal axis may correspond to a time domain, and a vertical axis may correspond to a frequency domain.

When two or more channels are bonded, a frequency band having a predetermined size (e.g., a 400 MHz band) may exist between a frequency band (e.g., 1.83 GHz) that is used between each channel. In case of a Mixed mode, a legacy preamble (legacy STF, legacy CE) is duplicated through each channel. And, according to the exemplary embodiment of the present invention, it may be considered to perform the transmission (gap filling) of a new STF and CE field along with the legacy preamble at the same time through the 400 MHz band between each channel.

In this case, as shown in FIG. 9, the PPDU structure according to the present invention has a structure of transmitting ay STF, ay CE, ay Header B, and ay payload after legacy preamble, legacy header, and ay Header A via wideband. Therefore, the ay Header and ay Payload fields, which are transmitted after the Header field, may be transmitted through the channels that are used for the channel bonding. Hereinafter, in order to differentiate the ay Header from the legacy Header, the ay Header may be referred to as an enhanced directional multi-gigabit (EDMG) Header, and the corresponding terms may be used interchangeably.

For example, a total of 6 channels or 8 channels (each corresponding to 2.16 GHz) may exist in the 11ay system, and a maximum of 4 channels may be bonded and transmitted to a single STA. Accordingly, the ay header and the ay Payload may be transmitted through bandwidths of 2.16 GHz, 4.32 GHz, 6.48 GHz, and 8.64 GHz.

Alternatively, a PPDU format of a case where the legacy preamble is repeatedly transmitted without performing the above-described gap-filling may also be considered.

In this case, since the Gap-Filling is not performed, the PPDU has a format of transmitting the ay STF, ay CE, and ay Header B after the legacy preamble, legacy header, and ay Header A without the GF-STF and GF-CE fields, which are illustrated in dotted lines in FIG. 8.

Figure 10:
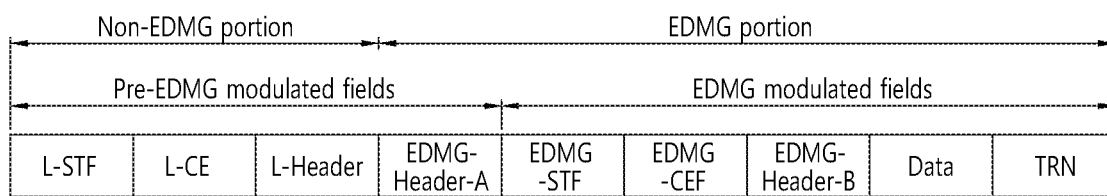
FIG. 10 is a diagram showing a simple PPDU structure that can be applied to the present invention.

FIG. 10 is a diagram showing a simple PPDU structure that can be applied to the present invention. When briefly summarizing the above-described PPDU format, the PPDU format may be illustrated as shown in FIG. 10.

As shown in FIG. 10, the PPDU format that is applicable to the flay system may include L-STF, L-CEF, L-Header, EDMG-Header-A, EDMG-STF, EDMG-CEF, EDMG-Header-B, Data, and TRN fields, and the above-mentioned fields may be selectively included in accordance with the format of the PPDU (e.g., SU PPDU, MU PPDU, and so on).

Herein, the part (or portion) including the L-STF, L-CEF, and L-header fields may be referred to as a Non-EDMG portion, and the remaining part (or portion) may be referred to as an EDMG portion (or region). Additionally, the L-STF, L-CEF, L-Header, and EDMG-Header-A fields may be referred to as pre-EDMG modulated fields, and the remaining fields may be referred to as EDMG modulated fields.

The (legacy) preamble part of the above-described PPDU may be used for packet detection, Automatic Gain Control (AGC), frequency offset estimation, synchronization, indication of modulation (SC or OFDM), and channel estimation. A format of the preamble may be common to both OFDM packets and SC packets. Herein, the preamble may be configured of a Short Training Field (STF) and a Channel Estimation (CE) field that is positioned after the STF field.

Figure 11:
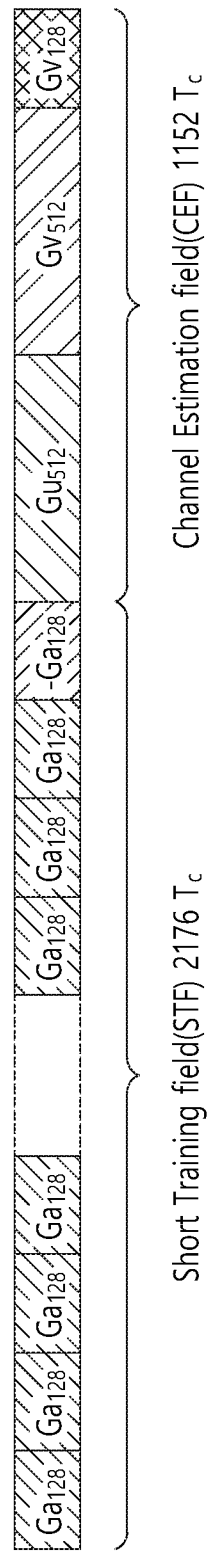
FIG. 11 is a diagram showing a packet preamble that is included in a (legacy) preamble according to the present invention.

FIG. 11 is a diagram showing a packet preamble that is included in a (legacy) preamble according to the present invention.

The STF is configured of 16 repetitions of $Ga_{128}(n)$ sequences having the length of 128 followed by a single $-Ga_{128}(n)$ sequence. Herein, the waveform for the STF may be expressed as shown in the following equation.

$$r_{STF}(nT_c) = \begin{cases} (Ga_{128}(n \bmod 128))\exp\left(j\pi\frac{n}{2}\right) & n = 0, 1, \ldots, 16 \times 128 - 1 \\ (-Ga_{128}(n \bmod 128))\exp\left(j\pi\frac{n}{2}\right) & n = 16 \times 128, \ldots, 17 \times 128 - 1 \end{cases} \quad \text{[Equation 1]}$$

The Golay sequences (e.g., $Ga_{128}(n)$, $Gb_{128}(n)$, $Ga_{64}(n)$, $Gb_{64}(n)$, $Ga_{32}(n)$, $Gb_{32}(b)$) are used in the preamble, a single carrier guard interval, and beam refinement TRN-R/T and AGC fields. The Golay sequences may be referred to as complementary sequences. The subscript indicates the length of the sequences. The sequences are generated by using the following recursive procedure.

$$A_0(n) = \delta(n)$$

$$B_0(n) = \delta(n)$$

$$A_k(n) = W_k A_{k-1}(n) + B_{k-1}(n - D_k)$$

$$B_k(n) = W_k A_{k-1}(n) - B_{k-1}(n - D_k) \quad \text{[Equation 2]}$$

Herein, in case n<0 or n≥$2^k$, $A_k(n)$ and $B_k(n)$ may each be given the value of 0.

In the above-described procedure, in case $D_k$=[1 8 2 4 16 32 64] (k=1, 2, ..., 7) and $W_k$=[−1 −1 −1 −1 +1 −1 −1] are used, values may be given as $Ga_{128}(n) = A_7(128-n)$ and $Gb_{128}(n) = B_7(128-n)$.

Alternatively, in the above-described procedure, in case $D_k$[2 1 4 8 16 32] and $W_k$=[1 1 −1 −1 1 −1] are used, values may be given as $Ga_{64}(n) = A_6(64-n)$ and $Gb_{64}(n) = B_6(64-n)$.

Alternatively, in the above-described procedure, in case $D_k$=[1 4 8 2 16] and $W_k$=[−1 1 −1 1 −1] are used, values may be given as $Ga_{32}(n) = A_5(32-n)$ and $Gb_{32}(n) = B_5(32-n)$.

Each of the above-described sequences may be indicated as shown in FIG. 12 to FIG. 17. Herein, the sequences are normative, the description presented above is informative.

Hereinafter, FIG. 12 to FIG. 17 are diagrams showing Golay sequences that can be applied to the present invention.

3. Exemplary Embodiment that is Applicable to the Present Invention

The PPDU format shown in FIG. 10 may be applied as the PPDU format of the 11ay system that is applicable to the present invention. Herein, an AGC field may be additionally included in a section that is positioned between the Data field and the TRN field.

At this point, each field may be defined as shown below.

TABLE 2

| Field | Description |
|---|---|
| L-STF | Non-EDMG Short Training field |
| L-CEF | Non-EDMG Channel Estimation field |
| L-Header | Non-EDMG Header field |
| EDMG-Header-A | EDMG Header A field |
| EDMG-STF | EDMG Short Training field |

TABLE 2-continued

| Field | Description |
| --- | --- |
| EDMG-CEF | EDMG CHannel Estimation field |
| EDMG-Header-B | EDMG Header B field |
| Data | The Data field carriers the PSDU(s) |
| AGC | Automatic Gain Control field |
| TRN | Training sequences field |

In case the STA according to the present invention is operated in accordance with a Single Input Single Output (SISO) scheme that uses a single channel, the EDMG-STF and EDMG-CEF of Table 2 may not be transmitted.

Hereinafter, a method of designing an EDMG-STF for an OFDM packet (or for an OFDM transmission mode) is proposed based on the above-described technical configurations. More specifically, the present invention proposes a method of designing an EDMG-STF for an OFDM packet while considering the following reference details. Hereinafter, the reference details that are being considered in the present invention will be described in detail.

(1) Frequency/Time Domain Sequence

The EDMG-STF for an OFDM packet may be transmitted by being configured of a sequence that is generated in the time domain. For example, the EDMG-STF for an OFDM packet may be defined as a DMG-STF that is defined in the 11ad system, or as a new Golay sequence, or as an EDMG-STF for a single carrier (SC) that is defined in the 11ay system.

As a method for matching the sequence defined in the above-described methods with a bandwidth that is occupied by the OFDM packet, a resampling method that is used in the 11ad system may be amended and used, or a new sampling rate may be defined and used. However, the implementation of such configuration may cause a considerable burden.

Accordingly, the present invention proposes a method that allows the EDMG-STF to be compatible with an EDMG-CEF by generating a sequence that corresponds to the EDMG-STF in the frequency domain. Thus, by also allowing the bandwidths for the payloads to match one another, a more accurate AGC may be performed as compared to the STA.

Figure 18:
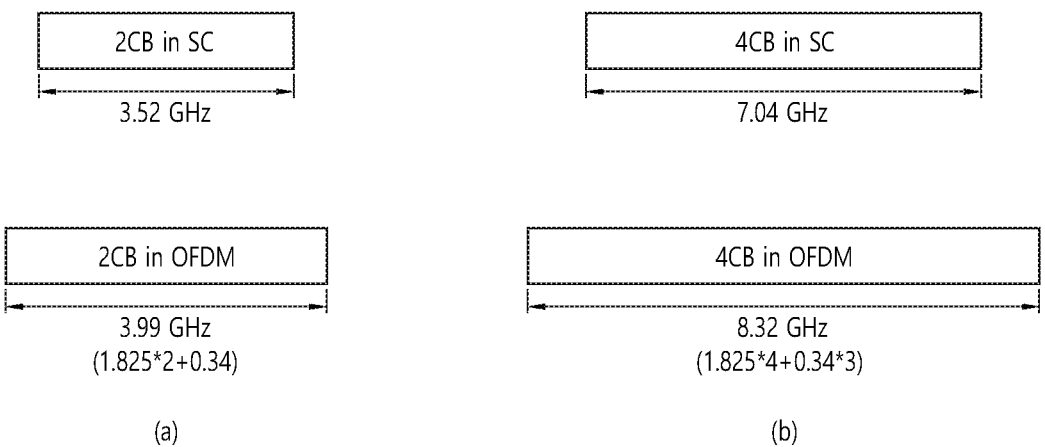
FIG. 18 is a diagram respectively showing bandwidths of an SC packet and an OFDM packet in case of a 2-channel bonding and a 4-channel bonding.

FIG. 18 is a diagram respectively showing bandwidths of an SC packet and an OFDM packet in case of a 2-channel bonding and a 4-channel bonding.

As shown in FIG. 18, in case multiple channels are bonded, a difference between the bandwidth of the SC packet and the bandwidth OFDM packet may be equal to 0.47 GHz (e.g., in case of 2 CB, see (a) of FIG. 18) or 1.28 GHz (e.g., in case of 4 CB, see (b) of FIG. 18) in accordance with the number of bonded channels. Accordingly, a situation where the STA cannot perform an accurate AGC may occur. As described above, the occurrence of such situation increases in accordance with an increase in the number of bonded channels.

(2) Processing Time for L-Header Decoding

The EDMG-STF for the SC packet is designed to have 18 $Ga_{128}*N_{CB}$ sequences and 1—$Ga_{128}*N_{CB}$ sequence considering the processing time of the DMG header. At this point, the time occupied by the total of 18+1 sequences is equal to approximately 1.3818 us. Herein, $N_{CB}$ indicates a number of channels being used for channel bonding by using a channel bonding factor.

As described above, the EDMG-STF for the OFDM packet that is proposed in the present invention may also be designed while considering the processing time of the DMG header. At this point, when it is assumed that the length ($T_{DFT}+T_{GI}$) of one OFDM symbol is equal to 0.2424 us, 6 or more OFDM symbols may be needed for the decoding of the legacy header. This is because 1.3818 us/0.2424 us=5.7. Thus, the configuration of an EDMG-STF by using 6 OFDM symbols is proposed in the present invention.

(3) Compatible Structure to EDMG-STF for SC

As described above, the EDMG-STF for the SC may have a structure of being repeated 4 times within a single carrier block by using Ga128 (in case $N_{CB}$=1). Herein, the structure that is repeated as described above and the number of such structure may influence the AGC and the synchronization performance. Accordingly, the OFDM-specific EDMG-STF may also have a structure of being repeated 4 times during one DFT/IDFT period so as to have similar performance requirement values as the SC.

Herein, the structure of having a specific sequence being repeated 4 times during one DFT/IDFT period is advantageous in that, when considering that a Cyclic Prefix (CP) length of the 11ad system is configured of $T_{DFT}/4$, the corresponding structure has a uniform structure wherein a specific sequence is repeated 5 times during one OFDM symbol period.

As described above, in order to allow a specific sequence to be repeated 4 times within the time domain during the DFT/IDFT period, the EDMG-STF for the OFDM according to the present invention may have a structure of having 3 zeros (0s) being repeatedly inserted within the frequency domain.

(4) Hardware (HW) Complexity

As a solution for reducing hardware (HW) complexity, a value other than 0 being included in the EDMG-STF sequence, which is proposed in the present invention, may be given a value corresponding to any one of +1, −1, +j, and −j.

(5) Orthogonality for MIMO Support

In order to support MIMO transmission, the sequences for each of the spatial streams according to the present invention may be designed to be mutually orthogonal (or orthogonal to one another).

(6) Peak to Average Power Ratio (PAPR) Performance

In order to achieve highly reliable signal transmission and reception, the sequences according to the present invention may be designed to minimize PAPR. Most particularly, the EDMG-STF according to the present invention may be designed to have a similar PAPR as the PAPR (e.g., 3.12 dB) of the DMG-CEF of the 11ad system.

Hereinafter, a sequence that is applicable to a case where one or two channels are bonded based upon the above-described reference details and a method for generating the corresponding sequence will be described in detail.

Herein, the EDMG-STF according to the present invention has a fixed time size (or length) (e.g., 6 OFDM symbol periods). At this point, the fixed time size may be configured independently from the number of space-time sequences.

The structure of the EDMG-STF field according to the present invention may be determined based on a number of consecutive channels (e.g., 2.16 GHz channel) being transmitted and an index of a space-time stream.

3.1. In Case of a Single Channel, Sequence of an EDMG-STF for OFDM

In order to perform an EDMG OFDM transmission through a single channel (e.g., 2.16 GHz), a frequency sequence (or frequency domain signal), which is used for configuring the EDMG STF field for the $i_{STS}^{th}$ space-time stream, may be expressed as shown below in the following equation.

$$\text{EDMG-STF}_{177,177}^{iSTS} = \{\text{EDMGS}_{left,176}^{iSTS}, 0, 0, 0, \text{EDMGS}_{right,176}^{iSTS}\}$$

where "$i_{STS}$" is the space-time stream number and $1 \leq i_{STS} \leq 4$ $$EDMG\text{-}STF_{177,177}{}^{i_{STS}} = \{EDMGS_{left,176}{}^{i_{STS}},0,0,0,-EDMGS_{right,176}{}^{i_{STS}}\} \quad \text{[Equation 3]}$$

where "$i_{STS}$" is the space-time stream number and $5 \leq i_{STS} \leq 8$

At this point, $EDMGS_{left,176}{}^{i_{STS}}$ and $EDMGS_{right,176}{}^{i_{STS}}$ for each space-time stream may be defined as shown in FIG. 19 to FIG. 20. More specifically, FIG. 19 is a diagram respectively showing $EDMGS_{left,176}{}^{i_{STS}}$ and $EDMGS_{right,176}{}^{i_{STS}}$ in cases where ism is equal to 1 to 4, and FIG. 20 is a diagram respectively showing $EDMGS_{left,176}{}^{i_{STS}}$ and $EDMGS_{right,176}{}^{i_{STS}}$ in cases where $i_{STS}$ is equal to 5 to 8.

A more generalized version of Equation 3 and each sequence shown in FIG. 19 and FIG. 20 may be expressed as sequences for each space-time stream shown below.

$$EDMG\text{-}STF_{177,177}{}^{i_{STS}} = \{EDMGS_{left,176}{}^{i_{STS}},0,0,0,EDMGS_{right,176}{}^{i_{STS}}\} \quad \text{[Equation 4]}$$

where:

$i_{STS}$ is the space-time stream number and $1 \leq i_{STS} \leq 8$

At this point, the $EDMGS_{left,176}{}^{i_{STS}}$ and $EDMGS_{right,176}{}^{i_{STS}}$ for each space-time stream may be respectively defined as shown below in FIG. 21 and FIG. 22.

Referring to the above-described equations, $i_{STS}$ may indicate a space-time stream index, and a subscript may indicate the length of each sequence. Additionally, the three zero (0) values that are positioned in the middle part of the equation presented above may denote a null carrier for a Direct Current (DC) offset removal.

Additionally, a frequency domain signal for each space-time stream configuring the EDMG-STF field for the EDMG OFDM transmission through a single channel may further include a predetermined number of zeros (0s) before and after the corresponding signal as a guard subcarrier. For example, 79 zeros (0s) may be added in front of (or before) the above-described equations, and 78 zeros (0s) may be added behind (or after) the above-described equations.

Meanwhile, as a solution for preventing unintentional beamforming, which occurs in a case where the same signal is transmitted from each stream when performing MIMO transmission, the sequences for each space-time stream that are proposed in the present invention may be designed to be mutually orthogonal.

Hereinafter, as an example that is applicable to the present invention, an example for generating the above-described sequences will be described in detail. According to the present invention, in order to generate the above-described sequence, the STA according to the present invention may use a sequence generating method, which will be described later on, or use sequence information (or table information) stored in a separate storage device, or use other diverse methods. Therefore, in order to generate an EDMG-STF field, the STA according to the present invention may use the detailed sequences that are described above. However, in this case, the STA according to the present invention may not necessarily use only the following method but may also use other methods so as to generate and use the above-described sequences.

For example, the $EDMGS_{left,176}{}^{i_{STS}}$ and $EDMGS_{right,176}{}^{i_{STS}}$ for each space-time stream, which are described above in Equation 3 and FIG. 19 and FIG. 20, may be drawn in accordance with the following procedure.

Firstly, the $EDMGS_{left,176}{}^{i_{STS}}(n)$ and $EDMGS_{right,176}{}^{i_{STS}}(n)$ may be defined as shown below in the following equation. At this point, $EDMGS_{left,176}{}^{i_{STS}}(n)$ may refer to an $n^{th}$ value of the $EDMGS_{left,176}{}^{i_{STS}}$, and $EDMGS_{right,176}{}^{i_{STS}}(n)$ may refer to an $n^{th}$ value of the $EDMGS_{right,176}{}^{i_{STS}}$.

$$EDMGS_{left,176}^{i_{STS}}(n) = \begin{cases} A_2^{i_{STS}}(\lfloor n/4 \rfloor), & n \bmod 4 = 1 \\ 0, & n \bmod 4 \neq 1 \end{cases} \quad \text{[Equation 5]}$$

$$EDMGS_{right,176}^{i_{STS}}(n) = \begin{cases} B_2^{i_{STS}}(\lfloor n/4 \rfloor), & n \bmod 4 = 2 \\ 0, & n \bmod 4 \neq 2 \end{cases}$$

Referring to Equation 5, $A_2^{i_{STS}}$ and $B_2^{i_{STS}}$ may be generated through a recursive procedure, which is shown below in the following equation.

$A_0^{i_{STS}}(n) = [+1,+j,+j,-1,-j,+j,-1,+1,-1,+j,+1]$, for $i_{STS} = 1,2,\ldots,8$ $B_0^{i_{STS}}(n) = [-1,+1,-1,+j,+1,+1,-j,-j,-j,+1,+1]$, for $i_{STS} = 1,2,\ldots,8$ $A_k^{i_{STS}}(n) = [W_k^{i_{STS}} A_{k-1}^{i_{STS}}(n), B_{k-1}^{i_{STS}}(n)]$ $B_k^{i_{STS}}(n) = [W_k^{i_{STS}} A_{k-1}^{i_{STS}}(n), -B_{k-1}^{i_{STS}}(n)]$ [Equation 6]

Herein, k indicates an iteration index, and $W_k^{i_{STS}}$ indicates the weight for a sequence of the $i_{STS}{}^{th}$ space-time stream and a $k^{th}$ iteration.

A $W_k^{i_{STS}}$ vector for each space-time stream may be expressed as shown below in Table 3.

TABLE 3

| Space-time stream number | $W_k^{i_{STS}}$ |
|---|---|
| 1 | [+1, +1] |
| 2 | [+1, −1] |
| 3 | [+1, +j] |
| 4 | [+1, −j] |
| 5 | [+1, +1] |
| 6 | [+1, −1] |
| 7 | [+1, +j] |
| 8 | [+1, −j] |

In case of configuring the $W_k^{i_{STS}}$ vector for each space-time stream as shown in Table 3, which is presented above, a PAPR for each space-time stream may be expressed as shown below.

TABLE 4

| Space-time stream number | PAPR (dB) |
|---|---|
| 1 | 3.00 |
| 2 | 2.99 |
| 3 | 2.99 |
| 4 | 3.00 |
| 5 | 2.99 |
| 6 | 3.00 |
| 7 | 3.00 |
| 8 | 3.00 |

At this point, considering that the DMG-CEF has 3.12 dB, it may be verified that the EDMGD-STF according to the present invention has excellent performance.

3.2.2 In case of Channel Bonding, Sequence of an EDMG-STF for OFDM

In order to perform an EDMG OFDM transmission through a channel configured of 2 bonded channels (e.g., 4.32 GHz), a frequency sequence (or frequency domain signal), which is used for configuring the EDMG STF field for the $i_{STS}{}^{th}$ space-time stream, may be expressed as shown below in the following equation.

$$EDMG\text{-}STF_{386,386}{}^{i_{STS}} = \{0, EDMGS_{left,384}{}^{i_{STS}}, 0, 0, 0, EDMGS_{right,384}{}^{i_{STS}}, 0\} \quad \text{[Equation 7]}$$

where "$i_{STS}$" is the space-time stream number and $1 \leq i_{STS} \leq 8$

At this point, $EDMGS_{left,384}^{iSTS}$ and $EDMGS_{right,384}^{iSTS}$ for each space-time stream may be defined as shown in FIG. 23 to FIG. 26. More specifically, FIG. 23 is a diagram respectively showing and $EDMGS_{left,384}^{iSTS}$ and $EDMGS_{right,384}^{iSTS}$ in a case where $i_{STS}$ is equal to 1 or 2, FIG. 24 is a diagram respectively showing $EDMGS_{left,384}^{iSTS}$ and $EDMGS_{right,384}^{iSTS}$ in a case where $i_{STS}$ is equal to 3 or 4, FIG. 25 is a diagram respectively showing $EDMGS_{left,384}^{iSTS}$ and $EDMGS_{right,384}^{iSTS}$ in a case where $i_{STS}$ is equal to 5 or 6, and FIG. 26 is a diagram respectively showing $EDMGS_{left,384}^{iSTS}$ and $EDMGS_{right,384}^{iSTS}$ in a case where $i_{STS}$ is equal to 7 or 8.

As a more simplified version of Equation 7 and each sequence shown in FIG. 23 to FIG. 26, sequences for each space-time stream may be expressed as shown below.

$$EDMG\text{-}STF_{386,386}^{iSTS} = \{EDMGS_{left,385}^{iSTS}, 0,0,0, EDMGS_{right,385}^{iSTS} 0\} \quad \text{[Equation 8]}$$

where:

$i_{STS}$ is the space-time stream number and $1 \le i_{STS} \le 8$

At this point, the $EDMGS_{left,385}^{iSTS}$ and $EDMGS_{right,385}^{iSTS}$ for each space-time stream may be respectively defined as 0, $EDMGS_{left,384}^{iSTS}$ and $EDMGS_{right,384}^{iSTS}$, 0 of Equation 7. More specifically, FIG. 27 is a diagram respectively showing $EDMGS_{left,385}^{iSTS}$ in a case where $i_{STS}$ is equal to 1 to 4, FIG. 28 is a diagram respectively showing $EDMGS_{left,385}^{iSTS}$ in a case where $i_{STS}$ is equal to 5 to 8, FIG. 29 is a diagram respectively showing $EDMGS_{right,385}^{iSTS}$ in a case where ism is equal to 1 to 4, and FIG. 30 is a diagram respectively showing $EDMGS_{right,385}^{iSTS}$ in a case where $i_{STS}$ is equal to 5 to 8.

Referring to the above-described equations, ism may indicate a space-time stream index (or spatial stream index), and a subscript may indicate the length of each sequence. Additionally, the three zero (0) values that are positioned in the middle part of the equation presented above may denote a null carrier for a Direct Current (DC) offset removal.

Meanwhile, as a solution for preventing unintentional beamforming, which occurs in a case where the same signal is transmitted from each stream when performing MIMO transmission, the sequences for each space-time stream that are proposed in the present invention may be designed to be mutually orthogonal.

Hereinafter, as an example that is applicable to the present invention, an example for generating the above-described sequences will be described in detail. In other words, in order to generate the above-described sequence, the STA according to the present invention may use a sequence generating method, which will be described later on, or use sequence information (or table information) stored in a separate storage device, or use other diverse methods. Therefore, in order to generate an EDMG-STF field, the STA according to the present invention may use the detailed sequences that are described above. However, in this case, the STA according to the present invention may not necessarily use only the following method but may also use other methods so as to generate and use the above-described sequences.

For example, the $EDMGS_{left,384}^{iSTS}$ and $EDMGS_{right,384}^{iSTS}$ for each space-time stream, which are defined as described above in Equation 7 and FIG. 24 to FIG. 26, may be drawn in accordance with the following procedure.

Firstly, the $EDMGS_{left,384}^{iSTS}$ and $EDMGS_{right,384}^{iSTS}$ may be defined as shown below in the following equation. At this point, $EDMGS_{left,384}^{iSTS}(n)$ refers to an $n^{th}$ value of $EDMGS_{left,384}^{iSTS}$ and $EDMGS_{right,384}^{iSTS}(n)$ and refers to an $n^{th}$ value of $EDMGS_{right,384}^{iSTS}$.

$$EDMGS_{left,384}^{iSTS}(n) = \begin{cases} A_5^{iSTS}(\lfloor n/4 \rfloor), & n \bmod 4 = 1 \\ 0, & n \bmod 4 \ne 1 \end{cases} \quad \text{[Equation 9]}$$

$$EDMGS_{right,384}^{iSTS}(n) = \begin{cases} B_5^{iSTS}(\lfloor n/4 \rfloor), & n \bmod 4 = 2 \\ 0, & n \bmod 4 \ne 2 \end{cases}$$

Referring to Equation 9, $A_5^{iSTS}$ and $B_5^{iSTS}$ may be generated through a recursive procedure, which is shown below in the following equation.

$A_0^{iSTS}(n) = [+1, +1, -1]$, for $i_{STS} = 1, 2, \ldots, 8$ $B_0^{iSTS}(n) = [+1, +j, +1]$, for $i_{STS} = 1, 2, \ldots, 8$ $A_k^{iSTS}(n) = [W_k^{iSTS} A_{k-1}^{iSTS}(n), B_{k-1}^{iSTS}(n)]$ $$B_k^{iSTS}(n) = [W_k^{iSTS} A_{k-1}^{iSTS}(n), -B_{k-1}^{iSTS}(n)] \quad \text{[Equation 10]}$$

Herein, k indicates an iteration index, and $W_k^{iSTS}$ indicates the weight for a sequence of the $i_{STS}^{th}$ space-time stream and a $k^{th}$ iteration.

A $W_k^{iSTS}$ vector for each space-time stream may be expressed as shown below in Table 5.

TABLE 5

| Space-time stream number | $W_k^{iSTS}$ |
| --- | --- |
| 1 | [+1, +1, +1, +1, +1] |
| 2 | [+1, +1, −1, +1, +1] |
| 3 | [+1, −1, +1, +1, +1] |
| 4 | [+1, −1, −1, +1, +1] |
| 5 | [−1, +1, +1, +1, +1] |
| 6 | [−1, +1, −1, +1, +1] |
| 7 | [−1, −1, +1, +1, +1] |
| 8 | [−1, −1, −1, +1, +1] |

Additionally, in Equation 10, $B_0^{iSTS}(n) = [-1, -j, -1]$ may be applied instead of $B_0^{iSTS}(n) = [+1, +j, +1]$.

Alternatively, referring to Equation 10, element values corresponding to an inverse order of the elements shown in Equation 10 may be applied to $A_0^{iSTS}$ and $B_0^{iSTS}$. Accordingly, this may be expressed as $A_0^{iSTS}(n) = [-1, +1, +1]$ and $B_0^{iSTS}(n) = [+1, +j, +1]$.

Meanwhile, elements satisfying mutual orthogonality may be applied as the $W_k^{iSTS}$ vector for each space-time stream. For example, unlike Table 5, complex numbers including imaginary numbers may also be applied as the elements configuring the $W_k^{iSTS}$ vector for each space-time stream.

In case of configuring the $W_k^{iSTS}$ vector for each space-time stream as shown in Table 5, which is presented above, a PAPR for each space-time stream may be expressed as shown below.

TABLE 6

| Space-time stream number | PAPR (dB) |
| --- | --- |
| 1 | 2.99 |
| 2 | 3.00 |
| 3 | 3.00 |
| 4 | 3.00 |
| 5 | 2.99 |
| 6 | 3.00 |
| 7 | 3.00 |
| 8 | 3.00 |

Referring to the above-described configurations, the EDMG-STF field transmit (or transmission) waveform in the time domain may be defined as shown below, in a case where the OFDM sampling rate corresponds to $F_s=N_{CB}*2.64$ GHz and where the time period (or duration) corresponds to $T_s=1/F_s$ ns.

$$r_{EDMG-STF}^{iTX}(qT_s) = \frac{1}{\sqrt{N_{STS} \cdot N_{EDMG-STF}^{Tone}}}$$

$$w(qT_s) \cdot \sum_{k=-N_{SR}}^{N_{SR}} \sum_{i_{STS}=1}^{N_{STS}} [Q_k]_{i_{TX},i_{STS}} EDMG-$$

$$STF_k^{i_{STS}} \exp(j2\pi k \Delta_F (qT_s)) \quad \text{[Equation 11]}$$

Herein, in case $N_{CB}=1, 2, 3,$ and 4, the $N_{EDMG-STF}^{Tone}$ is respectively equal to 88, 192, 296, and 400, and $Q_k$ indicates a $k^{th}$ spatial mapping matrix per subcarrier, and $[\ ]_{m,n}$ indicates a matrix element of an $m^{th}$ row and an $n^{th}$ column. $w(qT_s)$ indicates a window function that is applied in order to mitigate the transitions between consecutive OFDM symbols. And, herein, the definition of the $w(qT_s)$ may be implementation dependent.

Figure 31:
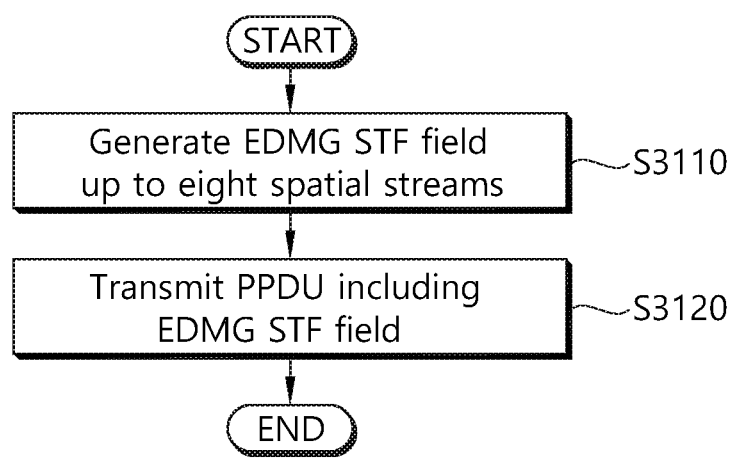
FIG. 31 is a flow chart showing a signal transmission method according to an exemplary embodiment of the present invention.

FIG. 31 is a flow chart showing a signal transmission method according to an exemplary embodiment of the present invention.

Firstly, a station (STA) according to the present invention generates an EDMG STF field, which is being transmitted in an OFDM mode (or transmitted for an OFDM packet) based on a number of channels, which are included in a bonded channel through which an EDMG PPDU is transmitted, and an index of a space-time stream (S3110).

At this point, an EDMG STF sequence for each space-time stream being included in the EDMG STF field may be configured to have a format of A, 0, 0, 0, B. More specifically, in case the number of bonded channels is equal to 1, A and B may be configured of 176-length sequences. And, in case the number of bonded channels is equal to 1, A and B may be configured of 385-length sequences.

At this point, a maximum of 8 space-time streams may be configured, and A and B for each space-time stream may be respectively orthogonal to the A and B of another space-time stream. In other words, A (or B) of a first space-time stream may be configured to be mutually orthogonal to A (or B) of a second space-time stream.

As a detailed example, in case the number of channels being included in the bonded channels is equal to 1, A and B for each space-time stream may be configured as shown in FIG. 21 and FIG. 22. Alternatively, in case the number of channels being included in the bonded channels is equal to 2, A and B for each space-time stream may be configured as shown in FIG. 27 to FIG. 30.

Herein, the EDMG STF field may be configured of 6 OFDM symbol lengths.

According to the present invention, values other than 0 that are included in A and B may have a configuration, wherein values of a first sequence and a second sequence, each having a different length according to the number of channels being included in the bonded channels, are repeatedly positioned after being added with a weight according to a predetermined rule.

Firstly, the detailed technical characteristics corresponding to a case where the number of channels included in the bonded channel, through which the EDMG PPDU is transmitted, is equal to 1 will be described below.

Values other than 0 that are included in A and B may be set up to have a configuration, wherein values of the first sequence and the second sequence, each having a length of 11, are repeatedly positioned after being added with a weight according to a predetermined rule.

At this point, a maximum of 8 space-time streams may be configured, and the first sequence) ($A_0^{iSTS}(n)$) and the second sequence ($B_0^{iSTS}(n)$) of each space-time stream ($i_{STS}$) may each be configured to have a sequence as shown below in Equation 12.

$$A_0^{iSTS}(n)=[+1,+j,+j,-1,-j,+j,-1,+1,-1,+j,+1]$$

$$B_0^{iSTS}(n)=[-1,+1,-1,+j,+1,+1,-j,-j,-j,+1,+1] \quad \text{[Equation 12]}$$

Herein, values other than 0 being included in A and B may be configured of sequences of $A_2^{iSTS}(n)$ and $B_2^{iSTS}(n)$, which are respectively determined by Equation 13 shown below.

$$A_k^{iSTS}(n)=[W_k^{iSTS}A_{k-1}^{iSTS}(n),B_{k-1}^{iSTS}(n)]$$

$$B_k^{iSTS}(n)=[W_k^{iSTS}A_{k-1}^{iSTS}(n),-B_{k-1}^{iSTS}(n)] \quad \text{[Equation 13]}$$

Additionally, the $W_k^{iSTS}$ for each space-time stream shown in Equation 13 may be expressed as shown below in the following Table.

TABLE 7

| Space-time stream number | $W_k^{iSTS}$ |
|---|---|
| 1 | [+1, +1] |
| 2 | [+1, −1] |
| 3 | [+1, +j] |
| 4 | [+1, −j] |
| 5 | [+1, +1] |
| 6 | [+1, −1] |
| 7 | [+1, +j] |
| 8 | [+1, −j] |

Herein, A and B of each space-time stream may include a 0, 0, 0 sequence between the values other than 0.

Most particularly, A of each space-time stream may include a 0 sequence, which is positioned in a foremost position, and a 0, 0 sequence, which is positioned in a rearmost position. And, B of each space-time stream may include a 0, 0 sequence, which is positioned in a foremost position, and a 0 sequence, which is positioned in a rearmost position. More specifically, as shown in FIG. 19 to FIG. 22, the entire sequence corresponding to A for each space-time stream may include one '0' sequence, which is positioned in the foremost position, and two '0' sequences, which are positioned in the rearmost position. And, the entire sequence corresponding to B for each space-time stream may include two '0' sequences, which are positioned in the foremost position, and one '0' sequence, which is positioned in the rearmost position.

Secondly, the detailed technical characteristics corresponding to a case where the number of channels included in the bonded channel, through which the EDMG PPDU is transmitted, is equal to 2 will be described below.

Values other than 0 that are included in A and B may be set up to have a configuration, wherein values of the first sequence and the second sequence, each having a length of 3, are repeatedly positioned after being added with a weight according to a predetermined rule.

At this point, a maximum of 8 space-time streams may be configured, and the first sequence ($A_0^{iSTS}(n)$) and the second sequence ($B_0^{iSTS}(n)$) of each space-time stream ($i_{STS}$) may each be configured to have a sequence as shown below in Equation 14.

$$A_0^{iSTS}(n)=[+1,+1,-1]$$

$$B_0^{iSTS}(n)=[+1,+j,+1] \quad \text{[Equation 14]}$$

Herein, values other than 0 that are included in A and B may be configured of sequences of $A_5^{iSTS}(n)$ and $B_5^{iSTS}(n)$, which are respectively determined by Equation 15 shown below.

$$A_k^{iSTS}(n)=[W_k^{iSTS}A_{k-1}^{iSTS}(n), B_{k-1}^{iSTS}(n)]$$

$$B_k^{iSTS}(n)=[W_k^{iSTS}A_{k-1}^{iSTS}(n), -B_{k-1}^{iSTS}(n)] \quad \text{[Equation 15]}$$

Additionally, the $W_k^{iSTS}$ for each space-time stream shown in Equation 15 may be expressed as shown below in the following Table.

TABLE 8

| Space-time stream number | $W_k^{iSTS}$ |
|---|---|
| 1 | [+1, +1, +1, +1, +1] |
| 2 | [+1, +1, −1, +1, +1] |
| 3 | [+1, −1, +1, +1, +1] |
| 4 | [+1, −1, −1, +1, +1] |
| 5 | [−1, +1, +1, +1, +1] |
| 6 | [−1, +1, −1, +1, +1] |
| 7 | [−1, −1, +1, +1, +1] |
| 8 | [−1, −1, −1, +1, +1] |

Herein, A and B of each space-time stream may include a 0, 0, 0 sequence between the values other than 0.

Most particularly, A and B of each space-time stream may each include a 0, 0 sequence, which is positioned in a foremost position, and a 0, 0 sequence, which is positioned in a rearmost position. More specifically, as shown in FIG. 23 to FIG. 30, the entire sequence corresponding to A and B for each space-time stream may include two '0' sequences, which are positioned in the foremost position, and two '0' sequences, which are positioned in the rearmost position.

Thereafter, the station transmits the EDMG STF field being transmitted in the OFDM mode to another station through a space-time stream within the one or two bonded channels (S3120).

4. Device Configuration

Figure 32:
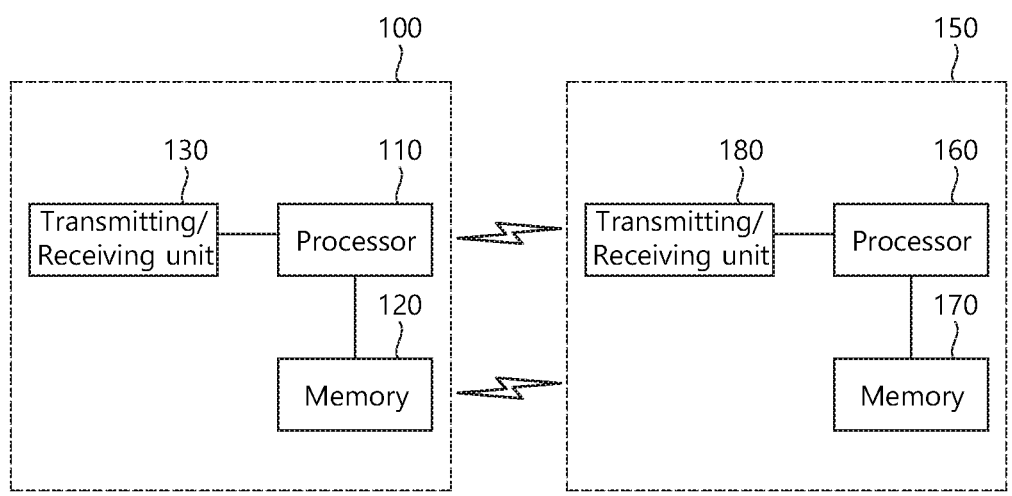
FIG. 32 is a diagram describing a device for implementing the above-described method.

FIG. 32 is a diagram describing a device for implementing the above-described method.

A wireless device (100) of FIG. 32 may correspond to an initiator STA, which transmits a signal that is described in the description presented above, and a wireless device (150) may correspond to a responder STA, which receives a signal that is described in the description presented above. At this point, each station may correspond to a 11ay device (or user equipment (UE)) or a PCP/AP. Hereinafter, for simplicity in the description of the present invention, the initiator STA transmits a signal is referred to as a transmitting device (100), and the responder STA receiving a signal is referred to as a receiving device (150).

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

As described above, the detailed description of the preferred exemplary embodiment of the present invention is provided so that anyone skilled in the art can implement and execute the present invention. In the detailed description presented herein, although the present invention is described with reference to the preferred exemplary embodiment of the present invention, it will be understood by anyone having ordinary skills in the art that diverse modifications, alterations, and variations can be made in the present invention. Therefore, the scope and spirit of the present invention will not be limited only to the exemplary embodiments of the present invention set forth herein. Thus, it is intended to provide the broadest scope and spirit of the appended claims of the present invention that are equivalent to the disclosed principles and novel characteristics of the present invention.

INDUSTRIAL APPLICABILITY

Although the present invention has been described in detail under the assumption that the present invention can be applied to an IEEE 802.11 based wireless LAN (WLAN) system, the present invention will not be limited only to this. It will be understood that the present invention can be applied to diverse wireless systems capable of performing data transmission based on channel bonding by using the same method as presented herein.

What is claimed is:

1. A method in a wireless local area network (WLAN) system, the method performed by a first station (STA) in an Orthogonal Frequency Division Multiplexing (OFDM) mode and comprising:
    generating an Enhanced Directional Multi Gigabit (EDMG) Short Training Field (EDMG STF) signal a STF sequence,
    wherein the STF sequence includes an A sequence and a B sequence; and
    transmitting an EDMG Physical Protocol Data Unit (PPDU) including the generated EDMG STF signal via a wireless channel based on one or more space-time streams (STSs) to the second STA,
    wherein the A sequence and the B sequence are determined based on a number of contiguous 2.16 GHz channels for the wireless channel and an index value of the one or more STSs, and
    wherein the STF sequence is defined as {A, 0, 0, 0, B}.

2. The method of claim 1, wherein the wireless channel includes a single 2.16 GHz channel, the A sequence and the B sequence have a length of 176 bits, respectively.

3. The method of claim 2, wherein when the index value is '1',
    the A sequence is defined as {0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0, 0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0}, and the B sequence is defined as {0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0, 0, 0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −j, 0, 0, 0, −1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0}, and wherein when the index value is '2', the A sequence is defined as {0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −j, 0, 0, 0, −1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0}, and the B sequence is defined as {0, 0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −j, 0, 0, 0, −1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0, 0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0}.

4. The method of claim 2, wherein when the index value is '3', the A sequence is defined as {0, +j, 0, 0, 0, −1, 0, 0, 0, −1, 0, 0, 0, −j, 0, 0, 0, 1, 0, 0, 0, −1, 0, 0, 0, −j, 0, 0, 0, +j, 0, 0, 0, −j, 0, 0, 0, −1, 0, 0, 0, +j, 0, 0, 0, −j, 0, 0, 0, −j, 0, 0, 0, −1, 0, 0, 0, +j, 0, 0, 0, +j, 0, 0, 0, 1, 0, 0, 0, 1, 0, 0, 0, 1, 0, 0, 0, +j, 0, 0, 0, +j, 0, 0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, +j, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0}, and the B sequence is defined as {0, 0, +j, 0, 0, 0, −1, 0, 0, 0, −1, 0, 0, 0, −j, 0, 0, 0, 1, 0, 0, 0, −1, 0, 0, 0, −j, 0, 0, 0, +j, 0, 0, 0, −j, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, 1, 0, 0, 0, 1, 0, 0, 0, 1, 0, 0, 0, +j, 0, 0, 0, +j, 0, 0, 0, 1, 0, 0, 0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0}, and wherein when the index value is '4', the A sequence is defined as {0, −j, 0, 0, 0, 1, 0, 0, 0, 1, 0, 0, 0, +j, 0, 0, 0, −1, 0, 0, 0, 1, 0, 0, 0, +j, 0, 0, 0, −j, 0, 0, 0, +j, 0, 0, 0, 1, 0, 0, 0, −j, 0, 0, 0, +j, 0, 0, 0, −j, 0, 0, 0, 1, 0, 0, 0, −j, 0, 0, 0, −j, 0, 0, 0, −1, 0, 0, 0, −1, 0, 0, 0, −1, 0, 0, 0, −j, 0, 0, 0, −j, 0, 0, 0, 1, 0, 0, 0, +j, 0, 0, 0, +j, 0, 0, 0, −1, 0, 0, 0, −j, 0, 0, 0, 1, 0, 0, 0, −1, 0, 0, 0, 1, 0, 0, 0, −1, 0, 0, 0, −j, 0, 0, 0, −1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, −1, 0, 0}, and the B sequence is defined as {0, 0, −j, 0, 0, 0, 1, 0, 0, 0, 1, 0, 0, 0, +j, 0, 0, 0, −1, 0, 0, 0, 1, 0, 0, 0, +j, 0, 0, 0, −j, 0, 0, 0, +j, 0, 0, 0, 1, 0, 0, 0, −j, 0, 0, 0, +j, 0, 0, 0, −j, 0, 0, 0, 1, 0, 0, 0, −j, 0, 0, 0, −j, 0, 0, 0, −1, 0, 0, 0, −1, 0, 0, 0, −1, 0, 0, 0, −j, 0, 0, 0, −j, 0, 0, 0, 1, 0, 0, 0, +j, 0, 0, 0, +j, 0, 0, 0, −1, 0, 0, 0, −j, 0, 0, 0, 1, 0, 0, 0, −1, 0, 0, 0, 1, 0, 0, 0, −j, 0, 0, 0, −1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, −j, 0, 0, 0, 1, 0, 0, 0, 1, 0}.

5. The method of claim 2, wherein when the index value is '5', the A sequence is defined as {0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, −1, 0, 0, 0, 1, 0, 0, 0, −1, 0, 0, 0, +j, 0, 0, 0, 1, 0, 0, 0, 1, 0, 0, 0, −j, 0, 0, 0, −j, 0, 0, 0, 1, 0, 0, 0, 1, 0, 0, 0, 1, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0}, and the B sequence is defined as {0, 0, −1, 0, 0, 0, −j, 0, 0, 0, −j, 0, 0, 0, +1, 0, 0, 0, +j, 0, 0, 0, −j, 0, 0, 0, +1, 0, 0, 0, −1, 0, 0, 0, +1, 0, 0, 0, −j, 0, 0, 0, −1, 0, 0, 0, +1, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0, 0, +1, 0, 0, 0, +j, 0, 0, 0, +j, 0, 0, 0, −1, 0, 0, 0, −j, 0, 0, 0, +j, 0, 0, 0, −1, 0, 0, 0, +1, 0, 0, 0, −1, 0, 0, 0, −j, 0, 0, 0, +1, 0, 0, 0, +1, 0, 0, 0, −1, 0, 0, 0, +1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0}, and wherein when the index value is '6', the A sequence is defined as {0, −1, 0, 0, 0, −j, 0, 0, 0, −j, 0, 0, 0, 1, 0, 0, 0, +j, 0, 0, 0, −j, 0, 0, 0, 1, 0, 0, 0, −1, 0, 0, 0, 1, 0, 0, 0, −j, 0, 0, 0, −1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, −1, 0, 0, 0, −1, 0, 0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0}, and the B sequence is defined as {0, 0, +1, 0, 0, 0, +j, 0, 0, 0, +j, 0, 0, 0, −1, 0, 0, 0, −j, 0, 0, 0, +j, 0, 0, 0, −1, 0, 0, 0, +1, 0, 0, 0, −1, 0, 0, 0, +j, 0, 0, 0, +1, 0, 0, 0, −1, 0, 0, 0, +1, 0, 0, 0, −1, 0, 0, 0, +j, 0, 0, 0, +1, 0, 0, 0, +1, 0, 0, 0, −j, 0, 0, 0, −j, 0, 0, 0, −j, 0, 0, 0, +1, 0, 0, 0, +1, 0, 0, 0, +j, 0, 0, 0, +j, 0, 0, 0, −1, 0, 0, 0, −j, 0, 0, 0, +j, 0, 0, 0, −1, 0, 0, 0, +1, 0, 0, 0, −1, 0, 0, 0, +j, 0, 0, 0, +1, 0, 0, 0, +1, 0, 0, 0, −1, 0, 0, 0, +1, 0, 0, 0, −j, 0, 0, 0, −1, 0, 0, 0, −1, 0, 0, 0, +j, 0, 0, 0, +j, 0, 0, 0, −1, 0, 0, 0, −1, 0}.

6. The method of claim 2, wherein when the index value is '7', the A sequence is defined as {0, +j, 0, 0, 0, −1, 0, 0, 0, −1, 0, 0, 0, −j, 0, 0, 0, 1, 0, 0, 0, −1, 0, 0, 0, −j, 0, 0, 0, +j, 0, 0, 0, −j, 0, 0, 0, −1, 0, 0, 0, +j, 0, 0, 0, −j, 0, 0, 0, −j, 0, 0, 0, −1, 0, 0, 0, +j, 0, 0, 0, +j, 0, 0, 0, 1, 0, 0, 0, 1, 0, 0, 0, 1, 0, 0, 0, +j, 0, 0, 0, +j, 0, 0, 0, 1, 0, 0, 0, +j, 0, 0, 0, +j, 0, 0, 0, −1, 0, 0, 0, −j, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0}, and the B sequence is defined as {0, 0, −j, 0, 0, 0, +1, 0, 0, 0, +1, 0, 0, 0, +j, 0, 0, 0, −1, 0, 0, 0, +1, 0, 0, 0, +j, 0, 0, 0, −j, 0, 0, 0, +j, 0, 0, 0, +1, 0, 0, 0, −j, 0, 0, 0, +j, 0, 0, 0, −j, 0, 0, 0, +j, 0, 0, 0, +1, 0, 0, 0, −j, 0, 0, 0, −j, 0, 0, 0, −1, 0, 0, 0, −1, 0, 0, 0, −1, 0, 0, 0, −j, 0, 0, 0, −j, 0, 0, 0, +1, 0, 0, 0, +j, 0, 0, 0, +j, 0, 0, 0, −1, 0, 0, 0, −j, 0, 0, 0, +j, 0, 0, 0, −1, 0, 0, 0, +1, 0, 0, 0, −1, 0, 0, +j, 0, 0, 0, +1, 0, 0, 0, +1, 0, 0, 0, −1, 0, 0, 0, +1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0}, and wherein when the index value is '8', the A sequence is defined as {0, −j, 0, 0, 0, 1, 0, 0, 0, 1, 0, 0, 0, +j, 0, 0, 0, −1, 0, 0, 0, 1, 0, 0, 0, +j, 0, 0, 0, −j, 0, 0, 0, +j, 0, 0, 0, 1, 0, 0, 0, −j, 0, 0, 0, +j, 0, 0, 0, −j, 0, 0, 0, +j, 0, 0, 0, 1, 0, 0, 0, −j, 0, 0, 0, −j, 0, 0, 0, −1, 0, 0, 0, −1, 0, 0, 0, −1, 0, 0, 0, −j, 0, 0, 0, −j, 0, 0, 0, 1, 0, 0, 0, +j, 0, 0, 0, +j, 0, 0, 0, −1, 0, 0, 0, −j, 0, 0, 0, +j, 0, 0, 0, −1, 0, 0, 0, 1, 0, 0, 0, −1, 0, 0, 0, +j, 0, 0, 0, 1, 0, 0, 0, 1, 0, 0, 0, −1, 0, 0, 0, 1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0, 0}, and the B sequence is defined as {0, 0, +j, 0, 0, 0, −1, 0, 0, 0, −1, 0, 0, 0, −j, 0, 0, 0, +1, 0, 0, 0, −1, 0, 0, 0, −j, 0, 0, 0, +j, 0, 0, 0, −j, 0, 0, 0, −1, 0, 0, 0, +j, 0, 0, 0, −j, 0, 0, 0, +j, 0, 0, 0, −1, 0, 0, 0, +j, 0, 0, 0, +j, 0, 0, 0, +1, 0, 0, 0, +1, 0, 0, 0, +1, 0, 0, 0, +j, 0, 0, 0, +j, 0, 0, 0, +1, 0, 0, 0, +j, 0, 0, 0, +j, 0, 0, 0, +j, 0, 0, 0, −1, 0, 0, 0, −j, 0, 0, 0, +j, 0, 0, 0, −1, 0, 0, 0, +1, 0, 0, 0, −1, 0, 0, 0, +j, 0, 0, 0, +1, 0, 0, 0, +1, 0, 0, 0, −1, 0, 0, 0, +1, 0, 0, 0, −j, 0, 0, 0, −1, 0, 0, 0, −1, 0, 0, 0, +j, 0, 0, 0, +j, 0, 0, 0, +j, 0, 0, 0, −1, 0, 0, 0, −1, 0}.

7. The method of claim 2, wherein when the A sequence is $EDMGS_{left,176}^{iSTS}(n)$ and the B sequence is $EDMGS_{right,176}^{iSTS}(n)$, the A sequence and the B sequence are each defined as shown below in Equation 1:

$$EDMGS_{left,176}^{iSTS}(n) = \begin{cases} A_2^{iSTS}(\lfloor n/4 \rfloor), & n \bmod 4 = 1 \\ 0, & n \bmod 4 \neq 1 \end{cases} \quad \text{[Equation 1]}$$

$$EDMGS_{right,176}^{iSTS}(n) = \begin{cases} B_2^{iSTS}(\lfloor n/4 \rfloor), & n \bmod 4 = 2 \\ 0, & n \bmod 4 \neq 2 \end{cases},$$

wherein $A_2^{iSTS}$ and $B_2^{iSTS}$ are defined recursively as shown below in Equation 2 and Equation 3:

$$A_0^{iSTS}(n) = [+1, +j, +j, -1, -j, +j, -1, +1, -1, +j, +1]$$

$$B_0^{iSTS}(n) = [-1, +1, -1, +j, +1, +1, -j, -j, -j, +1, +1] \quad \text{[Equation 2]}$$

$$A_k^{iSTS}(n) = [W_k^{iSTS} A_{k-1}^{iSTS}(n), B_{k-1}^{iSTS}(n)]$$

$$B_k^{iSTS}(n) = [W_k^{iSTS} A_{k-1}^{iSTS}(n), -B_{k-1}^{iSTS}(n)], \text{ and} \quad \text{[Equation 3]}$$

wherein the $W_k^{iSTS}$ is defined as shown below in Table 1.

TABLE 1

| Space-time stream number | $W_k^{iSTS}$ |
| --- | --- |
| 1 | [+1, +1] |
| 2 | [+1, −1] |
| 3 | [+1, +j] |
| 4 | [+1, −j] |
| 5 | [+1, +1] |

TABLE 1-continued

| Space-time stream number | $W_k^{iSTS}$ |
| --- | --- |
| 6 | [+1, −1] |
| 7 | [+1, +j] |
| 8 | [+1, −j] |

8. The method of claim 1, wherein the wireless channel includes two contiguous 2.16 GHz channels, the A sequence and the B sequence have a length of 385 bits, respectively.

9. The method of claim 8, wherein when the index value is '1', the A sequence is defined as {0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, −1, 0, 0, 0, −1, 0, 0, 0, +1, 0, 0, 0, +j, 0, 0, 0, +1, 0, 0, 0, +1, 0, 0, 0, +1, 0, 0}, and the B sequence is defined as {0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, +1, 0, 0, 0, −1, 0, 0, 0, −1, 0, 0, 0, +j, 0, 0, 0, +1, 0, 0, 0, +1, 0, 0, 0, −1, 0, 0, 0, −1, 0, 0, 0, +j, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, +j, 0, 0, 0, +1, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, −j, 0, 0, 0, +1, 0, 0, 0, +1, 0, 0, 0, +1, 0, 0, 0, −1, 0, 0}, and wherein when the index value is '2', the A sequence is defined as {0, 0, −1, 0, 0, 0, −1, 0, 0, 0, +1, 0, 0, 0, −1, 0, 0, 0, −j, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, +1, 0, 0, 0, −1, 0, 0, 0, −j, 0, 0, 0, −1, 0, 0, 0, −1,
0, 0, 0, −1, 0, 0, 0, +1, 0, 0, 0, +1, 0, 0, 0, +j, 0, 0, 0,
+1, 0, 0, 0, +1, 0, 0, 0, +1, 0, 0, 0, −1, 0, 0, 0, +1, 0, 0,
0, +j, 0, 0, 0, +1, 0, 0, 0, −1, 0, 0, 0, −1, 0, 0, 0, +1, 0,
0, 0, +1, 0, 0, 0, +j, 0, 0, 0, +1, 0, 0, 0, +1, 0, 0, 0, +1,
0, 0, 0, −1, 0, 0, 0, +1, 0, 0, 0, +j, 0, 0, 0, +1, 0, 0, 0,
+1, 0, 0, 0, +1, 0, 0, 0, −1, 0, 0, 0, −1, 0, 0, 0, −j, 0, 0,
0, −1, 0, 0, 0, +1, 0, 0, 0, +1, 0, 0, 0, −1, 0, 0, 0, +1, 0,
0, 0, +j, 0, 0, 0, +1, 0, 0, 0, −1, 0, 0, 0, −1, 0, 0, 0, +1,
0, 0, 0, +1, 0, 0, 0, +j, 0, 0, 0, +1, 0, 0}, and the B sequence is defined as {0, 0, −1, 0, 0, 0, −1, 0, 0, 0,
+1, 0, 0, 0, −1, 0, 0, 0, −j, 0, 0, 0, −1, 0, 0, 0, −1, 0, 0,
0, −1, 0, 0, 0, +1, 0, 0, 0, +1, 0, 0, 0, +j, 0, 0, 0, +1, 0,
0, 0, +1, 0, 0, 0, +1, 0, 0, 0, −1, 0, 0, 0, +1, 0, 0, 0, +j,
0, 0, 0, +1, 0, 0, 0, −1, 0, 0, 0, −1, 0, 0, 0, +1, 0, 0, 0,
+1, 0, 0, 0, +j, 0, 0, 0, +1, 0, 0, 0, −1, 0, 0, 0, −1, 0, 0,
0, +1, 0, 0, 0, −1, 0, 0, 0, −j, 0, 0, 0, −1, 0, 0, 0, −1, 0,
0, 0, −1, 0, 0, 0, +1, 0, 0, 0, +1, 0, 0, 0, +j, 0, 0, 0, +1,
0, 0, 0, −1, 0, 0, 0, −1, 0, 0, 0, +1, 0, 0, 0, −1, 0, 0, 0,
−j, 0, 0, 0, −1, 0, 0, 0, +1, 0, 0, 0, +1, 0, 0, 0, −1, 0, 0,
0, −1, 0, 0, 0, −j, 0, 0, 0, −1, 0, 0, 0, +1, 0, 0, 0, +1, 0,
0, 0, −1, 0, 0, 0, +1, 0, 0, 0, +j, 0, 0, 0, +1, 0, 0, 0, +1,
0, 0, 0, +1, 0, 0, 0, −1, 0, 0, 0, −1, 0, 0, 0, −j, 0, 0, 0,
−1, 0, 0, 0, −1, 0, 0, 0, −1, 0, 0, 0, +1, 0, 0, 0, −1, 0, 0,
0, −j, 0, 0, 0, −1, 0, 0, 0, +1, 0, 0, 0, +1, 0, 0, 0, −1, 0, 0,
0, 0, −1, 0, 0, 0, −j, 0, 0, 0, −1, 0, 0, 0, −1, 0, 0, 0, −1,
0, 0, 0, +1, 0, 0, 0, −1, 0, 0, 0, −j, 0, 0, 0, −1, 0, 0, 0,
−1, 0, 0, 0, −1, 0, 0, 0, +1, 0, 0, 0, +1, 0, 0, 0, +j, 0, 0,
0, +1, 0, 0, 0, −1, 0, 0, 0, −1, 0, 0, 0, +1, 0, 0, 0, −1, 0,
0, 0, −j, 0, 0, 0, −1, 0, 0, 0, +1, 0, 0, 0, +1, 0, 0, 0, −1,
0, 0, 0, −1, 0, 0, 0, −j, 0, 0, 0, −1, 0, 0}.

10. The method of claim 8, wherein when the index value is '3', the A sequence is defined as {0, 0, −1, 0, 0, 0, −1, 0, 0, 0,
+1, 0, 0, 0, −1, 0, 0, 0, −j, 0, 0, 0, −1, 0, 0, 0, +1, 0, 0,
0, +1, 0, 0, 0, −1, 0, 0, 0, −1, 0, 0, 0, −j, 0, 0, 0, −1, 0,
0, 0, −1, 0, 0, 0, −1, 0, 0, 0, +1, 0, 0, 0, −1, 0, 0, 0, −j,
0, 0, 0, −1, 0, 0, 0, −1, 0, 0, 0, −1, 0, 0, 0, +1, 0, 0, 0,
+1, 0, 0, 0, +j, 0, 0, 0, +1, 0, 0, 0, −1, 0, 0, 0, −1, 0, 0,
0, +1, 0, 0, 0, −1, 0, 0, 0, −j, 0, 0, 0, −1, 0, 0, 0, +1, 0,
0, 0, +1, 0, 0, 0, −1, 0, 0, 0, −1, 0, 0, 0, −j, 0, 0, 0, −1,
0, 0, 0, +1, 0, 0, 0, +1, 0, 0, 0, −1, 0, 0, 0, +1, 0, 0, 0,
+j, 0, 0, 0, +1, 0, 0, 0, +1, 0, 0, 0, +1, 0, 0, 0, −1, 0, 0,
0, −1, 0, 0, 0, −j, 0, 0, 0, −1, 0, 0, 0, −1, 0, 0, 0, −1, 0,
0, 0, +1, 0, 0, 0, −1, 0, 0, 0, −j, 0, 0, 0, −1, 0, 0, 0, +1,
0, 0, 0, +1, 0, 0, 0, −1, 0, 0, 0, −1, 0, 0, 0, −j, 0, 0, 0,
−1, 0, 0, 0, −1, 0, 0, 0, −1, 0, 0, 0, +1, 0, 0, 0, −1, 0, 0,
0, −j, 0, 0, 0, −1, 0, 0, 0, −1, 0, 0, 0, −1, 0, 0, 0, +1, 0,
0, 0, +1, 0, 0, 0, +j, 0, 0, 0, +1, 0, 0, 0, +1, 0, 0, 0, +1,
0, 0, 0, −1, 0, 0, 0, +1, 0, 0, 0, +j, 0, 0, 0, +1, 0, 0, 0,
−1, 0, 0, 0, −1, 0, 0, 0, +1, 0, 0, 0, +1, 0, 0, 0, +j, 0, 0,
0, +1, 0, 0, 0, −1, 0, 0, 0, −1, 0, 0, 0, +1, 0, 0, 0, −1, 0,
0, 0, −j, 0, 0, 0, −1, 0, 0, 0, −1, 0, 0, 0, −1, 0, 0, 0, +1,
0, 0, 0, +1, 0, 0, 0, +j, 0, 0, 0, +1, 0, 0}, and the B sequence is defined as {0, 0, −1, 0, 0, 0, −1, 0, 0, 0,
+1, 0, 0, 0, −1, 0, 0, 0, −j, 0, 0, 0, −1, 0, 0, 0, +1, 0, 0,
0, +1, 0, 0, 0, −1, 0, 0, 0, −1, 0, 0, 0, −j, 0, 0, 0, −1, 0,
0, 0, −1, 0, 0, 0, −1, 0, 0, 0, +1, 0, 0, 0, −1, 0, 0, 0, −j,
0, 0, 0, −1, 0, 0, 0, −1, 0, 0, 0, −1, 0, 0, 0, +1, 0, 0, 0,
+1, 0, 0, 0, +j, 0, 0, 0, +1, 0, 0, 0, −1, 0, 0, 0, −1, 0, 0,
0, +1, 0, 0, 0, −1, 0, 0, 0, −j, 0, 0, 0, −1, 0, 0, 0, +1, 0,
0, 0, +1, 0, 0, 0, −1, 0, 0, 0, −1, 0, 0, 0, −j, 0, 0, 0, −1,
0, 0, 0, −1, 0, 0, 0, +1, 0, 0, 0, +1, 0, 0, 0, +j, 0, 0, 0,
+1, 0, 0, 0, +1, 0, 0, 0, +1, 0, 0, 0, −1, 0, 0, 0, +1, 0, 0,
0, +j, 0, 0, 0, +1, 0, 0, 0, −1, 0, 0, 0, −1, 0, 0, 0, −1, 0, 0,
0, −1, 0, 0, 0, −j, 0, 0, 0, −1, 0, 0}.

+1, 0, 0, 0, +1, 0, 0, 0, +1, 0, 0, 0, −1, 0, 0, 0, +1, 0, 0,
0, +j, 0, 0, 0, +1, 0, 0, 0, +1, 0, 0, 0, +1, 0, 0, 0, −1, 0,
0, 0, −1, 0, 0, 0, −j, 0, 0, 0, −1, 0, 0, 0, −1, 0, 0, 0, −1,
0, 0, 0, +1, 0, 0, 0, −1, 0, 0, 0, −j, 0, 0, 0, −1, 0, 0, 0,
+1, 0, 0, 0, +1, 0, 0, 0, −1, 0, 0, 0, −1, 0, 0, 0, −j, 0, 0,
0, −1, 0, 0, 0, +1, 0, 0, 0, +1, 0, 0, 0, −1, 0, 0, 0, +1, 0,
0, 0, +j, 0, 0, 0, +1, 0, 0, 0, +1, 0, 0, 0, +1, 0, 0, 0, −1,
0, 0, 0, −1, 0, 0, 0, −j, 0, 0, 0, −1, 0, 0}, and wherein when the index value is '4', the A sequence is defined as {0, 0, +1, 0, 0, 0, +1, 0, 0, 0,
−1, 0, 0, 0, +1, 0, 0, 0, +j, 0, 0, 0, +1, 0, 0, 0, −1, 0, 0,
0, −1, 0, 0, 0, +1, 0, 0, 0, +1, 0, 0, 0, +j, 0, 0, 0, +1, 0,
0, 0, −1, 0, 0, 0, −1, 0, 0, 0, +1, 0, 0, 0, −1, 0, 0, 0, −j,
0, 0, 0, −1, 0, 0, 0, −1, 0, 0, 0, −1, 0, 0, 0, +1, 0, 0, 0,
+1, 0, 0, 0, +j, 0, 0, 0, +1, 0, 0, 0, +1, 0, 0, 0, +1, 0, 0,
0, −1, 0, 0, 0, +1, 0, 0, 0, +j, 0, 0, 0, +1, 0, 0, 0, −1, 0,
0, 0, −1, 0, 0, 0, +1, 0, 0, 0, +1, 0, 0, 0, +j, 0, 0, 0, +1,
0, 0, 0, +1, 0, 0, 0, +1, 0, 0, 0, −1, 0, 0, 0, +1, 0, 0, 0,
+j, 0, 0, 0, +1, 0, 0, 0, +1, 0, 0, 0, +1, 0, 0, 0, −1, 0, 0,
0, −1, 0, 0, 0, −j, 0, 0, 0, −1, 0, 0, 0, +1, 0, 0, 0, +1, 0,
0, 0, −1, 0, 0, 0, +1, 0, 0, 0, +j, 0, 0, 0, +1, 0, 0, 0, −1,
0, 0, 0, −1, 0, 0, 0, +1, 0, 0, 0, +1, 0, 0, 0, +j, 0, 0, 0,
+1, 0, 0, 0, −1, 0, 0, 0, −1, 0, 0, 0, +1, 0, 0, 0, −1, 0, 0,
0, −j, 0, 0, 0, −1, 0, 0, 0, −1, 0, 0, 0, −1, 0, 0, 0, +1, 0,
0, 0, +1, 0, 0, 0, +j, 0, 0, 0, +1, 0, 0, 0, −1, 0, 0, 0, −1,
0, 0, 0, +1, 0, 0, 0, −1, 0, 0, 0, −j, 0, 0, 0, −1, 0, 0, 0,
+1, 0, 0, 0, +1, 0, 0, 0, −1, 0, 0, 0, −1, 0, 0, 0, −j, 0, 0,
0, −1, 0, 0, 0, −1, 0, 0, 0, −1, 0, 0, 0, +1, 0, 0, 0, +1, 0,
0, 0, +j, 0, 0, 0, +1, 0, 0, 0, +1, 0, 0, 0, +1, 0, 0, 0, −1,
0, 0, 0, +1, 0, 0, 0, −j, 0, 0, 0, −1, 0, 0, 0, +1, 0, 0, 0,
+1, 0, 0, 0, −1, 0, 0, 0, −1, 0, 0, 0, −j, 0, 0,
0, −1, 0, 0, 0, −1, 0, 0, 0, −1, 0, 0, 0, +1,
0, 0, 0, +1, 0, 0, 0, +j, 0, 0, 0, +1, 0, 0}, and the B sequence is defined as {0, 0, +1, 0, 0, 0, +1, 0, 0, 0,
−1, 0, 0, 0, +1, 0, 0, 0, +j, 0, 0, 0, +1, 0, 0, 0, −1, 0, 0,
0, −1, 0, 0, 0, +1, 0, 0, 0, +1, 0, 0, 0, +j, 0, 0, 0, +1, 0,
0, 0, −1, 0, 0, 0, −1, 0, 0, 0, +1, 0, 0, 0, −1, 0, 0, 0, −j,
0, 0, 0, −1, 0, 0, 0, −1, 0, 0, 0, −1, 0, 0, 0, +1, 0, 0, 0,
+1, 0, 0, 0, +j, 0, 0, 0, +1, 0, 0, 0, +1, 0, 0, 0, +1, 0, 0,
0, −1, 0, 0, 0, +1, 0, 0, 0, +j, 0, 0, 0, +1, 0, 0, 0, −1, 0,
0, 0, −1, 0, 0, 0, +1, 0, 0, 0, +1, 0, 0, 0, +j, 0, 0, 0, +1,
0, 0, 0, +1, 0, 0, 0, +1, 0, 0, 0, −1, 0, 0, 0, +1, 0, 0, 0,
+j, 0, 0, 0, +1, 0, 0, 0, +1, 0, 0, 0, +1, 0, 0, 0, −1, 0, 0,
0, −1, 0, 0, 0, −j, 0, 0, 0, −1, 0, 0, 0, −1, 0, 0, 0, −1, 0,
0, 0, +1, 0, 0, 0, −1, 0, 0, 0, −j, 0, 0, 0, −1, 0, 0, 0, +1,
0, 0, 0, +1, 0, 0, 0, −1, 0, 0, 0, −1, 0, 0, 0, −j, 0, 0, 0,
−1, 0, 0, 0, +1, 0, 0, 0, +1, 0, 0, 0, −1, 0, 0, 0, +1, 0, 0,
0, +j, 0, 0, 0, +1, 0, 0, 0, +1, 0, 0, 0, +1, 0, 0, 0, −1, 0,
0, 0, −1, 0, 0, 0, −j, 0, 0, 0, −1, 0, 0, 0, −1, 0, 0}.

11. The method of claim 8, wherein when the index value is '5', the A sequence is defined as {0, 0, −1, 0, 0, 0, −1, 0, 0, 0,
+1, 0, 0, 0, +1, 0, 0, 0, +j, 0, 0, 0, +1, 0, 0, 0, −1, 0, 0,
0, −1, 0, 0, 0, +1, 0, 0, 0, −1, 0, 0, 0, −j, 0, 0, 0, −1, 0,
0, 0, −1, 0, 0, 0, −1, 0, 0, 0, +1, 0, 0, 0, +1, 0, 0, 0, +j,
0, 0, 0, +1, 0, 0, 0, +1, 0, 0, 0, +1, 0, 0, 0, −1, 0, 0, 0,
+1, 0, 0, 0, +j, 0, 0, 0, +1, 0, 0, 0, −1, 0, 0, 0, −1, 0, 0,
0, +1, 0, 0, 0, +1, 0, 0, 0, +j, 0, 0, 0, +1, 0, 0, 0, −1, 0,
0, 0, −1, 0, 0, 0, +1, 0, 0, 0, −1, 0, 0, 0, −j, 0, 0, 0, −1,
0, 0, 0, +1, 0, 0, 0, +1, 0, 0, 0, −1, 0, 0, 0, −1, 0, 0, 0,
−j, 0, 0, 0, −1, 0, 0, 0, −1, 0, 0, 0, −1, 0, 0, 0, +1, 0, 0,
0, −1, 0, 0, 0, −j, 0, 0, 0, −1, 0, 0, 0, −1, 0, 0, 0, −1, 0,
0, 0, +1, 0, 0, 0, +1, 0, 0, 0, +j, 0, 0, 0, +1, 0, 0, 0, −1,
0, 0, 0, −1, 0, 0, 0, +1, 0, 0, 0, −1, 0, 0, 0, −j, 0, 0, 0,
−1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0}, and
the B sequence is defined as {0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0}, and
wherein when the index value is '6',
the A sequence is defined as {0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, +j, 0, 0, 0, +1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0}, and
the B sequence is defined as {0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0}.

12. The method of claim 8, wherein when the index value is '7',
the A sequence is defined as {0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, +j, 0, 0, 0, +1, 0, 0, 0, +1, 0, 0, 0, +1, 0, 0, 0, +j, 0, 0, 0, +1, 0, 0, 0, +1, 0, 0, 0, −1, 0, 0, 0, −1, 0, 0, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0}, and
the B sequence is defined as {0, 0, +1, 0, 0, 0, +1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, −1, 0, 0, 0, −j, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0, 0, −1, 0, 0, 0, −j, 0, 0, 0, −1, 0, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, +1, 0, 0, 0, −1, 0, 0, 0, −j, 0, 0, 0, −1, 0, 0}, and
wherein when the index value is '8',
the A sequence is defined as {0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, +1, 0, 0, 0, −1, 0, 0, 0, −1, 0, 0, 0, −1, 0, 0, 0, −j, 0, 0, 0, −1, 0, 0, 0, −1, 0, 0, 0, −1, 0, 0, 0, +1, 0, 0, 0, +1, 0, 0, 0, +j, 0, 0, 0, +1, 0, 0, 0, +1, 0, 0, 0, +1, 0, 0, 0, +1, 0, 0, 0, −1, 0, 0, 0, +1, 0, 0, 0, +j, 0, 0, 0, +1, 0, 0, 0, +1, 0, 0, 0, −1, 0, 0, 0, −1, 0, 0, 0, −j, 0, 0, 0, −1, 0, 0, 0, +1, 0, 0, 0, +1, 0, 0, 0, −1, 0, 0, 0, +1, 0, 0, 0, +j, 0, 0, 0, +1, 0, 0, 0, −1, 0, 0, 0, −1, 0, 0, 0, +1, 0, 0, 0, +1, 0, 0, 0, +j, 0, 0, 0, −1, 0, 0, 0, −1, 0, 0, 0, +1, 0, 0, 0, −1, 0, 0, 0, −j, 0, 0, 0, −1, 0, 0, 0, +1, 0, 0, 0, +1, 0, 0, 0, −1, 0, 0, 0, −1, 0,
0, 0, −j, 0, 0, 0, −1, 0, 0, 0, +1, 0, 0, 0, +1, 0, 0, 0, −1,
0, 0, 0, +1, 0, 0, 0, +j, 0, 0, 0, +1, 0, 0}, and
the B sequence is defined as {0, 0, −1, 0, 0, 0, −1, 0, 0, 0,
+1, 0, 0, 0, +1, 0, 0, 0, +j, 0, 0, 0, +1, 0, 0, 0, +1, 0, 0,
0, +1, 0, 0, 0, −1, 0, 0, 0, +1, 0, 0, 0, +j, 0, 0, 0, +1, 0,
0, 0, +1, 0, 0, 0, +1, 0, 0, 0, −1, 0, 0, 0, −1, 0, 0, 0, −j,
0, 0, 0, −1, 0, 0, 0, +1, 0, 0, 0, +1, 0, 0, 0, −1, 0, 0, 0,
+1, 0, 0, 0, +j, 0, 0, 0, +1, 0, 0, 0, −1, 0, 0, 0, −1, 0, 0,
0, +1, 0, 0, 0, +1, 0, 0, 0, +j, 0, 0, 0, +1, 0, 0, 0, +1, 0,
0, 0, +1, 0, 0, 0, −1, 0, 0, 0, +1, 0, 0, 0, +j, 0, 0, 0, +1,
0, 0, 0, −1, 0, 0, 0, −1, 0, 0, 0, +1, 0, 0, 0, +1, 0, 0, 0,
+j, 0, 0, 0, +1, 0, 0, 0, −1, 0, 0, 0, −1, 0, 0, 0, +1, 0, 0,
0, −1, 0, 0, 0, −j, 0, 0, 0, −1, 0, 0, 0, +1, 0, 0, 0, +1, 0,
0, 0, −1, 0, 0, 0, −1, 0, 0, 0, −j, 0, 0, 0, −1, 0, 0, 0, −1,
0, 0, 0, −1, 0, 0, 0, +1, 0, 0, 0, −1, 0, 0, 0, −j, 0, 0, 0,
−1, 0, 0, 0, −1, 0, 0, 0, −1, 0, 0, 0, +1, 0, 0, 0, +1, 0, 0,
0, +j, 0, 0, 0, +1, 0, 0, 0, −1, 0, 0, 0, −1, 0, 0, 0, +1, 0,
0, 0, −1, 0, 0, 0, −j, 0, 0, 0, −1, 0, 0, 0, −1, 0, 0, 0, −1,
0, 0, 0, +1, 0, 0, 0, +1, 0, 0, 0, +j, 0, 0, 0, +1, 0, 0, 0,
+1, 0, 0, 0, +1, 0, 0, 0, −1, 0, 0, 0, +1, 0, 0, 0, +j, 0, 0,
0, +1, 0, 0, 0, −1, 0, 0, 0, −1, 0, 0, 0, +1, 0, 0, 0, +1, 0,
0, 0, +j, 0, 0, 0, +1, 0, 0, 0, −1, 0, 0, 0, −1, 0, 0, 0, +1,
0, 0, 0, −1, 0, 0, 0, −j, 0, 0, 0, −1, 0, 0}.

13. The method of claim 7, wherein when the A sequence is $EDMGS_{left,384}^{iSTS}(n)$ and the B sequence is $EDMGS_{right,384}^{iSTS}(n)$, the A sequence and the B sequence are each defined as shown below in Equation 4:

$$EDMGS_{left,384}^{iSTS}(n) = \begin{cases} A_5^{iSTS}(\lfloor n/4 \rfloor), & n \bmod 4 = 1 \\ 0, & n \bmod 4 \neq 1 \end{cases}$$

$$EDMGS_{right,384}^{iSTS}(n) = \begin{cases} B_5^{iSTS}(\lfloor n/4 \rfloor), & n \bmod 4 = 2 \\ 0, & n \bmod 4 \neq 2 \end{cases}, \quad [\text{Equation 4}]$$

wherein $A_5^{iSTS}$ and $B_5^{iSTS}$ are defined recursively as shown below in Equation 5 and Equation 6:

$$A_0^{iSTS}(n) = [+1, +1, -1]$$

$$B_0^{iSTS}(n) = [+1, +j, +1] \quad [\text{Equation 5}]$$

$$A_k^{iSTS}(n) = [W_k^{iSTS} A_{k-1}^{iSTS}(n), B_{k-1}^{iSTS}(n)]$$

$$B_k^{iSTS}(n) = [W_k^{iSTS} A_{k-1}^{iSTS}(n), -B_{k-1}^{iSTS}(n)] \quad [\text{Equation 6}]$$

wherein the $W_k^{iSTS}$ is defined as shown below in Table 2.

TABLE 2

| Space-time stream number | $W_k^{iSTS}$ |
|---|---|
| 1 | [+1, +1, +1, +1, +1] |
| 2 | [+1, +1, −1, +1, +1] |
| 3 | [+1, −1, +1, +1, +1] |
| 4 | [+1, −1, −1, +1, +1] |
| 5 | [−1, +1, +1, +1, +1] |
| 6 | [−1, +1, −1, +1, +1] |
| 7 | [−1, −1, +1, +1, +1] |
| 8 | [−1, −1, −1, +1, +1] |

14. A first station (STA) in an Orthogonal Frequency Division Multiplexing (OFDM) mode in a wireless LAN (WLAN) system, the first STA comprising:
a transceiver having one or more RF (radio frequency) chains and configured to transmit or receive a signal to or from a second STA; and
a processor connected to the transceiver and processing the signal transmitted or received to or from the second STA,
wherein the processor is configured:
to generate an Enhanced Directional Multi Gigabit Short Training Field (EDMG STF) signal based on a STF sequence,
wherein the STF sequence includes an A sequence and a B sequence, and
to transmit an EDMG Physical Protocol Data Unit (PPDU) including the generated EDMG STF signal via an wireless channel based on one or more space-time streams (STSs) to a second STA,
wherein the A sequence and the B sequence are determined based on a number of contiguous 2.16 GHz channels for the wireless channel and an index value of the one or more STSs, and
wherein the STF sequence is defined as {A, 0, 0, 0, B}.

* * * * *